United States Patent
Bhaskaran et al.

(10) Patent No.: US 10,069,791 B2
(45) Date of Patent: Sep. 4, 2018

(54) SYSTEM AND METHOD FOR PROVIDING A CHANGE IN USER EQUIPMENT PACKET DATA NETWORK INTERNET PROTOCOL ADDRESS IN A SPLIT CONTROL AND USER PLANE EVOLVED PACKET CORE ARCHITECTURE

(71) Applicant: CISCO TECHNOLOGY, INC., San Jose, CA (US)

(72) Inventors: Sridhar Bhaskaran, Coimbatore (IN); Nirav Salot, Pune (IN); Maulik Vijay Vaidya, Atlanta, GA (US); Sebastian Speicher, Wallisellen (CH)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 15/014,997

(22) Filed: Feb. 3, 2016

(65) Prior Publication Data
US 2017/0126618 A1    May 4, 2017

Related U.S. Application Data

(60) Provisional application No. 62/249,768, filed on Nov. 2, 2015.

(51) Int. Cl.
*H04L 29/12*   (2006.01)
*H04W 64/00*   (2009.01)
(Continued)

(52) U.S. Cl.
CPC ......... *H04L 61/2007* (2013.01); *H04W 64/00* (2013.01); *H04W 80/04* (2013.01); *H04W 88/16* (2013.01)

(58) Field of Classification Search
None
See application file for complete search history.

(56) References Cited

U.S. PATENT DOCUMENTS 8,873,398 B2    10/2014 Kempf et al.
2015/0063346 A1   3/2015 Eswara et al.
(Continued)

FOREIGN PATENT DOCUMENTS

WO  WO2013/144747   3/2013
WO  WO2015/000516   8/2015

OTHER PUBLICATIONS

Barton, Bart, "X2-based handover with SGW Relocation," LTE and Beyond, Tech-blog, on 4g/LTE and beyond, Blog posted on Mar. 16, 2012; 4 pages.
(Continued)

*Primary Examiner* — Donald Mills
(74) *Attorney, Agent, or Firm* — Patterson + Sheridan, LLP

(57) ABSTRACT

A method is provided in one example embodiment and may include determining a location for a user equipment (UE); determining whether at least one user data plane entity servicing at least one packet data network (PDN) flow for the UE is to be changed based, at least in part, on the location of the UE; if at least one user data plane entity is to be changed, selecting at least one new user data plane entity to service the at least one PDN flow for the UE; allocating a new PDN Internet Protocol (IP) address for the at least one PDN flow for which the user data plane entity is changed; and communicating the new PDN IP address to the UE.

18 Claims, 24 Drawing Sheets

(51) Int. Cl.
H04W 80/04 (2009.01)
H04W 88/16 (2009.01)

(56) References Cited

U.S. PATENT DOCUMENTS

| | | | |
|---|---|---|---|
| 2015/0103665 A1 | 4/2015 | Kaippallimalil et al. | |
| 2015/0110095 A1* | 4/2015 | Tan | H04L 61/2007 370/338 |
| 2015/0117406 A1* | 4/2015 | Kim | H04W 36/0022 370/331 |
| 2015/0117408 A1* | 4/2015 | Kedalagudde | H04W 36/0027 370/331 |
| 2015/0189563 A1* | 7/2015 | Chan | H04W 36/08 370/331 |
| 2015/0319659 A1* | 11/2015 | Jung | H04W 48/18 370/331 |
| 2016/0014127 A1* | 1/2016 | Mohebbi | H04W 12/06 455/411 |
| 2016/0183139 A1* | 6/2016 | Meredith | H04W 8/18 455/432.1 |
| 2016/0183156 A1* | 6/2016 | Chin | H04W 36/0022 370/331 |
| 2016/0212667 A1* | 7/2016 | Kim | H04W 48/18 |
| 2016/0286043 A1* | 9/2016 | John | H04M 3/42144 |
| 2017/0005914 A1* | 1/2017 | Edge | H04L 45/26 |
| 2017/0093749 A1* | 3/2017 | Hoffmann | H04L 47/783 |
| 2017/0142762 A1* | 5/2017 | Kedalagudde | H04W 76/022 |
| 2017/0251405 A1* | 8/2017 | Stojanovski | H04W 76/028 |

OTHER PUBLICATIONS

Cheshire S., et al., "DNS-Based Service Discovery," IETF RFC 6763, Feb. 2013; 49 pages.
Cisco Systems, Inc., "Cisco ASR 5000 Series Release Change Reference, Release 11.0 to Releases 12.0, 12.1 and 12.2," Apr. 30, 2013; 620 pages.
Dornal, Santosh, "LTE: Tunnel Identifiers (GTPv2)," blog posted on wired-n-wireless.blogspot.com, May 24, 2009; 8 pages.
"eCGI and CGI for LTE and GSM Networks," Stack Overflow, Jan. 7, 2014; 3 pages.
Gundavelli, Sri, "Distributed Mobility Management:: Architectural Considerations (Work Team #4—Update)," IETF 92—Dallas; 17 pages.
Lakshman, T.V., "The SoftRouter Architecture," SIGCOMM HotNets, Nov. 15-16, 2004, San Diego, CA; 6 pages.
"LTE IP Address Allocation Schemes 1: Basic," NETMANIAS Technical Documents, Feb. 13, 2015; 9 pages.
Open Networking Foundation, "OpenFlow Switch Specification," Version 1.5.1 (Protocol version 0x06), Mar. 26, 2015; 283 pages.
"Software-Defined Networking (SDN) Definition: What is SDN?" Open Networking Foundation, published on or about Aug. 5, 2013; 3 pages.
"Software-Defined Networking: The New Norm for Networks," ONF White Paper, Open Networking Foundation, Apr. 13, 2012; 12 pages.

"The Tactile Internet," ITU-T Technology Watch Report, Aug. 2014; 24 pages.
"What is a fully qualified domain name (FQDN)?" Knowledge Base, Indiana University, Oct. 17, 2014; 3 pages.
"3GPP TS 23.401 V13.4.0 (Sep. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France; Sep. 2015, 334 pages.
3GPP TS 29.303 V13.1.0 (Jun. 2015) Technical Specification: 3rd Generation Partnership Project; Technical Specification Group Core Network and Terminals; Domain Name System Procedures; Stage 3 (Release 13), 3GPP, 650 Route des Lucioles—Sophia Antipolis Valbonne—France; Jun. 2015, 63 pages.
Yegin, A., et al.,"On Demand Mobility API," DMM Networking Group Internet-Draft, draft-dmm-ondemand-mobility-api-00, May 4, 2015; 10 pages.
Liebsch, M., et al., "Protocol for Forwarding Policy Configuration (FPC) in DMM," DMM Working Group Internet Draft, draft-ietf-dmm-fpc-cpdp-01.txt, Jul. 6, 2015; 32 pages.
Rodriguez-Natal, A., et al., "Software Defined Networking Extensions for the Locator/ID Separation Protocol," LISP Working Group Internet-Draft, draft-rodrigueznatal-lisp-sdn-00, Feb. 7, 2014; 8 pages.
"ETSI TS 123 401 V12.10.0 (Oct. 2015) Technical Specification: LTE; General Packet Radio Service (GPRS) enhancements for Evolved Universal Terrestrial Radio Access Network (E-UTRAN) access (3GPP TS 23.401 version 12.10.0 Release 12)," ETSI, 650 Route des Lucioles F-06921 Sophia Antipolis Cedex—France, Oct. 2015; 312 pages.
"ETSI TS 124 301 V12.10.0 (Oct. 2015) Technical Specification: Universal Mobile Telecommunications System (UMTS); LTE; Non-Access-Stratum (NAS) protocol for Evolved Packet System (EPS); Stage 3 (3GPP TS 24.301 version 12.10.0 Release 12)," ETSI, 650 Route des Lucioles F-06921 Sophia Antipolis Cedex—France, Oct. 2015; 366 pages.
"ETSI TS 129 214 V13.4.0 (Jan. 2016) Technical Specification: Universal Mobile Telecommunications System (UMTS); LTE; Policy and charging control over Rx reference point (3GPP TS 29.214 version 13.4.0 Release 13)," ETSI, 650 Route des Lucioles F-06921 Sophia Antipolis Cedex—France, Jan. 2016; 68 pages.
"ETSI TS 129 274 V12.10.0 (Oct. 2015) Technical Specification: Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3 (3GPP TS 29.274 version 12.10.0 Release 12)," ETSI, 650 Route des Lucioles F-06921 Sophia Antipolis Cedex—France, Oct. 2015; 317 pages.
"ETSI TS 136 300 V12.7.0 (Oct. 2015) Technical Specification: LTE; Evolved Universal Terrestrial Radio Access (E-UTRA) and Evolved Universal Terrestrial Radio Access Network (E-UTRAN); Overal description; Stage 2 (3GPP TS 36.300 version 12.7.0 Release 12)," ETSI, 650 Route des Lucioles F-06921 Sophia Antipolis Cedex—France, Oct. 2015; 264 pages.

* cited by examiner

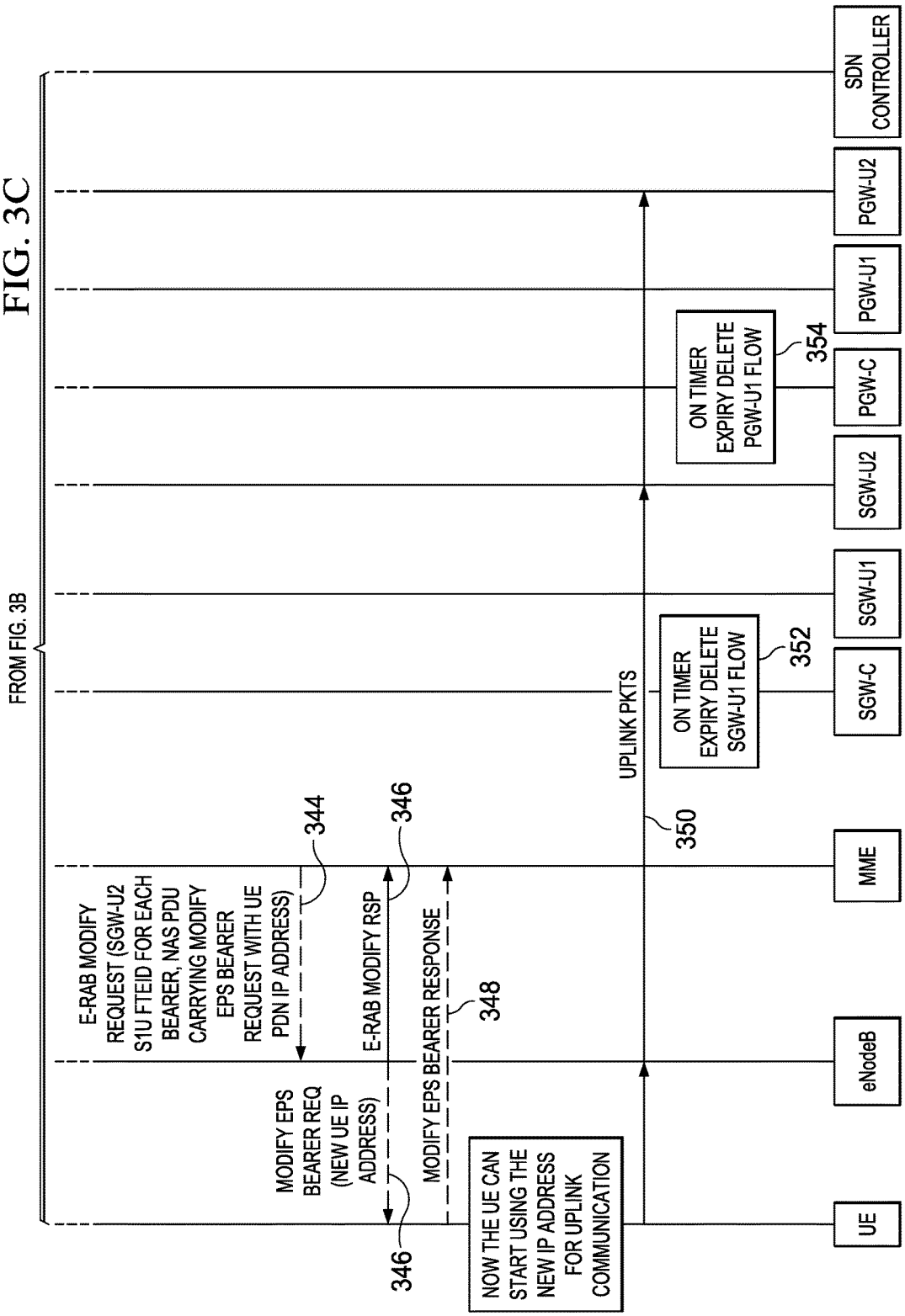

United States Patent US 10,069,791 B2

SYSTEM AND METHOD FOR PROVIDING A CHANGE IN USER EQUIPMENT PACKET DATA NETWORK INTERNET PROTOCOL ADDRESS IN A SPLIT CONTROL AND USER PLANE EVOLVED PACKET CORE ARCHITECTURE

CROSS-REFERENCE TO RELATED APPLICATION

This application claims the benefit of priority under 35 U.S.C. § 119(e) to U.S. Provisional Application Ser. No. 62/249,768 entitled "SYSTEM AND METHOD FOR PROVIDING A CHANGE IN USER EQUIPMENT PACKET DATA NETWORK INTERNET PROTOCOL ADDRESS IN A SPLIT CONTROL AND USER PLANE EVOLVED PACKET CORE ARCHITECTURE," filed Nov. 2, 2015, which is hereby incorporated by reference in its entirety.

TECHNICAL FIELD

This disclosure relates in general to the field of computer networking, and more particularly, to a system and method for providing a change in user equipment (UE) Packet Data Network (PDN) Internet Protocol (IP) address in a split control and user plane Evolved Packet Core (EPC) architecture.

BACKGROUND

Computer devices, sometimes referred to as user equipment, can enable users to communicate with other users operating other user equipment and to communicate with other computer devices all over the world via, for example, the Internet. Computer networks that facilitate these communications generally rely on many different technologies. These technologies generally rely upon three basic components: a data plane, a control plane, and a management plane. The data plane carries the user traffic, while the control plane and the management plane serve the data plane. The data plane produces significantly more traffic than the other planes.

As users operating user equipment move throughout a communication system, data plane and control plane paths that are needed for maintaining connectivity of the user equipment to computer networks can change with user equipment mobility. In some instances, user equipment mobility can result in deactivating and reactivating signaling paths. As the number of users in a communication system increases, signaling and latency can increase as users are mobile within the communication system. Thus, managing a network and user equipment connectivity presents significant challenges to network operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3C is a simplified interaction diagram illustrating other example details that can be associated an example call flow for another modified service request procedure in accordance with one potential embodiment;

DETAILED DESCRIPTION OF EMBODIMENTS

Overview

Figure 1A:
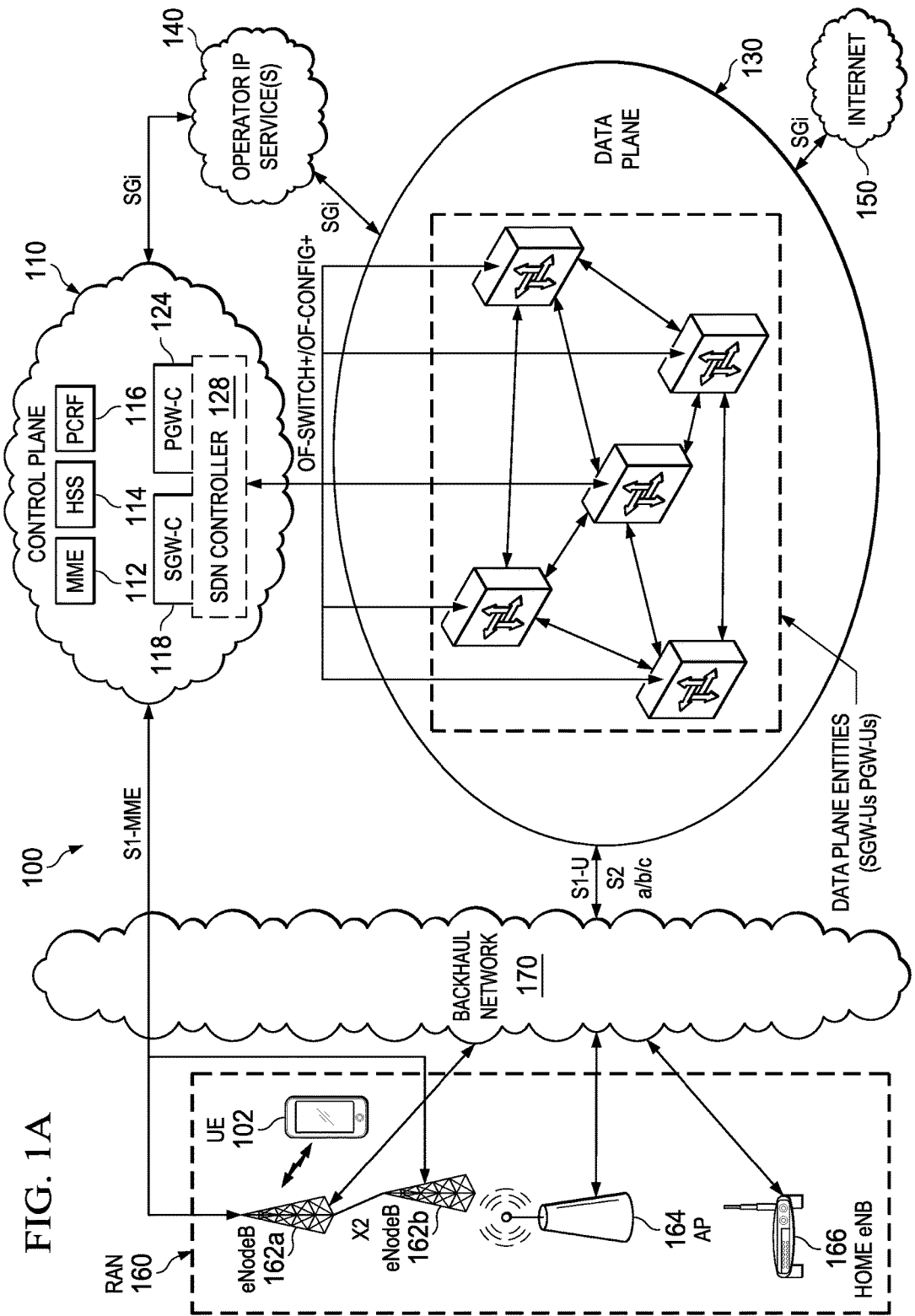
FIG. 1A is a simplified block diagram illustrating an architecture to facilitate providing a change in UE PDN IP address in a split control and user plane EPC architecture according to one embodiment of the present disclosure.

A method is provided in one example embodiment and may include determining a location for a user equipment (UE); determining whether at least one user data plane entity servicing at least one packet data network (PDN) flow for the UE is to be changed based, at least in part, on the location of the UE; if at least one user data plane entity is to be changed, selecting at least one new user data plane entity to service the at least one PDN flow for the UE; allocating a new PDN Internet Protocol (IP) address for the at least one PDN flow for which the user data plane entity is changed; and communicating the new PDN IP address to the UE. The location of the UE can be determined based on a user location information (ULI) indicator associated with the UE.

In one case, the PDN IP address can be communicated to the UE using a Modify EPS Bearer Request message. In another case, the PDN IP address can be communicated to the UE using an E-UTRAN Radio Access Bearer (E-RAB)

Modify Request Message including a Modify EPS Bearer Request Message as a NAS PDU within the E-RAB Modify Request Message. In still another case, the PDN IP address can be communicated to the UE using a Tracking Area Update (TAU) Accept Message that includes the PDN IP address in an Evolved Packet System (EPS) Bearer Context Status portion of the TAU Accept message.

In one instance, if at least one user data plane entity that is to be changed is a Serving Gateway user data plane entity (SGW-U), the method can further include: selecting a new SGW-U to service all PDN flows for the UE based, at least in part, on the location of the UE; allocating a first fully qualified tunnel endpoint identifier (FTEID) for the new SGW-U for an interface between the new SGW-U and an eNodeB to which the UE is connected; and allocating a second FTEID for the SGW-U for an interface between the new SGW-U and a PDN Gateway user data plane entity (PGW-U) that is to service the at least one PDN flow for the UE.

In one instance, if at least one user data plane entity that is to be changed is a PDN Gateway user data plane entity (PGW-U), the method can further include: selecting a new PGW-U to service the at least one PDN flow for the UE based, at least in part, on the location of the UE; allocating a fully qualified tunnel endpoint identifier (FTEID) for the new PGW-U for an interface between the new PGW-U and at least one of: a Serving Gateway user data plane entity (SGW-U) that is to service all PDN flows for the UE; and an eNodeB to which the UE is connected. In at least one instance, the method can include notifying a policy server with the new PDN IP address for any Gx sessions for the UE.

The method can further include installing a General Packet Radio Service (GPRS) Tunneling Protocol user plane (GTPU) flow configuration associated with the at least one PDN flow using one or more a fully qualified tunnel endpoint identifiers (FTEIDs) for the at least one new user data plane entity that is to service the at least one PDN flow. The installing can be performed by at least one of: a Software Defined Network (SDN) controller; a Serving Gateway control plane entity (SGW-C); a Packet Data Network Gateway control plane entity (PGW-C); and a mobility controller including at least two of: Mobility Management Entity (MME) functionality, Serving Gateway control plane functionality, and Packet Data Network Gateway control plane functionality.

In some instances, the determining whether at least one existing user data plane entity servicing at least one PDN flow for the UE is to be changed can be performed by a mobility controller, wherein the mobility controller comprises functionality for at least two of: a Mobility Management Entity (MME), a Serving Gateway control plane entity, and Packet Data Network Gateway control plane entity. In other instances, the determining whether at least one existing user data plane entity servicing at least one PDN flow for the UE is to be changed can be performed by a Mobility Management Entity (MME). In still other instances, the determining whether at least one existing user data plane entity servicing at least one PDN flow for the UE is to be changed can be performed by a PDN Gateway control plane entity (PGW-C) due to one of: a failure of a PDN Gateway user data plane entity (PGW-U); and load re-balancing.

In some cases, the method can include determining by a Serving Gateway control plane entity (SGW-C) that all PDN flows for the UE are to be change to a second Serving Gateway user data plane entity (SGW-U) due to one of: a failure of a first SGW-U currently servicing all PDN flows for the UE; and load re-balancing. In still some cases, the method can include communicating, by a Mobility Management Entity (MME) to a Serving Gateway control plane entity (SGW-C) that a ULI sent to the SGW-C is sent only to aid the SGW-C in Serving Gateway user data plane entity (SGW-U) selection. In various instances, the method can be performed for at least one of: a 3rd Generation Partnership Project (3GPP) service request procedure; a 3GPP S1 handover procedure; and a 3GPP X2 handover procedure.

Example Embodiments

For purposes of understanding certain embodiments of systems and architectures disclosed herein, it is important to appreciate the technologies and data that may be associated with network communications. The following foundational information may be viewed as a basis from which the present disclosure may be properly explained.

The 3rd Generation Partnership Project (3GPP) is discussing application of Software Defined Network (SDN) concepts and control plane and user plane split to the Long Term Evolution (LTE) Evolved Packet Core (EPC) in Release 14. The EPC is often referred to interchangeably as the Evolved Packet System (EPS). Generally, SDN is an approach to building computer networks, networking equipment and software that separates and abstracts the control plane and data plane of networking systems. SDN decouples the control plane that makes decisions about where traffic is sent from the underlying data plane that forwards traffic to a selected destination. SDN allows network administrators, operators, etc. to manage network services through abstraction of lower level functionality into a virtualized network environment. As referred to herein in this Specification, the term 'plane' can refer to a separation of traffic that can traverse a network. As referred to herein in this Specification, the terms 'user plane', 'data plane' and 'user data plane' can be used interchangeably.

As referred to herein in this Specification, the terms 'virtualized network function' and 'virtual machine' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), virtualized functionality and/or any virtualized network controller, gateway, module, aggregator, combinations thereof or the like as described herein can be instantiated to execute via a hypervisor-based virtualization or a container-based virtualization of a server (e.g., blade server, rack server, stand-alone server) using the server's hardware (e.g., processor(s) and memory element(s)) and/or operating system for a given virtualized network environment.

In traditional 3GPP EPC architectures, Serving Gateways (SGWs) are data plane elements that can route and forward user data packets, while also acting as a mobility anchor for the user plane during inter-eNodeB handovers and as an anchor for mobility between LTE and other 3GPP technologies and a Packet Data Network (PDN) Gateways (PGWs) may provide UE IP connectivity access network (IP-CAN) session connectivity to external packet data networks (PDNs), such as, for example, the Internet. The PGW can also serve as policy enforcement point to manage Quality of Service (QoS), online/offline flow-based charging, data generation, deep-packet inspection and intercept. For 3G architectures, Serving GPRS Support Nodes (SGSNs) can provide features similar to SGWs and Gateway GPRS Support Nodes (GGSNs) can provide features similar to PGWs.

SDN concepts can be applied to a traditional EPC architecture to enable a control plane and user plane split architecture for the EPC, which can provide for a centralized control plane that can be hosted in a data center and a distributed data plane that can be hosted closer to Radio Access Network (RAN) nodes such as, for example evolved Node Bs (eNodeBs). By locating the data path/user plane (u-plane) forwarding elements closer to RAN nodes, low latency of communication can be provided for use cases such as tactile internet. In some cases, by locating the data path routers closer to the RAN nodes (e.g., eNodeBs), a u-plane Serving Gateway (SGW) entity can be potentially be removed from the data path and eNodeBs can directly route packet to a nearest Packet Data Network (PDN) Gateway (PGW) u-plane entity.

As referred to herein in this Specification, a PGW u-plane entity, which can manage u-plane data traffic, can be referred to interchangeably as a 'PGWU' or a 'PGW-U' a PGW control plane (c-plane) entity, which can manage control plane traffic for a corresponding PGW-U, can be referred to interchangeably a 'PGWC' or a 'PGW-C'. As referred to herein in this Specification, a SGW user plane entity, which can manage user plane data traffic, can be referred to interchangeably as a 'SGWU' or a 'SGW-U' and a SGW control plane entity, which can manage control plane traffic for a corresponding SGW-U, can be referred to interchangeably as a 'SGWC' or a 'SGW-C'.

An example control plane 110 and user data plane 130 split architecture 100 for a communication system is described with reference to FIGS. 1A-1B. Referring to FIG. 1A, FIG. 1A is a simplified block diagram illustrating architecture 100, which can facilitate providing a change in UE PDN IP address in a split control and user plane EPC architecture according to one embodiment of the present disclosure. Control plane 110 can include control plane entities such as a Mobility Management Entity (MME) 112, a Home Subscriber Server (HSS) 114, a Policy and Charging Rules Function (PCRF) 116, an SGW-C 118 and a PGW-C 124. In some embodiments, an SDN controller 128 can be provided in the control plane 110 to install and manage flows, routing, etc. across data plane entities (e.g., SGW-Us, PGW-Us) deployed in the user data plane 130. The SDN controller 128 has a full topology view of the entire network and therefore can make decisions on optimal resource allocation in the data plane in such embodiments. However, in some embodiments, SDN controller 128 can be removed from the control plane, in which SGW-C 118 and PGW-C 124 can perform SDN controller functions.

In some embodiments, the control plane entities of the control plane 110 can be located in a data center as represented by the cloud and data path switching entities (e.g., SGW-Us, PGW-Us) can be distributed throughout user data plane 130, which can interface with nodes for a RAN 160 including one or more eNodeB(s) 162a-162b, one or more wireless (e.g., WiFi) access point(s) (AP(s)) 164 and/or one or more small cell radio(s) (e.g., Home eNode B(s) 166) via a backhaul network 170. Each data plane entity (e.g., data plane routing/switching entity) can serve a set of one or more eNodeBs (e.g., locality specific). For example, in some embodiments, the control plane entities could be housed in a regional data center (e.g., covering few states or provinces) including a number of interconnected servers while the data plane routing/switching entities can be housed in servers/sites closer to the RAN nodes (e.g., one for every few districts/sectors within a region). In one embodiment, architecture 100 can reduce the data path latency by routing packets through a closest router to the RAN where a UE is connected to a node of the RAN. A user equipment (UE) 102 is also shown in FIG. 1A connected to eNodeB 162a.

In at least one embodiment in a virtualized control plane architecture, when the MME 112, SGW-C 118 and PGW-C 124 may all be operating within a same data center, the functions of two or more these network elements can be combined into a virtualized network function (VNF) or virtual machine (VM), referred to herein as a 'mobility controller'. In such an embodiment, the messaging between the MME, the SGW-C and the PGW-C can be internalized and the flow installation at the SGW-U/PGW-U (e.g., either through the SDN controller or directly) can be performed by the combined VNF or VM.

In general, RAN 160 may provide a communications interface between UE 102 and the control and user plane entities, operator IP service(s) 140 and/or internet 150 for one or more 3GPP and/or non-3GPP Internet protocol (IP) access networks. In various embodiments, 3GPP access networks can include Global System for Mobile Communications (GSM) Enhanced Data Rates for GSM (EDGE) radio access network (GERAN), a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A). In various embodiments, non-3GPP IP access networks can include wireless local access networks (WLANs) such as WiFi, Worldwide Interoperability for Microwave Access (WiMAX), Bluetooth™ or the like.

In general, eNodeBs 162a-162b can offer suitable connectivity to one or more UE (e.g., UE 102) using any appropriate protocol or technique. In general terms, eNodeBs 162a-162b represent radio access point devices that can allow UEs to connect to a wired network using 4G/LTE/LTE-A/5G or any other appropriate standard. Home eNodeB 166 can offer suitable connectivity to one or more UE using any appropriate protocol or technique. In general terms, HeNB 165 represents a radio access point device that can allow UEs to connect to a wired network using 4G/LTE/LTE-A/5G or any other appropriate standard. A HeNB can sometimes referred to as a small cell radio, small cell radio access point, a femtocell, a picocell, etc. In general, a small cell radio operates at lower power compared to a macro cell radio such as, for example, an eNodeB. Small cell radios are typically deployed in environments in which macro cell coverage is limited (e.g., in a building, etc.) and/or where user density is increased beyond the capabilities of one or more surrounding macro cell radios. Thus, small cell radios can offer connectivity to proximate users. In general terms, wireless AP 164 can offer suitable connectivity to one or more UE using any appropriate wireless protocol or technique, such as for example, WiFi.

As referred to herein in this Specification, the terms 'user', 'subscriber' and 'UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 102 can be associated with any users, subscribers, employees, clients, customers, etc. wishing to initiate a flow in architecture 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, i-Pad™, a Google Droid™ phone, an IP phone, or any other device, component, element, or object capable of initiating voice, audio, video, media, or data exchanges within architecture 100. UE 102 may also be inclusive of a suitable interface to a human user such as a microphone, a display, a keyboard, or other terminal equipment.

UE 102 may also be any device that seeks to initiate a communication on behalf of another entity or element such as a program, a database, or any other component, device, element, or object capable of initiating an exchange within architecture 100. Data, as used herein in this document, refers to any type of numeric, voice, video, media, or script data, or any type of source or object code, or any other suitable information in any appropriate format that may be communicated from one point to another. In certain embodiments, UE 102 may have a bundled subscription for network access and application services (e.g., voice), etc. Once the access session is established, the user can register for application services as well, without additional authentication requirements. Within architecture 100, IP addresses (e.g., for UE or any other element in architecture 100) can be assigned using dynamic host configuration protocol (DHCP), Stateless Address Auto-configuration (SLAAC), during default bearer activation processes, etc., or any suitable variation thereof. IP addresses used within architecture 100 can include IP version 4 (IPv4) and/or IP version 6 (IPv6) IP addresses.

In general, MME 112 is the primary control element for the EPC. Among other things, the MME can provide for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification, among others. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more nodes of the EPC. At a minimum, a default bearer is established for a given, as defined in 3GPP standards, upon initial attachment of the UE to a given RAN node. In some embodiments, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof or the like. In general, a bearer for a given UE is associated with the following at the EPC: 1) an IP address for the UE, which can be allocated from a pool of IP addresses via DHCP, SLAAC, etc.; 2) an IP address for an EPC node for a given PDN connection; and 3) a GTPU tunnel from a PGW to a SGW and a GTPU tunnel from the SGW to the eNodeB to which the UE is connected (if the UE is in a CONNECTED mode or state). A bearer can be identified using an EPS Bearer Identity (EBI).

In general, the HSS offers a subscriber database in 3GPP (e.g., GSM, LTE, etc.) environments. In one sense, the HSS can provide functions similar to those offered by an Authentication, Authorization and Accounting (AAA) element server, which can provide functions including, but not limited to, UE authentication, authorization and accounting services. When a UE moves to 3GPP access, the HSS can be aware of this location and the user's PDN anchor point (e.g., corresponding PGW-U). HSS 114 and PCRF 116 can coordinate state information for the UE (and synchronize this information) to provide mobility within the architecture. PCRF 116 may decide policy control and/or charging activities to apply to UE based on various Policy Charging and Control (PCC) rules. PCRF 116 can be configured to use user subscription information as a basis for the policy and charging control decisions. The subscription information may apply for both session-based and non-session based services. PCRF 116 may be referred to generally as a policy server. Additionally, PCRF 116 may determine PCC rules based on an application or service described to the PCRF from an application function (AF). The AF may describe applications/services to PCRF 116 that may require dynamic policy and/or charging control for one or more UE.

In various embodiments, data path switching entities (e.g., SGW-Us, PGW-Us) can be OpenFlow™ (OF) capable switching entities, denoted herein as 'OF-SWITCH+', capable of OF configuration, denoted herein as 'OF-CONFIG+', via SDN controller 128 or SGW-C 118 and PGW-C 124 (e.g., if no SDN controller is deployed). OpenFlow™ is a protocol defined by the Open Networking Foundation (ONF) that provides an interface between control plane entities and user data plane entities for programming flows (e.g., using IP addresses, tunnel endpoints, ports, etc.) for SDN architectures.

The control plane entities and the user plane entities can interface with various operator IP service(s) 140, which can, in some embodiments, include an IP multimedia subsystem (IMS) that can provide VoLTE capabilities for UE (e.g., UE 102). The control plane entities can further interface with an internet 150. In various embodiments, architecture 100 may implement user datagram protocol/IP UDP/IP connections and/or transmission control protocol/IP (TCP/IP) communication language protocol in particular embodiments of the present disclosure. However, architecture 100 can alternatively implement any other suitable communication protocol for transmitting and receiving packets. In various embodiments, operator IP service(s) 140, backhaul network 170 and internet 150 can be multiple networks interconnected via one or more network appliances, elements, gateways, etc. In one or more embodiments, operator IP service(s) 140 and backhaul network 170 may overlap with and/or be included within internet 150. Control plane entities of control plane 110 and data plane entities of data plane 130 can collectively be referred to herein in this Specification as a 'core network' or an 'EPC'. In at least one embodiment, backhaul network 170 may provide infrastructure to provide at least one differentiated, secure, reliable and manageable communication channel, which facilitates interconnections between one or more nodes of RAN 160, one or more data plane entities of data plane 130 and one or more control plane entities of control plane 110. In various embodiments, infrastructure can include, but not be limited to: network elements such as routers, switches, gateways, etc.; communication links (wired or wireless); interfaces to facilitate user data and control plane exchanges according to one or more signaling protocols; combinations thereof or the like.

Communications in a network environment are referred to herein as 'network traffic' or 'traffic', which may be inclusive of packets. A packet is a formatted unit of data and can contain both control information (e.g., source and destination address, etc.) and data, which is also known as payload. In some embodiments, control information can be included in headers and trailers for packets. Network traffic can be sent and received according to any suitable communication messaging protocols. Suitable communication messaging protocols can include a multi-layered scheme such as the Open Systems Interconnection (OSI) Model, or any derivations or variants thereof.

For example, architecture 100 may include a configuration capable of TCP/IP communications for the transmission or reception of packets in a network. Architecture 100 may also operate in conjunction with UDP/IP traffic or any other suitable protocol where appropriate and based on particular needs. Other protocols or interfaces that can be used in architecture 100 can include 3GPP DIAMETER-based protocols, remote authentication dial in user service (RADIUS) protocols, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets. As shown in FIG. 1A, an S1-MME interface, as defined in 3GPP standards, can be provided between eNodeBs 162a-162b and the control plane 110 (e.g., for interfacing with MME 112). An X2 interface, as defined in 3GPP standards, can be provided for interfacing between eNodeB 162a-162b. Additional interfaces, as defined in 3GPP standards, can include S1-U, S2a, S2b, S2c, etc. and can be provided between backhaul network 170 and the data plane 130 entities.

With architecture 100, as UE 102 moves among various eNodeBs, APs and/or HeNBs, the data path switch handling data plane traffic for the UE also needs to be re-assigned closer to the RAN node to which the UE is connected. This essentially means that during mobility procedures, the PGW-U servicing data plane traffic for the UE can change and hence the PDN IP address could potentially change (e.g., depending on the various IP pools that each PGW-U serves).

Additionally the change of the user plane entity is needed for cases such as: 1) a failure of a currently assigned user plane entity for a UE (e.g., VM failure or restart); or 2) load re-balancing (e.g., due to scale-in/out or scale-up/down of VMs or when change of U-plane identity may be needed). One Selected IP Traffic Offload (SIPTO) based solution is defined in 3GPP standards in clause 5.10.3 of Technical Specification (TS) 23.401. This standards-based solution requires PDNs to be deactivated and re-activated if a data plane PGW needs to be relocated due to UE mobility. However, such deactivations and re-activations can lead to significant signaling and latency increases across the data and control planes.

In accordance with one embodiment, architecture 100 overcomes these problems (and others) by providing for a centralized PGW-C and distributed PGW-U architecture in which a PGW control plane entity can continue to remain the same anchor point even upon UE mobility and a corresponding PGW-U entity can be changed. Change of PGW-U on UE mobility will change the UE's PDN address. Hence, providing a procedure for changing a UE PDN IP address without involving PDN deactivation and reactivation procedures will be beneficial from the viewpoint of: 1) signaling savings, for example, needless PDN deactivations can be avoided, PDN activation involves Domain Name Server (DNS) queries for PGW selection, IP-CAN session activation with PCRF, etc., which can be avoided if PDN is not deactivated; and 2) low latency path maintenance with minimum interruption in communication can be provided by architecture 100 in accordance with various embodiments described herein.

Embodiments of architecture 100 are described herein with regard to various 3GPP call changes that can be implemented to handle user plane forwarding element relocation with UE IP address change. In various embodiments, architecture 100 can provide for the ability to address cases involving changing a PGW-U and an SGW-U closer to a RAN node to which a UE connects on UE mobility; cases involving changing user plane entities by a standalone SGW-C and a standalone PGW-C (e.g., without utilizing an SDN controller); and various architectural implementations of removing the SGW-U from the data path for UE traffic.

In some embodiments, architecture 100 can provide benefits for Named Data Networking (NDN), which is a potential technology under consideration for 5G mobility. If 3GPP standards accept NDN, initial deployments may be with NDN running over IP, for eased migration. Since NDN employs name based routing with content caching, NDN routers are placed at the access network level. When NDN runs over IP, efficient switching of the routing path upon mobility will be needed. Hence, architecture 100 can provide benefits for an NDN deployment for 5G mobility.

Figure 1B:
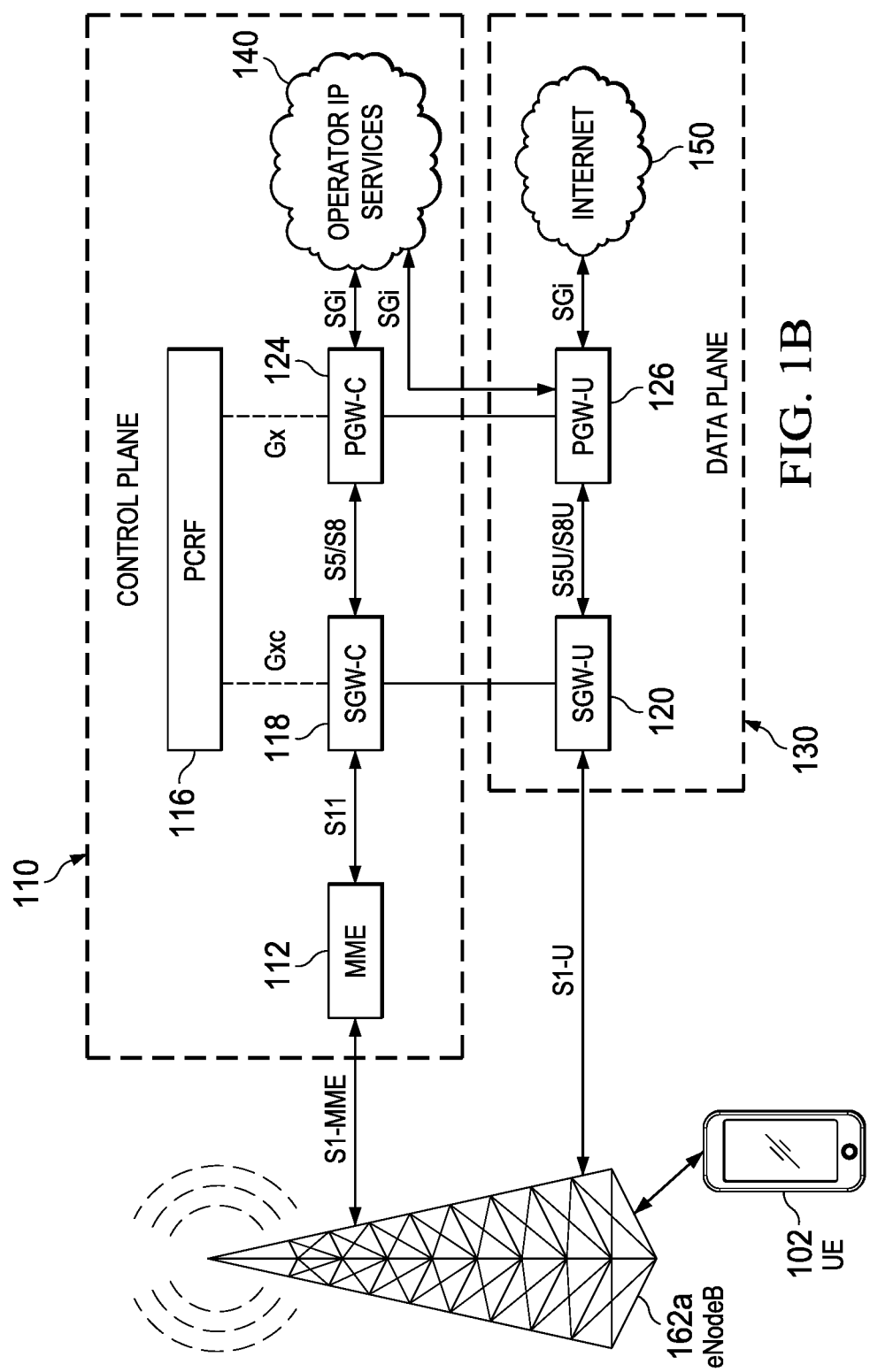
FIG. 1B is a simplified block diagram illustrating example details that can be associated with the architecture.

Referring to FIG. 1B, FIG. 1B is a simplified block diagram illustrating other example details that can be associated with architecture 100 for the control plane 110 and data plane 130 split of EPC packet gateway nodes. FIG. 1B includes eNodeB 162a, MME 112, SGW-C 118 and an SGW-U 120, PGW-C 124 and a PGW-U 126 and PCRF 116. MME 112, PCRF 116, SGW-C 118 and PGW-C 124 are included in control plane 110 and SGW-U 120 and PGW-U 126 are included in data plane 130. HSS 114, SDN controller 128, RAN 160, eNodeB 162b, wireless AP 164, Home eNodeB (HeNB) 166, and backhaul network 170 are not shown in FIG. 1B in order to illustrate other features of architecture 100.

Control plane entity SGW-C 118 can interface with user data plane entity SGW-U 120 and control plane entity PGW-C 124 can interface with user data plane entity PGW-U 126 via respective interfaces. In one embodiment, the interfaces can be standardized via 3GPP standards. As provided by 3GPP standards, MME 112 can interface with SGW-C 118 via an S11 interface and SGW-C 118 can interface with PGW-C 124 via an S5/S8 interface for control plane 110 traffic exchanged between the control plane entities. In general, the S8 interface is used when a UE is roaming between different operators and the S5 interface is a network internal interface for a given operator. Control plane traffic can be exchanged between eNodeB 162a and MME 112 via the S1-MME interface and data plane traffic can be exchanged between eNodeB 162a and SGW-U 120 via the S1-U interface (also referred to herein as S1U). SGW-U 120 and PGW-U 126 can interface via an S5U/S8U interface for data plane 130 traffic exchanged between the data plane entities. PCRF 116 can interface with SGW-C 118 via a Gxc interface and can interface with PGW-C 124 via a Gx interface.

In different use case scenarios, different nodes can potentially change during every UE (e.g., UE 102) mobility procedure including: 1) SGW-U can change along with SGW-C changing; 2) SGW-U can change without SGW-C changing; and 3) PGW-U can change. Of these different use case scenarios, Scenario 1 is already addressed by existing 3GPP EPC procedures of SGW change during mobility procedures. Embodiments of the present disclosure provide various solutions to address Scenarios 2 and 3 with some impact to UEs and/or eNodeBs by enhancing messages and procedures in the core network. In various embodiments, certain assumptions can be made regarding mobility procedures including that during mobility procedures, only the following combinations of user plane entity changes are allowed: a) only an SGW-U changes with no change in PGW-U; or 2) both an SGW-U and a PGW-U change. The case of only a PGW-U changing without an SGW-U changing is not applicable for mobility scenarios but applicable only for PGW-U failure scenarios, which are discussed in further detail herein.

Two solutions are possible for the selection of an SGW-U and/or a PGW-U during UE mobility. In a first solution, selection of an SGW-U and/or a PGW-U can be performed by the MME 112 in accordance with one embodiment of the present disclosure. During mobility procedure operations, based on a target eNodeB identifier, the MME 112 can perform a DNS look-up for an SGW-U using Tracking Area Identifier (TAI) and/or an eNodeB identifier Fully Qualified Domain Name (FQDN) to determine an SGW-U closest to the eNodeB to which a UE connects. In various embodiments, an eNodeB identifier can include an E-UTRAN Cell Global Identifier (ECGI), which can include a Public Land Mobile Node (PLMN) identifier portion and a Cell Identity portion. In one embodiment, the MME 112 can perform a DNS look-up for a PGW-U based on the Access Point Name (APN) FQDN based DNS query to determine a PGW-U closest to a selected SGW-U. In various embodiments, the MME 112 can either run a topological selection algorithm (e.g., as specified in TS 29.303) and select a PGW-U that is topologically closer to a selected SGW-U or the MME can just inform the SGW-C that it has to relocate the SGW-U and the SGW-C can inform the PGW-C that it has to relocate the PGW-U. In another embodiment, the MME 112 can be configured with a local configuration, which can be used to decide whether SGW-U/PGW-U relocation is needed based on the target TAI; thereby avoiding DNS lookups at the MME. In this alternative embodiment, the MME 112 can indicate to the SGW-C and the PGW-C that a change of the current SGW-U and/or the current PGW-U associate with a UE's flow(s) may be needed and the SGW-C and/or the PGW-C, respectively, can each select a respective new SGW-U and/or a new PGW-U to service the UE's flow(s). As referred to herein, the terms 'UE PDN IP address' and 'UE IP address' can be used interchangeably to refer to an IP address for a given UE for a PDN connection associated with a given APN. In various embodiments, an APN can be operator IP service(s) 140, internet 150 and/or any other PDN to which a given UE desires to connect.

In various embodiments, the first solution can provide various advantages including, but not limited to: the MME already supports DNS client and DNS lookup procedures in existing EPC architectures; thus, the operations for the first solution can be easily extended into the existing DNS procedures and hence will be easy to implement. However, the first solution requires that the MME be knowledgeable about user plane entity deployment and/or topology and the deployment of control/user plane split at the SGW and PGW may require an MME upgrade for current deployments.

In a second solution, data plane entity selection can be performed by each of the SGW-C 118 and the PGW-C 124 themselves. For example, in one embodiment, if an SGW and PGW are deployed in a control and user plane split architecture as shown in FIGS. 1A-1B, then a PGW-C (e.g., PGW-C 124) can be configured to subscribe for User Location Information (ULI) change notifications with the MME 112. In such an embodiment, upon every ULI change, the PGW-C 124 can be notified of the ULI change by the MME 112 through a Modify Bearer Request or Change Notification Request. When the SGW-C 118 and PGW-C 124 receive this notification, the SGW-C 118 can execute a SGW-U selection algorithm to determine if a SGW-U relocation is needed and, if so, can allocate a new SGW-U S1U Fully Qualified Tunnel Endpoint Identifier (FTEID) and a new SGW-U S5U FTEID. Similarly, PGW-C 124 can execute a PGW-U selection algorithm to determine if a PGW-U relocation is needed and, if so, allocate a new PGW-U S5U FTEID for a newly selected PGW-U and can allocate a new UE PDN IP address corresponding to the newly selected PGW-U. The new FTEID(s) can be communicated to the MME 112 in a Modify Bearer Response so that MME 112 informs the same to the eNodeB (e.g., eNodeB 162a or 162b) to which the UE is connected. As referred to herein, the terms 'FTEID' and 'F-TEID' can be used interchangeably.

In various embodiments, the second solution can provide various advantages including, but not limited to: selection of user plane entity can be local to the control plane entity and the MME need not have visibility of the user plane routing topology and, for most cases, the changes can be localized in SGW-C and PGW-C and the MME may be minimally impacted. However, for the second solution, the SGW-C and the PGW-C need to support a selection algorithm for user plane entity based on the current ULI of a given UE, which can require the PGW-C and SGW-C to subscribe for ULI reporting and hence can increase needless signaling between MME and PGW-C during every UE mobility procedure. In one embodiment, this signaling can be avoided by requesting the MME 112 to track the ULI (e.g., location) changes of UEs locally and inform the SGW-C 118 and the PGW-C 124 only when a particular UE enters a ULI (e.g., TAI, RAI, etc.) that might potentially result in a change to the SGW-U and/or the PGW-U currently servicing flow(s) for the UE. In one embodiment, the MME 112 can be locally configured with a list of ULIs that are served by each SGW-U/PGW-U within a given architecture. Thus, when a UE moves from one ULI to another, the MME 112 can query the configured list to detect whether a change of SGW-U/PGW-U is needed for the UE. Given the potential signaling overhead of the ULI signaling solution, focus on the solution of the MME 112 only informing the SGW-C 118 and PGW-C 124 when a UE enters into a ULI that may potentially cause the need for a SGW-U and/or a PGW-U change is provided herein.

As used herein in this Specification, the term 'ULI' can, in one sense, be used refer to a ULI Information Element (IE) as defined in 3GPP TS 29.274, Section 8.21, which the MME 112 can assemble based on location related information received or tracked for a given UE. The MME 112 can communicate the ULI IE to other core network elements using various messages. The term 'ULI' can also be used herein to generally refer to ULI related location information that can be used in a ULI IE. According to TS 29.274, Section 8.21, location information that can be used in a ULI IE can include Cell Global Identifier (CGI), ECGI, Service Area Identifier (SAI), Tracking Area Identifier (TAI), Routing Area Identifier (RAI) and Location Area Identifier (LAI). In general, depending on the Radio Access Technology (RAT) type (e.g., 3G, 4G, 5G etc.), the MME 112 can receive ULI related location information for a given UE, can use the location information to determine whether the UE has entered into an area (e.g., a ULI) in which a change in one or more data plane entities (e.g., SGW-U and/or PGW-U) might be needed, can assemble a ULI IE based on the received information and can pass the ULI IE to one or more other core network elements, as discussed for the various embodiments described herein.

As noted previously, the deployment of SDN controller 128 can be optional for some embodiments. In embodiments in which there is no SDN controller 128 configured for architecture 100, an SGW-C (e.g., SGW-C 118) and a PGW-C (e.g., PGW-C 124) may locally provide a user plane TEID allocation and directly install the flows on the user plane entity/entities, depending on configuration.

Each PGW-U deployed for architecture 100 (e.g., PGW-U 126) can serve a pool of PDN IP addresses. In cases in which, a PGW-C (e.g., PGW-C 124) decides to change the PGW-U for a given UE/subscriber (e.g., UE 102), if a new PGW-U doesn't serve the UE's PDN address IP pool, then the PGW-C can determine to change the PDN IP address for the UE as well. In one embodiment, the PGW-C can select an IP from the IP pool served by the selected PGW-U (through DHCP, SLAAC or some other means). In such an embodiment, apart from signaling the changed UE IP address to the MME 112 and then further down to the UE, the PGW-C can also update the Gx session via PCRF 116 with the change of the UE's IP address.

In at least one embodiment, the update of a PDN IP Address for a UE IP-CAN session over the Gx interface can be performed through a Credit Control Request (CCR)-Update (CCR-U) and a Credit Control Answer (CCA) exchange between the PGW-C and the PCRF. In at least one embodiment the CCR-U message can be to be enhanced to carry to the new PDN IP Address for the UE.

FIGS. 2A-2B, 3A-3C, 4A-4B, 5A-5B, 6A-6B and 7A-7B, illustrate various simplified interaction diagrams for various call flows based involving different possible solutions of the MME 112 only informing the SGW-C 118 and the PGW-C 124 when a given UE (e.g., UE 102) enters into a ULI (e.g., a location) that may potentially cause the need for a user plane entity (e.g., SGW-U and/or PGW-U) change, as discussed herein, in which the change of a user plane entity can be performed for UE 102 that results a change in UE 102 PDN IP address without tearing down (e.g., deactivating and re-activating) the PDN connection for UE 102.

Figure 2A:
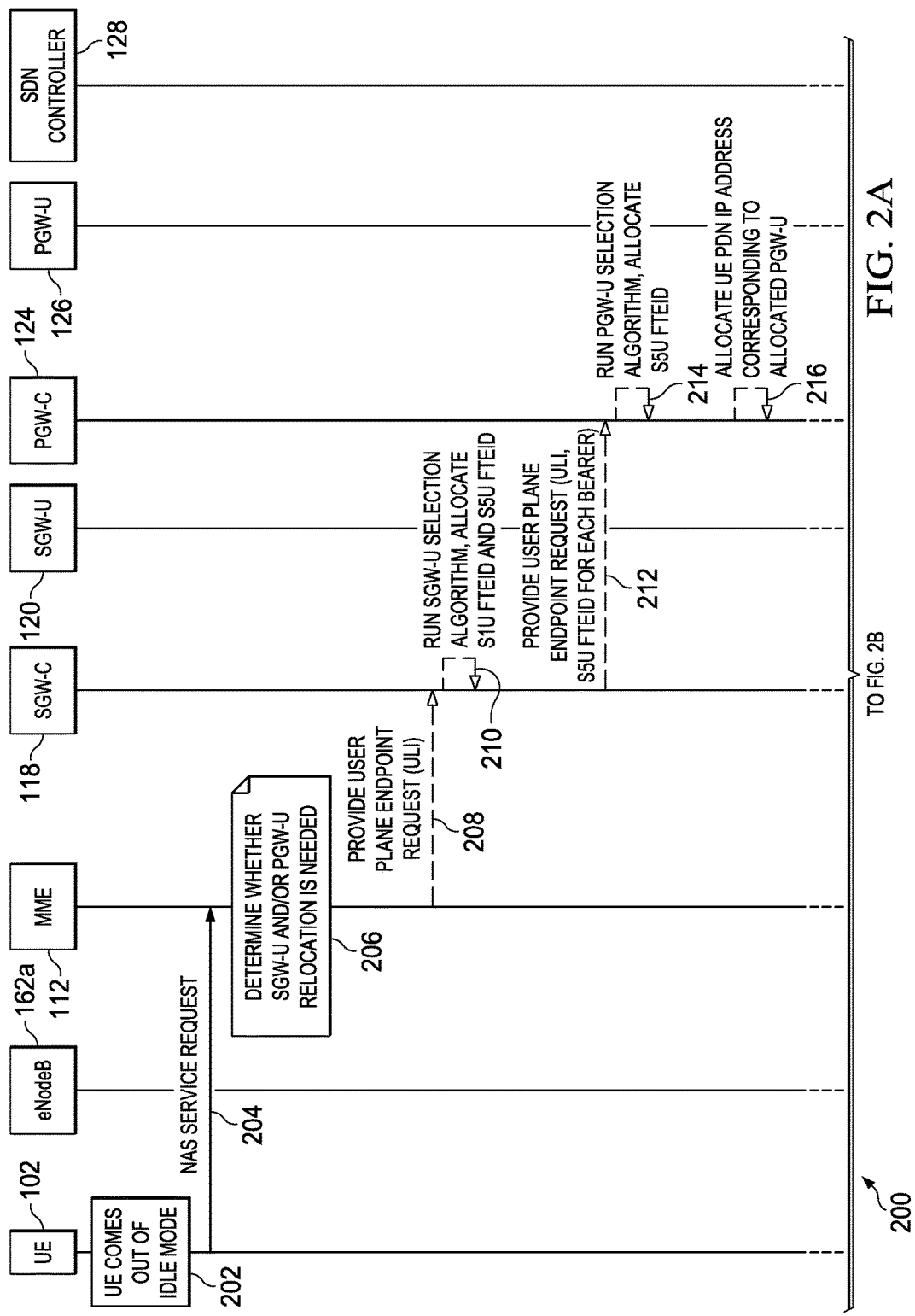
FIGS. 2A-2B is a simplified interaction diagram illustrating example details that can be associated an example call flow for a modified service request procedure in accordance with one potential embodiment.
Figure 2B:
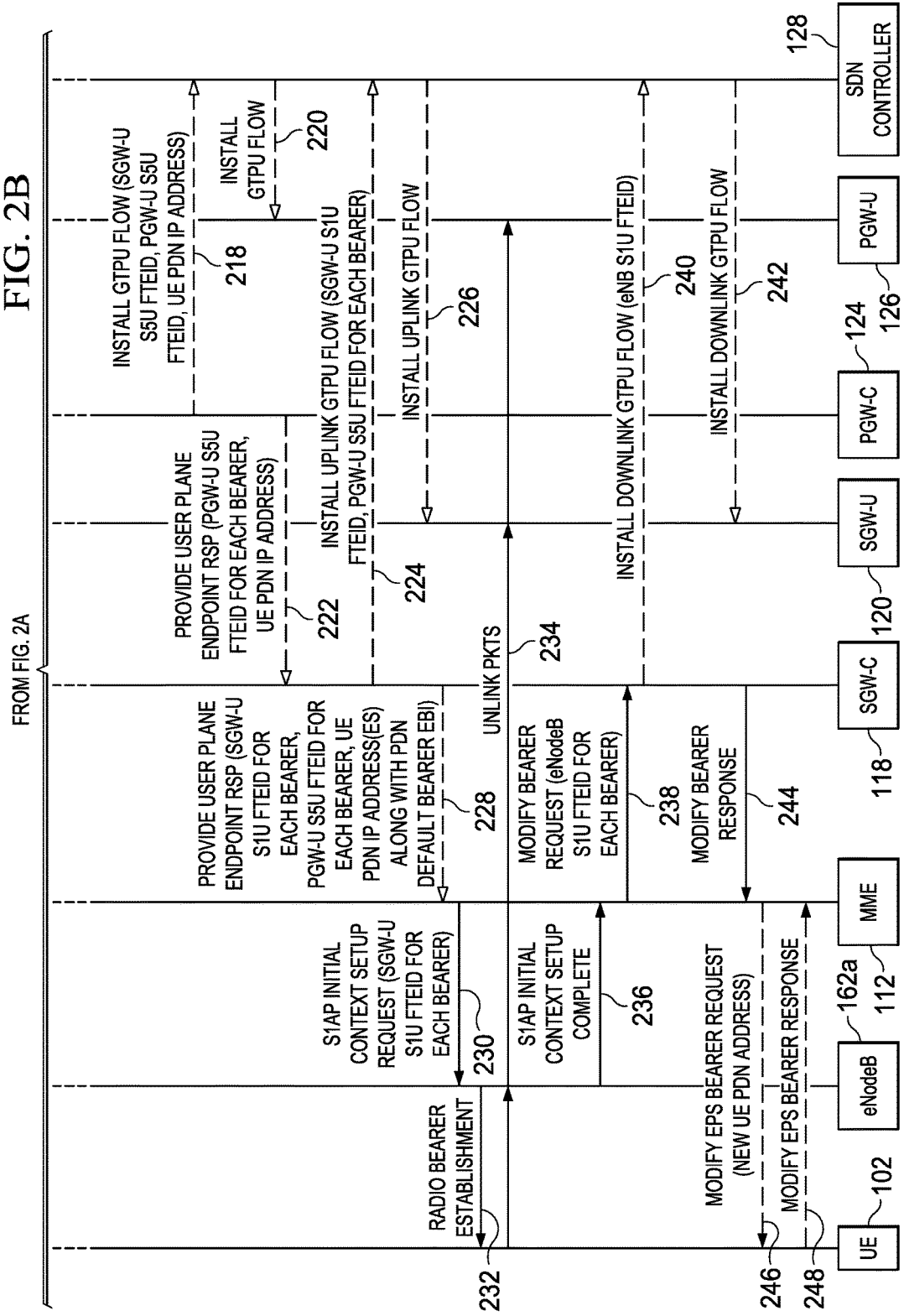

Referring to FIGS. 2A-2B, FIGS. 2A-2B is a simplified interaction diagram 200 illustrating example details that can be associated with an example call flow for a modified service request procedure for a split control and user plane architecture in which a change of a user plane entity is provided during a mobility procedure in accordance with one potential embodiment. FIGS. 2A-2B include UE 102, eNodeB 162*a*, MME 112, SGW-C 118, SGW-U 120, PGW-C 124, PGW-U 126 and SDN controller 128. The embodiment of the solution shown in FIGS. 2A-2B can be implemented for a use case involving changing the user plane entity closer to a RAN node (e.g., eNodeB 162*a*) serving UE 102 when the UE comes out of an idle mode. For the embodiment shown in FIGS. 2A-2B, it is assumed that SGW-U 120 and PGW-U 126 are the data plane entities topologically located nearest to eNodeB 162*a*. Note user plane entities that provided data plane connectivity for UE 102 prior to UE 102 entering into the idle mode are not illustrated in FIGS. 2A-2B.

Operations and interactions associated with embodiment of the solution shown in FIGS. 2A-2B can begin at 202 in which UE 102 comes out of an idle mode and sends a NAS Service Request to eNodeB 162*a* at 204, which forwards the NAS Service Request to MME 112. The eNodeB 162*a* can include a ULI (e.g., TAI+ECGI) for eNodeB 162*a* in the NAS Service Request forwarded to MME 112. A determination of whether SGW-U and/or PGW-U relocation is needed during the Service Request procedure based on user/UE location can be performed by the MME 112 at 206. In various embodiments during operation, the MME 112 can perform a look-up on a local configuration table or can perform a Tracking Area Identity (TAI) FQDN based DNS query to determine if a SGW-U and/or PGW-U change (e.g., relocation) is needed.

In at least one embodiment, a DNS query can be performed as described in Internet Engineering Task Force (IETF), Request For Comments (RFC) 6763 such that MME 112 can query for a node service name from an external DNS service or cache (e.g., a local cache stored at MME 112). In one embodiment, the DNS service or cache can be configured with a list of ULI sets that select a same SGW-U (e.g., each set maps to one SGW-U) as a node name. Based on a response from the DNS service or cache, MME 112 can parse the response and store a mapping of ULI set to SGW-U change required. It should be noted that performing a DNS query as facilitated by IETF RFC 6763 is only one example of a DNS query that can be performed by MME 112 to determine whether a change of a user plane entity is needed for a given UE (e.g., UE 102). Other queries can be performed by MME within the scope of the teachings of the present disclosure.

Note that MME 112 is only interested in determining if a change of a user plane entity (e.g., SGW-U and/or PGW-U) is needed for UE 102. The actual selection of the user plane entity may still be performed by the SGW-C and/or PGW-C as described herein. Only if the MME 112 identifies that the SGW-U and/or PGW-U needs to be relocated at 206, may it begin the dashed-line messaging and/or procedures shown in the embodiment shown in FIGS. 2A-2B.

For FIGS. 2A-2B, the dashed-lines having open arrows are new messages and/or procedures that can be provided for the embodiment of the solution shown in FIGS. 2A-2B; the dashed-lines having closed arrows (e.g., Modify EPS Bearer Request and Response) are existing messages and/or procedures prescribed by 3GPP standards in TS 23.401, Section 5.3.4 that are to be modified to include new parameters for this embodiment; and the solid-lines having arrows are existing messages as prescribed by 3GPP standards in TS 23.401, Section 5.3.4.

The embodiment shown in FIGS. 2A-2B can include provisioning new 'Provide User Plane Endpoint' messaging for architecture 100 to enable changing user plane entities, when needed, for a given UE (e.g., UE 102). TABLE 1, shown below, illustrates an example format and example details for Provide User Plane Endpoint Request messaging that can be provided in accordance with various embodiments of the present disclosure. TABLE 2, shown below, illustrates an example format and example details for Provide User Plane Endpoint Response messaging that can be provided in accordance with various embodiments of the present disclosure. TABLE 3, shown below, illustrates an example format and example details for a modified Bearer Context IE format that can be provided in accordance with various embodiments of the present disclosure. For TABLES 1-3, the Presence (P) of each IE for a given message can be Mandatory (M), Conditional (C) or Optional (O) as described by the Condition/Comment associated with each IE. Each IE can correspond to an IE type and Instance (Ins.) as generally provided by 3GPP TS 29.274.

TABLE 1

PROVIDE USER PLANE ENDPOINT
REQUEST MESSAGE DETAILS

| Information elements | P | Condition/Comment | IE Type | Ins. |
|---|---|---|---|---|
| User Location Information (ULI) | M | The MME/SGSN shall include this IE on the S4/S11 interface for the Service Request and the S1 handover procedures. The MME shall include ECGI, SGSN shall include CGI/SAI. The SGW shall include this IE on S5/S8 if it receives the ULI from MME/SGSN and has decided to change the SGW-U for a UE. | ULI | 0 |
| Indication Flags | C | This IE shall be included if any one of the applicable flags is set to 1. Applicable flags: DontCommit: This flag shall be set to 1 on the S4/S11 interface if the request corresponds to S1 handover procedure. | Indication | 0 |
| Private Extension | O | This IE may be sent on the S5/S8, S4/S11 and S2a/S2b interfaces. | Private Extension | VS |

TABLE 2

PROVIDE USER PLANE ENDPOINT
RESPONSE MESSAGE DETAILS

| Information elements | P | Condition/Comment | IE Type | Ins. |
|---|---|---|---|---|
| Bearer Context(s) Modified | M | The SGW-C/PGW-C shall include this IE with the list of allocated FTEID for each bearer context. | Bearer Context | 0 |
| Private Extension | O | This IE may be sent on the S5/S8, S4/S11 and S2a/S2b interfaces. | Private Extension | VS |

TABLE 3

BEARER CONTEXT MODIFIED IE FORMAT DETAILS

| Octets 1 | Bearer Context IE Type = 93 (decimal) |
|---|---|
| Octets 2 and 3 | Length = n |
| Octets 4 | Spare and Instance fields |

| Information elements | P | Condition/Comment | IE Type | Ins. |
|---|---|---|---|---|
| EPS Bearer ID | M | | EBI | 0 |
| S1-U SGW F-TEID | C | This IE shall be sent on the S11 interface if the S1-U SGW FTEID towards the eNB is changed | F-TEID | 0 |
| S5/8-U SGW F-TEID | C | This IE shall be sent on the S5/S8 interfaces for a SGW-U change during Handover/TAU/Service Request/SGW-U restoration/load balancing procedures | F-TEID | 1 |
| S5/8-U PGW F-TEID | C | This IE shall be sent on the S5/S8 interfaces for a PGW-U change during Handover/TAU/Service Request/PGW-U restoration/load balancing procedures | F-TEID | 2 |

In various embodiments, MME 112 can perform a look-up using a local configuration table or can perform a TAI FQDN based DNS query as described for various embodiments discussed herein to determine if a SGW-U and/or a PGW-U relocation is needed. At 208, it is assumed that MME 112 determines that a relocation of data plane entities is needed for UE 102 and MME 112 sends a Provide User Plane Endpoint Request (Req) message to SGW-C 118 including the ULI for eNodeB 162a/UE 102.

At 210, SGW-C 118 performs an SGW-U selection algorithm based on the ULI for eNodeB 162a/UE 102 to determine the SGW-U (e.g., SGW-U 120) nearest to UE 102 and eNodeB 162a and allocates a new S1U FTEID and a new S5U FTEID for SGW-U 120 for each UE 102 bearer(s). In one embodiment, each SGW-C for a given architecture can be configured with location information for each SGW-U available for a given communication system deployment. In such an embodiment, a look-up and comparison search on can be performed on the SGW-U location information configured for a given SGW-C using the ULI included in a Provide User Plane Endpoint message to select an SGW-U nearest to a given UE and eNodeB serving the UE.

Upon performing the selecting and allocating at 210, SGW-C 118 sends PGW-C 124 a Provide User Plane Endpoint Request (Req) message at 212 including the ULI and the S5U FTEID for each UE 102 bearer(s). At 214, PGW-C 124 performs a PGW-U selection algorithm to determine the PGW-U (e.g., PGW-U 126) nearest to eNodeB 162a and allocates a new S5U FTEID for PGW-U 126 for each UE 102 bearer(s).

In at least one embodiment, allocating a user plane FTEID can include: 1) selection of a given data plane entity (e.g., SGW-U or PGW-U) by a given control plane entity; 2) determining the IP address of the selected data plane entity (e.g., which the SGW-C or PGW-C can determine based on configuration); and 3) allocating a 32-bit number (e.g., TEID) from a pool of available numbers that have not been allocated to any other session for the same data plane entity. Thus the allocated user plane FTEID includes the IP address and allocated TEID.

In one embodiment, each PGW-C for a given deployment architecture for a communication system can be configured with location information for each PGW-U available in the architecture. In such an embodiment, a look-up and comparison search on can be performed on the PGW-U location information configured for a given PGW-C to determine a PGW-U nearest to a given eNodeB serving a given UE. In various embodiments, the PGW-U selection algorithm can use the ULI or a new SGW-U S5U FTEID for a particular bearer included in a Provide User Plane Endpoint message as an identifier for selecting a PGW-U nearest to a given RAN node serving a given UE. Thus, in some embodiments, each PGW-C for a given deployment architecture can be configured with SGW-U S5U FTEID information, which can be used to identify a selected SGW-U that can facilitate selection of a corresponding PGW-U.

At 216, PGW-C 124 allocates a new PDN IP address for UE 102 for the corresponding PGW-U 126 selected at 214 for the UE 102 PDN connection to a given APN (e.g., operator IP service(s) 140, internet 150, etc.). Thus, for allocation operations performed at a given PGW-C (e.g., PGW-C 124), the operations can further include, the PGW-C allocating a new PDN IP address for a given UE from a pool of available IP addresses served by the selected PGW-U using DHCP, SLAAC or some similar allocation means. At 218, PGW-C 124 signals SDN controller 128 to install an uplink and downlink GTP user plane (GTPU) flow(s) for each UE 102 bearer(s) using the SGW-U S5U FTEID and PGW-U S5U FTEID for each UE 102 bearer(s) and the new UE 102 PDN IP address. At 220, SDN controller 128 installs the uplink/downlink GTPU flow(s) for each UE 102 bearer(s) to be serviced by PGW-U 126.

In at least one embodiment, if OpenFlow™ is used as the protocol for managing flows, then existing "ofp_flow_mod" commands or other commands, as defined in OpenFlow™ Switch Specification 1.5.1 with extensions for GTP tunneling can be used to install, modify and/or delete flows. As generally provided in Switch Specification 1.5.1, an OpenFlow™ enabled switch (e.g., SGW-U, PGW-U) can include one or more flow tables and a group table, which can be used to perform packet lookups and forwarding, and one or more OpenFlow™ channels, which can facilitate exchanges with an external controller (e.g., SDN controller 128, SGW-C 118 or PGW-C 124) to manage the switch. A flow table can include flow entries that describe packet forwarding to a port (e.g., physical, logical, etc.). A group table can include flow entries that describe packet forwarding to a group, which can represent sets of actions for flooding and/or more complex packet forwarding schemes.

In various embodiments, depending on deployment architecture, any of SDN controller 128, SGW-C 118, PGW-C 120 and/or an integrated mobility controller (e.g., as discussed in further detail below) can install, modify and/or delete flow entries for one or more flow tables and/or a group table for a given SGW-U and/or PGW-U to manage one or more UE data plane flow(s) for a given deployment architecture. As referred to herein, the terms 'installing' and 'programming' and variations thereof can be used interchangeably in reference to various flows described herein.

At 222, PGW-C 124 sends SGW-C 118 a Provide User Plane Endpoint Response (Rsp) message including the PGW-U S5U FTEID for each UE 102 bearer(s) and the new UE 102 PDN IP address. At 224, SGW-C 118 signals SDN controller 128 to install an uplink GTP user plane (GTPU) flow(s) for each UE 102 bearer(s) using the SGW-U S1U FTEID and PGW-U S5U FTEID for each UE 102 bearer(s) to be serviced by SGW-U 120 and PGW-U 126. At 226, SDN controller 128 installs the uplink GTPU flow(s) for SGW-U 120.

At 228, SGW-C 118 sends MME 112 a Provide User Plane Endpoint Response (Rsp) message including the SGW-U S1U FTEID and PGW-U S5U FTEID for each UE 102 bearer(s) as well as PDN IP address(es) along with a corresponding PDN default bearer EBI for each APN to which UE 102 may be connected. In various embodiments, a given UE can be connected to multiple APNs such that the UE can be allocated a PDN IP address for each APN. For the embodiment shown in FIGS. 2A-2B, it is assumed that the PDN IP address(es) included in the Provide User Plane Endpoint Response message includes at least the new PDN IP address allocated to UE 102 at 216.

At 230, MME 112 sends eNodeB 162a an S1 Application Protocol (S1AP) Initial Context Setup Request message including the SGW-U S1U FTEID for each UE 102 bearer(s) to be serviced by SGW-U 120. At 232, eNodeB 162a sends UE 102 Radio Bearer Establishment procedure messaging, as prescribed by 3GPP TS 23.401, Section 5.3.4.1 to establish user data plane radio bearer(s) for UE 102. At 234, UE 102, via eNodeB 162a, sends uplink data packets to PGW-U 126, which can forward the packets to one or more entities of a given APN, and at 236 eNodeB 162a sends MME 112 S1AP Initial Context Setup Complete messaging. In one embodiment, PGW-U 126 can send the uplink packets to one or more entities of a given APN (e.g., internet 150 or operator IP service(s) 140) for the PDN connection for UE 102 based on control information included within and/or appended to one or more of the packet(s) via one or more headers or trailers for one or more of the packet(s); however, this is not shown in the embodiment of FIGS. 2A-2B in order to illustrate other features of the embodiment. At 238, MME 112 sends SGW-C 118 Modify Bearer Request messaging including an eNodeB S1U FTEID for each UE 102 bearer(s) serviced by eNodeB 162a. At 240, SGW-C 118 signals SDN controller 128 to install a downlink GTP user plane (GTPU) flow(s) for each bearer(s) for UE 102 using the eNodeB 162a S1U FTEID for each UE 102 bearer(s). At 242, SDN controller 128 installs the downlink GTPU flow(s) for SGW-U 120. At 244, SGW-C 118 sends a Modify Bearer Response to MME 112 indicating completion of the installation of the downlink GTPU flow(s) for the UE 102 bearer(s).

For the embodiment shown in FIGS. 2A-2B, the change of UE 102 PDN IP address is communicated to UE 102 via a Modify EPS Bearer Request (Req) procedure by carrying the new UE 102 PDN IP address as a new parameter in enhanced Modify EPS Bearer Req messaging as shown at 246. At 248, UE 102 sends MME 112 (via eNodeB 162a) Modify EPS Bearer Response (Rsp) messaging indicting successful modification of the EPS bearer(s) for UE 102 for the PDN connection. In at least one embodiment, Modify EPS Bearer Rsp messaging can be enhanced to include a new cause code such as, for example, 'UE PDN IP address change accepted' or the like to inform the network that the UE successfully updated the provided address. Regardless of whether a new cause code is included in the response messaging or not, the Modify EPS Bearer Rsp from UE 102, as provided via embodiments of architecture 100 for changing the UE PDN IP address without tearing down the PDN connection, is new to the UE and is thus illustrated as a dashed-line having a closed arrow. Accordingly, the embodiment of the solution shown in FIGS. 2A-2B illustrates that a UE PDN IP address can be changed without tearing down a PDN connection for the UE through the use of new Provide User Plane Endpoint messaging.

Figure 3A:
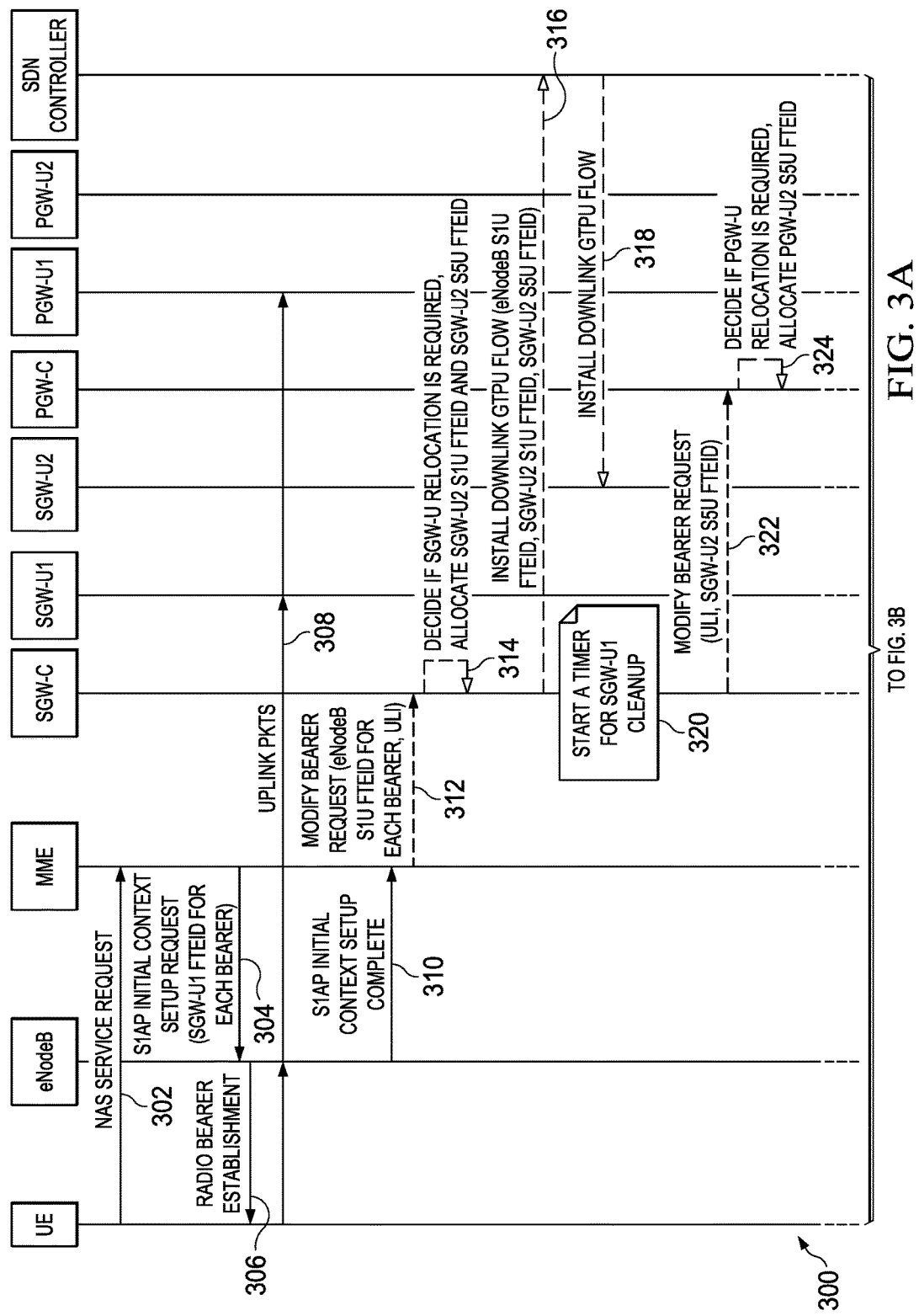
Figure 3B:
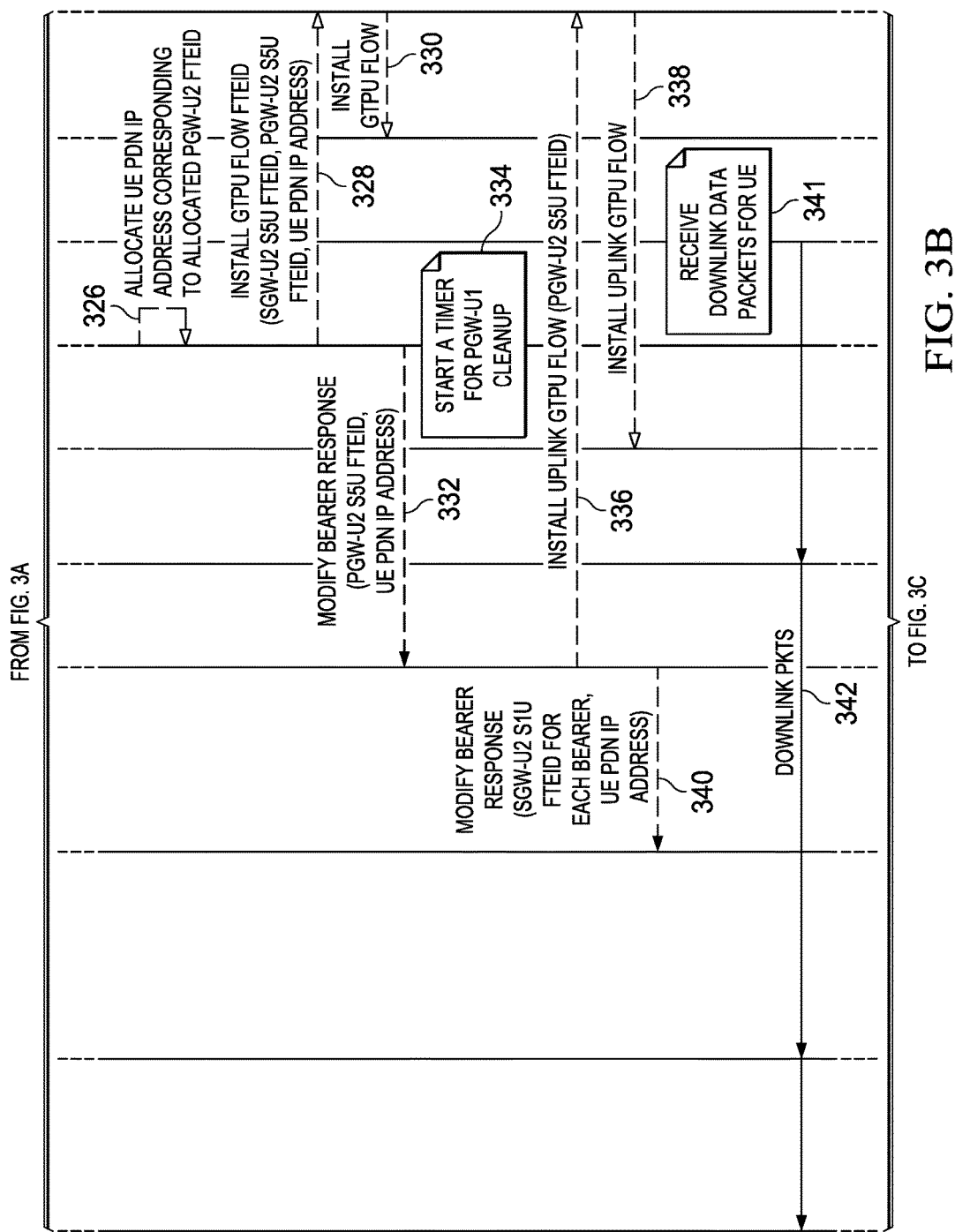

Referring to FIGS. 3A-3C, FIGS. 3A-3C is a simplified interaction diagram 300 illustrating example details that can be associated with an example call flow for a modified service request procedure for a split control and user plane architecture in which a change of a user plane entity is provided during a mobility procedure without provisioning new 'Provide User Plane Endpoint' messaging for architecture 100 in accordance with one potential embodiment. Thus, the embodiment shown in FIGS. 3A-3C illustrates an alternative to the embodiment of the solution shown in FIGS. 2A-2B such that the impact to the core network is reduced in comparison to the embodiment of the solution shown in FIGS. 2A-2B. FIGS. 3A-3C include UE 102, eNodeB 162a, MME 112, SGW-C 118, PGW-C 124 and SDN controller 128. FIGS. 3A-3C further include a first PGW-U (PGW-U1), a second PGW-U (PGW-U2), a first SGW-U1 and a second SGW-U (SGW-U2).

The embodiment shown in FIGS. 3A-3C illustrates how the 3GPP standards-based Service Request procedure can be enhanced to support a change of a SGW-U and/or a PGW-U user data plane entity using an E-RAB Modify Request towards the eNodeB 162a at the end of a Service Request procedure to inform the change of the SGW-U user plane entity for UE 102 (e.g., with impact to RAN nodes). The embodiment shown in FIGS. 3A-3C can help to ensure that there is a minimal impact to core network call flows.

For the embodiment shown in FIGS. 3A-3C, the dashed-lines having open arrows are new messages and/or procedures that can be provided for this solution; the dashed-lines having closed arrows (e.g., E-RAB Modify Request, Modify EPS Bearer Request, Response, etc.) are existing messages and/or procedures that are to be modified to include new parameters for the embodiment shown in FIGS. 3A-3C; and the solid-lines having arrows are existing messages as prescribed by 3GPP standards. It is assumed for the embodiment shown in FIGS. 3A-3C that SGW-U1 and PGW-U1 are the current or old user data plane entities serving flows (e.g., uplink and downlink transmissions) for UE 102 and that SGW-U2 and PGW-U2 are the new user data plane entities to which the flows for UE 102 will be relocated. Note for the embodiment shown in FIGS. 3A-3C, until a new PDN IP address is communicated to UE 102, both uplink and downlink transfers can occur using the old UE PDN IP address through SGW-U1 and PGW-U1.

At 302, UE 102 sends a NAS service request to eNodeB 162a, which forwards the NAS Service Request to MME 112. In one embodiment, eNodeB 162a can include a ULI (e.g., TAI+ECGI) for eNodeB 162a in the NAS Service Request forwarded to MME 112. At 304, MME 112 sends an S1AP Initial Context Setup Request message including the SGW-U1 S1U FTEID for each UE 102 bearer(s) currently serviced by SGW-U1 to the eNodeB 162a. At 306, eNodeB 162a sends UE 102 Radio Bearer Establishment procedure messaging, as prescribed by 3GPP TS 23.401, Section 5.3.4.1 to establish user data plane radio bearer(s) for UE 102. At 308, UE 102, via eNodeB 162a, sends uplink data packets to SGW-U1 and PGW-U1, which can forward the uplink packets to a given APN (e.g., internet 150, operator IP service(s) 140, etc.) for the PDN connection for UE 102. The forwarding of the uplink packets is not shown in the embodiment FIGS. 3A-3C in order to illustrate other features of the embodiment. At 310, eNodeB 162a sends MME 112 S1AP Initial Context Setup Complete messaging including an eNodeB S1U FTEID for each UE 102 bearer(s) serviced by eNodeB 162a. At 312, MME 112 sends SGW-C 118 Modify Bearer Request messaging including the eNodeB S1U FTEID for each UE 102 bearer(s) serviced by eNodeB 162a and the ULI for UE 102/eNodeB 162a.

For the embodiment of FIGS. 3A-3C, it is assumed that SGW-C 118 and PGW-C 124 can each respectively determine whether a relocation is needed by using either location information configured at each respective control plane entity (e.g., TAI, etc. configured and associated with data plane entities to determine locations of the data plane entities) or by using a TAI FQDN and/or eNodeB FQDN based DNS query for SGW-U selection or a requested APN FQDN based DNS query for PGW-U selection.

Accordingly, at 314 SGW-C 118 can decide if a SGW-U relocation is needed and, for purposes of the embodiment shown in FIGS. 3A-3C, SGW-C 118 decides that a SGW-U relocation is needed for servicing flows for UE 102. Upon determining that the SGW-U relocation is needed, SGW-C 118 determines (e.g., using the ULI) that SGW-U2 is the data plane entity nearest to eNodeB 162a serving UE 102 using techniques as discussed herein and allocates an SGW-U2 S1U FTEID and an SGW-U2 S5U FTEID for each UE 102 bearer(s). At 316, SGW-C 118 signals SDN controller 128 to install a downlink GTP user plane (GTPU) flow(s) for each UE 102 bearer(s) using the eNodeB S1U FTEID for eNodeB 162a, the SGW-U2 S1 FTEID and the SGW-U2 S5 FTEID for each UE 102 bearer(s). At 318, SDN controller 128 installs the downlink GTPU flow(s) for SGW-U2. At 320, SGW-C 118 starts a timer that can be used to trigger cleanup of any flows, flow information, etc. for any UE 102 flows upon expiration of the timer. By cleanup, it is meant that any information, associations, etc. stored or cached at SGW-C 118 for any UE 102 flows previously installed at SGW-U1 can be removed upon expiration of the timer.

At 322, SGW-C 118 sends a Modify Bearer Request to PGW-C 124 including the ULI and the SGW-U2 S5U FTEID for each UE 102 bearer(s). Note inclusion of the ULI in a Modify Bearer Request sent to a given PGW-C, without the PGW-C requesting ULI reporting can generate unnecessary signaling from a SGW-C to the PGW-C. To avoid this, one embodiment can provide that whenever the MME includes the ULI in a Modify Bearer Request to aid SGW-C in performing a user plane entity selection, without the PGW-C actually registering for ULI reporting, the MME can set an indication bit (e.g., a flag) in the messaging (e.g., at 312) indicating that the ULI inclusion is to aid to the SGW-C in selecting a SGW-U and the SGW-C can set an indication bit in the messaging at 322 indicating that ULI inclusion is to aid the PGW-C in selecting a PGW-U.

At 324, PGW-C 124 can decide whether a PGW-U relocation is needed and, for purposes of the embodiment shown in FIGS. 3A-3C, PGW-C 124 decides that a PGW-U relocation is needed for servicing flows for UE 102. Upon determining that the PGW-U relocation is needed, PGW-C 124 determines that PGW-U2 is the data plane entity nearest to eNodeB 162a serving UE 102 using techniques as discussed herein and allocates a PGW-U2 S5U FTEID for each UE 102 bearer(s). In various embodiments, the PGW-C 124 can either use the ULI or it can use an SGW-U2 S5U FTEID for a given bearer as an identifier to select the target PGW-U2 for relocation. At 326, PGW-C 124 allocates a new PDN IP address for UE 102 for the corresponding PGW-U2 allocated to service the flows for UE 102 for the UE's PDN connection to the given APN. By 'servicing' a flow for a given UE by a particular entity, it is meant that the entity can provide routing for the flow, can apply one or more different QoS, priority, etc. to the flow, combinations thereof or the like. In one embodiment, PGW-C 124 can allocate a new PDN IP address for UE 102 from a pool of IP addresses served by the selected PGW-U2 using DHCP, SLAAC or some similar allocation means. At 328, PGW-C 124 signals SDN controller 128 to install a downlink and uplink GTPU flow(s) for each UE 102 bearer(s) using the SGW-U2 S5U FTEID and PGW-U2 S5U FTEID for each UE 102 bearer(s) and the new UE 102 PDN IP address. At 330, SDN controller 128 installs the downlink/uplink GTPU flow(s) for each UE 102 bearer(s) to be serviced by PGW-U2.

At 332, PGW-C 124 sends Modify Bearer Response messaging to SGW-C 118 including the PGW-U2 S5U FTEID for each UE 102 bearer(s) and the new UE 102 PDN IP address. At 334, PGW-C 124 starts a timer that can be used to trigger cleanup of any flows, flow information, etc. for any UE 102 previously installed at PGW-U1 upon expiration of the timer. At 336, SGW-C 118 signals SDN controller 128 to install an uplink GTPU flow(s) for each UE 102 bearer(s) using the PGW-U2 S5U FTEID for each UE 102 bearer(s). At 338, SDN controller 128 installs the uplink GTPU flow(s) for SGW-U2. At 340, SGW-C 118 sends MME 112 Modify Bearer Response messaging including the SGW-U2 S1U FTEID for each UE 102 bearer(s) and the new UE 102 PDN IP address.

At 341, it is assumed that PGW-U1 receives downlink packets for UE 102 for the PDN connection and at 342 the downlink packets are sent to UE 102 via SGW-U1, MME 112 and eNodeB 162a. As discussed above, until the new UE 102 PDN IP address is communicated to UE 102 any packet flows for UE 102 can be serviced via PGW-U1 and SGW-U1.

Turning to 344, MME 112 can send an E-UTRAN RAB (E-RAB) Modify Request to eNodeB 162a to change the SGW-U1 S1U FTEID for each UE 102 bearer(s) to the SGW-U2 S1U FTEID for each UE 102 bearer(s). Note per 3GPP TS 36.413, Section 8.2.2.2 when an existing E-RAB Modify Request is used to change the SGW-U S1U FTEID at a given eNodeB, a Non-access Stratum (NAS) Protocol Data Unit (PDU) included in the Request is ignored by the eNodeB. In at least one embodiment, this eNodeB behavior can be changed such that if a valid NAS message is included then the eNodeB can forward that request to a given UE for which an SGW-U was relocated. For the embodiment shown in FIGS. 3A-3C, the E-RAB Modify Request sent to eNodeB 162a can be enhanced to include a NAS PDU carrying a Modify EPS Bearer Request with the new UE 102 PDN IP address. Upon receiving the NAS PDU, eNodeB 162a can initiate a Modify EPS Bearer Request procedure by carrying the new UE 102 PDN IP address in Modify EPS Bearer Request messaging sent to UE 102 and responding to MME 112 with E-RAB Modify Rsp messaging as shown at 346. At 348, UE 102 sends MME 112 (via eNodeB 162a) Modify EPS Bearer Response (Rsp) messaging indicting successful modification of the EPS bearer(s) for UE 102 for the PDN connection.

Once UE 102 receives the new PDN IP address, it can start using the new IP address for uplink communications. At 350, UE 102 sends uplink packets (pkts) for a particular bearer for the PDN connection to eNodeB 162a. The eNodeB 162a sends the packets to SGW-U2 using the SGW-U2 S1U FTEID for the bearer and SGW-U2 sends the packets to PGW-U2 using the PGW-U2 S5U FTEID for the bearer and PGW-U2 can forward the packets (not shown) to one or more entities of the APN for the PDN connection based on control information included within and/or appended to one or more of the packet(s) via one or more headers or trailers for one or more of the packet(s). At 352, it is assumed that the timer started for SGW-C 118 expires and any SGW-U1 flow information cached at SGW-C 118 for UE 102 can be deleted by SGW-C 118. At 354, it is assumed that the timer started for PGW-C 124 expires and any PGW-U1 flow information cached at PGW-C 124 for UE 102 can be deleted by PGW-C 124.

Accordingly, the embodiment of the solution shown in FIGS. 3A-3C illustrates that a UE PDN IP address can be changed without tearing down a PDN connection for the UE without the use of any of the new Provide User Plane Endpoint messaging illustrated in FIGS. 2A-2B. Thus, the embodiment of the solution shown in FIGS. 3A-3C can be implemented for a given deployment architecture with reduced impact to the core network than may be caused when using an embodiment that implements the new Provide User Plane Endpoint messaging; however, signaling may be increased for the architecture if no such new messaging is implemented.

Figure 4A:
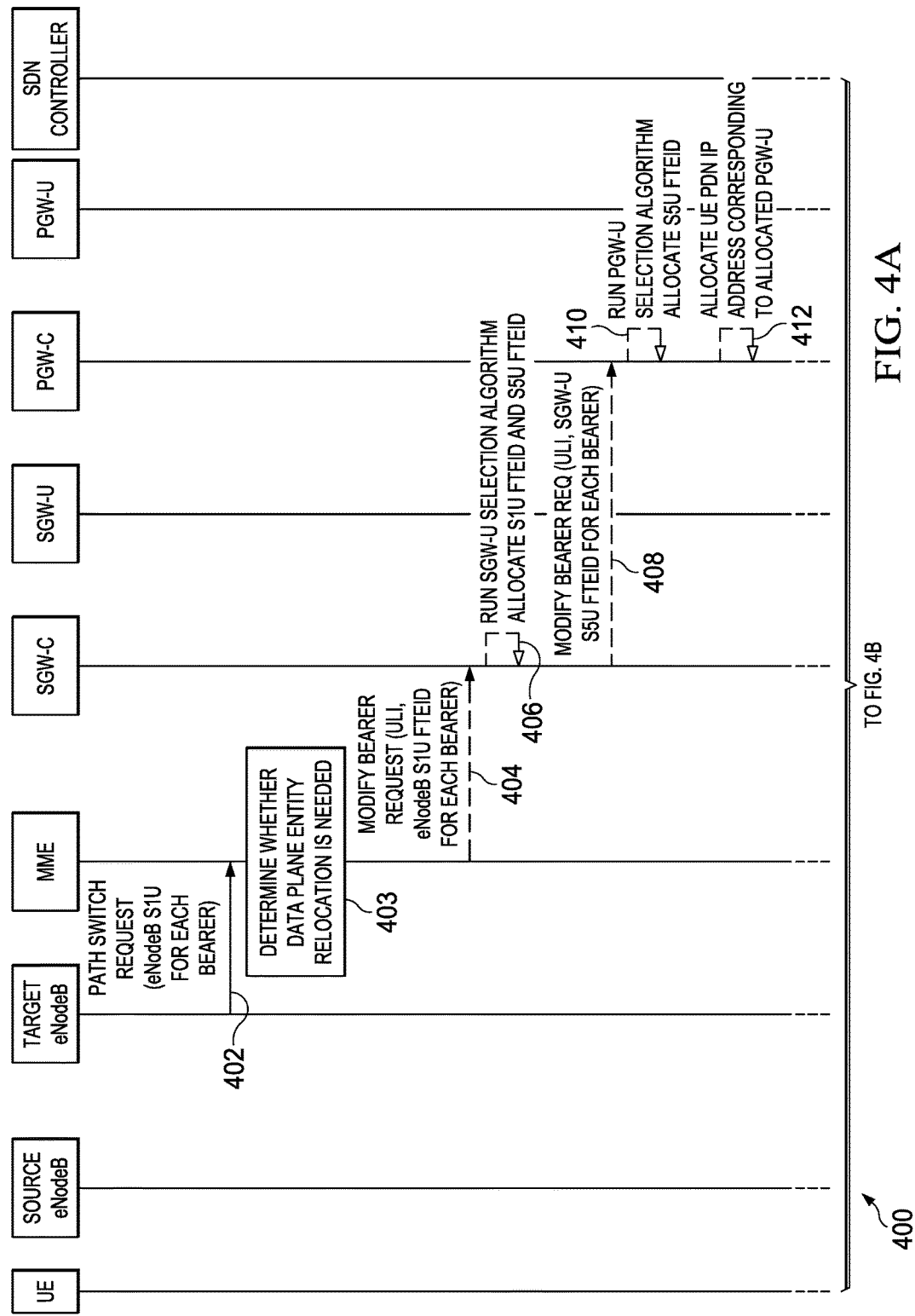
FIGS. 4A-4B is a simplified interaction diagram illustrating example details that can be associated with an example call flow for a modified X2 handover procedure in accordance with one potential embodiment.
Figure 4B:
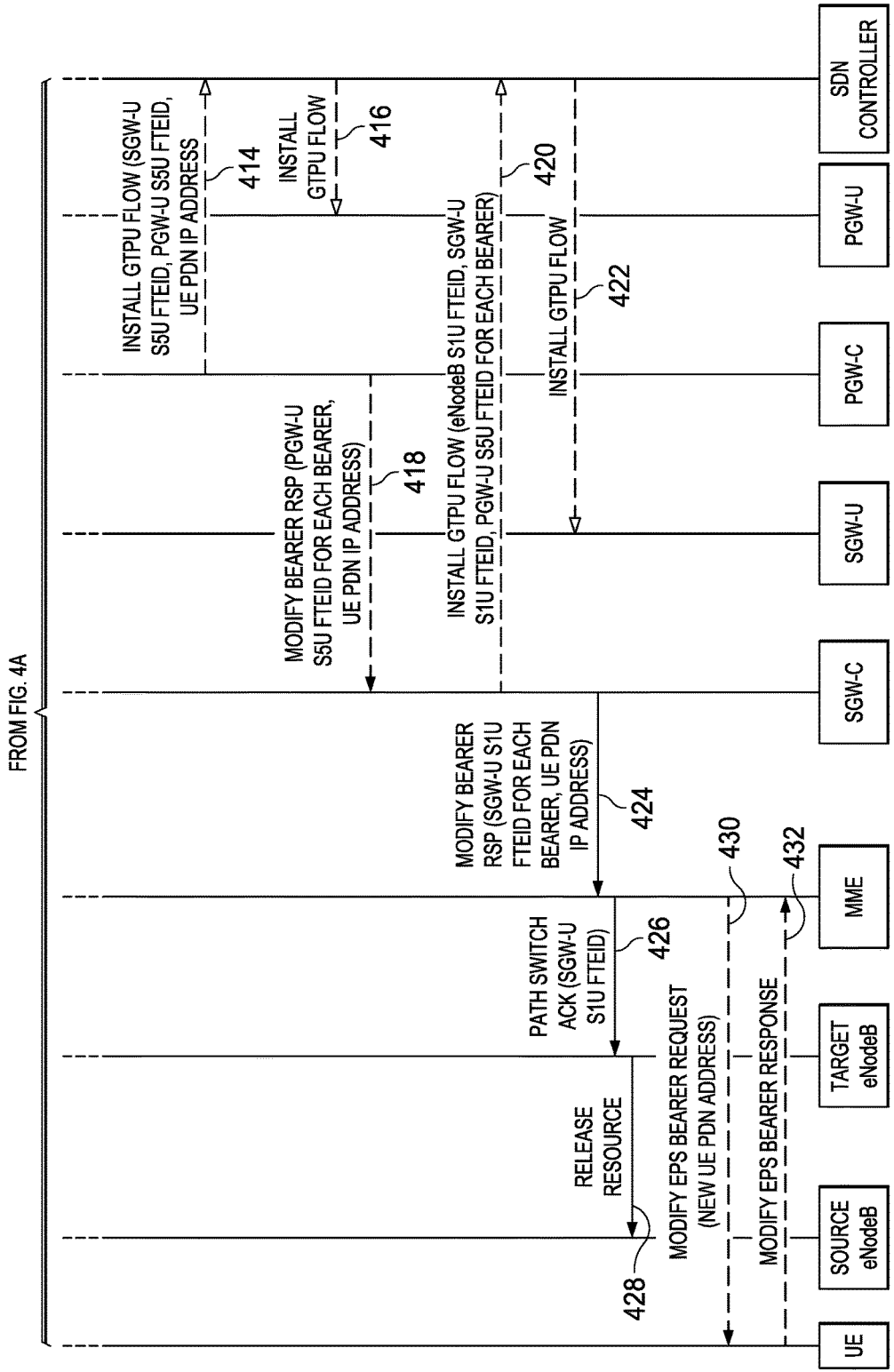

Referring to FIGS. 4A-4B, FIGS. 4A-4B is a simplified interaction diagram 400 illustrating example details that can be associated with an example call flow for a modified X2 handover procedure for a split control and user plane architecture in which a change of a user plane entity is provided for an X2 Handover (HO) procedure without an SGW-C change in accordance with one potential embodiment. The embodiment of solution shown in FIGS. 4A-4B can be implemented for a use case involving changing the user plane entity closer to a given RAN node for a given UE (e.g., UE 102) during active/connected mode mobility for the UE. FIGS. 4A-4B include UE 102, a source eNodeB (e.g., eNodeB 162a), a target eNodeB (e.g., eNodeB 162b) to which HO of UE 102 is sought, MME 112, SGW-C 118, PGW-C 124, SGW-U 120, PGW-U 126 and SDN controller 128. For purposes of the embodiment shown in FIGS. 4A-4B it is assumed that SGW-U 120 and PGW-U 126 are the data plane entities topologically located nearest to the target eNodeB.

For the embodiment of the solution shown in FIGS. 4A-4B, the dashed-lines having open arrows are new messages and/or procedures that can be provided for this embodiment; the dashed-lines having closed arrows (e.g., Modify EPS Bearer Request, Response, etc.) are existing messages and/or procedures that are to be modified to include new parameters for this embodiment; and the solid-lines having arrows are existing messages as prescribed by 3GPP standards.

In general, an X2 HO procedure can be provided when eNodeBs are interconnected via an X2 interface otherwise an S1 HO procedure can be provided to enable UE HO from a source eNodeB to a particular target eNodeB. For the embodiment shown in FIGS. 4A-4B, only an X2 handover without an SGW-C change procedure is considered. In one embodiment, if a given SGW-C changes, the changed user plane TEIDs can be conveyed to a given eNodeB through existing procedures as defined in 3GPP TS 23.401. In one embodiment, if a PGW-U changes during such SGW-C change procedures, and if a UE's PDN IP address is changed because of such a PGW-U change, then the changed UE PDN IP Address can be communicated to the UE using Modify EPS Bearer Context Request messaging at the end of the X2 handover procedure similar to that as shown for the embodiment of FIGS. 2A-2B.

In the solution shown in the embodiment of FIGS. 4A-4B, the determination of whether an SGW-U and/or a PGW-U relocation is needed during an X2 HO procedure can be based on user location and can be performed by MME 112. At 402, the target eNodeB sends a Path Switch Request to MME 112 including an S1U FTEID for the target eNodeB for each UE 102 bearer(s) to inform the MME that UE 102 has changed its cell. The Path Switch Request can also include, among other things, a ULI (e.g., ECGI+TAI) for the target eNodeB. At 403, a determination of whether SGW-U and/or PGW-U relocation is needed during for X2 HO procedure based on user/UE location can be performed by MME 112.

In various embodiments, MME 112 can perform a look-up using a local configuration table or can perform a TAI FQDN and/or eNodeB FQDN based DNS query or a requested APN FQDN based query as described for various embodiments discussed herein to determine if a SGW-U and/or a PGW-U relocation is needed. Note that the MME 112 is only interested in determining if a change of user plane entity is needed. The actual selection of a given user plane entity will still be performed by the SGW-C 118 and/or PGW-C 124. If the MME 112 detects a need to change the SGW-U and/or PGW-U, it can include an indication in Modify Bearer Request messaging sent to SGW-C 118 as shown at 404.

Note inclusion of a ULI in Modify Bearer Request messaging, without a given PGW-C requesting ULI reporting can generate unnecessary signaling from SGW-C to PGW-C. To avoid this, one embodiment can provide that whenever the MME includes a ULI in Modify Bearer Request messaging to aid SGW-C to perform a user plane entity selection, without the PGW-C actually registering for ULI reporting, the MME can set an indication bit in the messaging indicating that the ULI inclusion is to aid SGW-C selecting a SGW-U. The Modify Bearer Request Messaging at 404 can also include the ULI for the target eNodeB and the target eNodeB S1U FTEID for each UE 102 bearer(s).

For the embodiment of FIGS. 4A-4B, it is assumed that SGW-C 118 and PGW-C 124 can each respectively determine whether a relocation is needed by using either location information configured at each respective control plane entity (e.g., TAI, etc. configured and associated with data plane entities that can be used to determine locations of the data plane entities) or by using a TAI FQDN and/or eNodeB FQDN based DNS query for SGW-U selection or the requested APN FQDN based DNS query for PGW-U selection.

Based on the indication bit and the ULI, SGW-C 118 can determine at 406 whether a SGW-U relocation is needed and, for purposes of the embodiment shown in FIGS. 4A-4B, SGW-C 118 does determine that a SGW-U relocation is needed for servicing flows for UE 102. Upon determining that the SGW-U relocation is needed, SGW-C 118 determines (e.g., using the ULI) that SGW-U 120 is the data plane entity nearest to the target eNodeB serving UE 102 using techniques as discussed herein and allocates an SGW-U S1U FTEID and an SGW-U S5U FTEID for each UE 102 bearer(s) to be serviced by SGW-U 120. At 408, SGW-C 118 sends a Modify Bearer Request to PGW-C 124 including the ULI and the SGW-U S5U FTEID for each UE 102 bearer(s) to be serviced by SGW-U 120. In one embodiment, the Modify Bearer Request can include an indication that the ULI is only to be used for determining whether a PGW-U relocation is needed.

At 410, PGW-C 124 can decide if a PGW-U relocation is needed and, for purposes of the embodiment shown in FIGS. 4A-3B, PGW-C 124 does decide that a PGW-U relocation is needed for servicing flows for UE 102. Upon determining that the PGW-U relocation is needed, PGW-C 124 determines that PGW-U 126 is the data plane entity nearest to the target eNodeB serving UE 102 using techniques as discussed herein and allocates a PGW-U S5U FTEID for each UE 102 bearer(s) to be serviced by PGW-U 126. In various embodiments, the PGW-C 124 can either use the ULI or it can use an SGW-U S5U FTEID for SGW-U 120 for a given bearer as an identifier to select a target PGW-U for relocation. At 412, PGW-C 124 allocates a new PDN IP address for UE 102 for the corresponding PGW-U 126 allocated to service flows for UE 102 for the UE's PDN connection to a given APN. In one embodiment, PGW-C 124 can allocate a new PDN IP address for UE 102 from a pool of IP addresses served by the selected PGW-U 126 using DHCP, SLAAC or some similar allocation means.

At 414, PGW-C 124 signals SDN controller 128 to install a GTPU flow(s) for each UE 102 bearer(s) using the SGW-U S5U FTEID and PGW-U S5U FTEID for each UE 102 bearer(s) to be serviced by SGW-U 120 and PGW-U 126 and the new UE 102 PDN IP address. At 416, SDN controller 128 installs the GTPU flow(s) for each UE 102 bearer(s) to be serviced by PGW-U 126.

At 418, PGW-C 124 sends Modify Bearer Response messaging to SGW-C 118 including the PGW-U S5U FTEID for each UE 102 bearer(s) to be serviced by PGW-U 126 and the new UE 102 PDN IP address. At 420, SGW-C 118 signals SDN controller 128 to install an uplink GTPU flow(s) for each UE 102 bearer(s) using the eNodeB S1U FTEID for each UE 102 bearer(s) to be serviced by the target eNodeB, the SGW-U S1U FTEID for each UE 102 bearer(s) to be serviced by SGW-U 120 and the PGW-U S5U FTEID for each UE 102 bearer(s) to be serviced by PGW-U 126. At 422, SDN controller 128 installs the uplink GTPU flow(s) for SGW-U 120. At 424, SGW-C 118 sends MME 112 Modify Bearer Response messaging including the SGW-U S1U FTEID for each UE 102 bearer(s) and the new UE 102 PDN IP address.

At 426, MME 112 sends the target eNodeB a Path Switch Acknowledgment including the SGW-U S1U FTEID for each UE 102 bearer(s) to be serviced by SGW-U 120. At 428, the target eNodeB sends the source eNodeB a Release Resource message indicating to the source eNodeB to release any resources allocated to UE 102 at the source eNodeB. The change of UE 102 PDN IP address is communicated to UE 102 via a Modify EPS Bearer Request (Req) procedure by carrying the new UE 102 PDN IP address as a new parameter in Modify EPS Bearer Req messaging as shown at 430. At 432, UE 102 sends MME 112 (via the target eNodeB) Modify EPS Bearer Response (Rsp) messaging indicting successful modification of the EPS bearer(s) for UE 102 for the PDN connection. Accordingly, the embodiment of the solution shown in FIGS. 4A-4B illustrates that a UE PDN IP address can be changed during an X2 HO without tearing down a PDN connection for the UE.

Figure 5A:
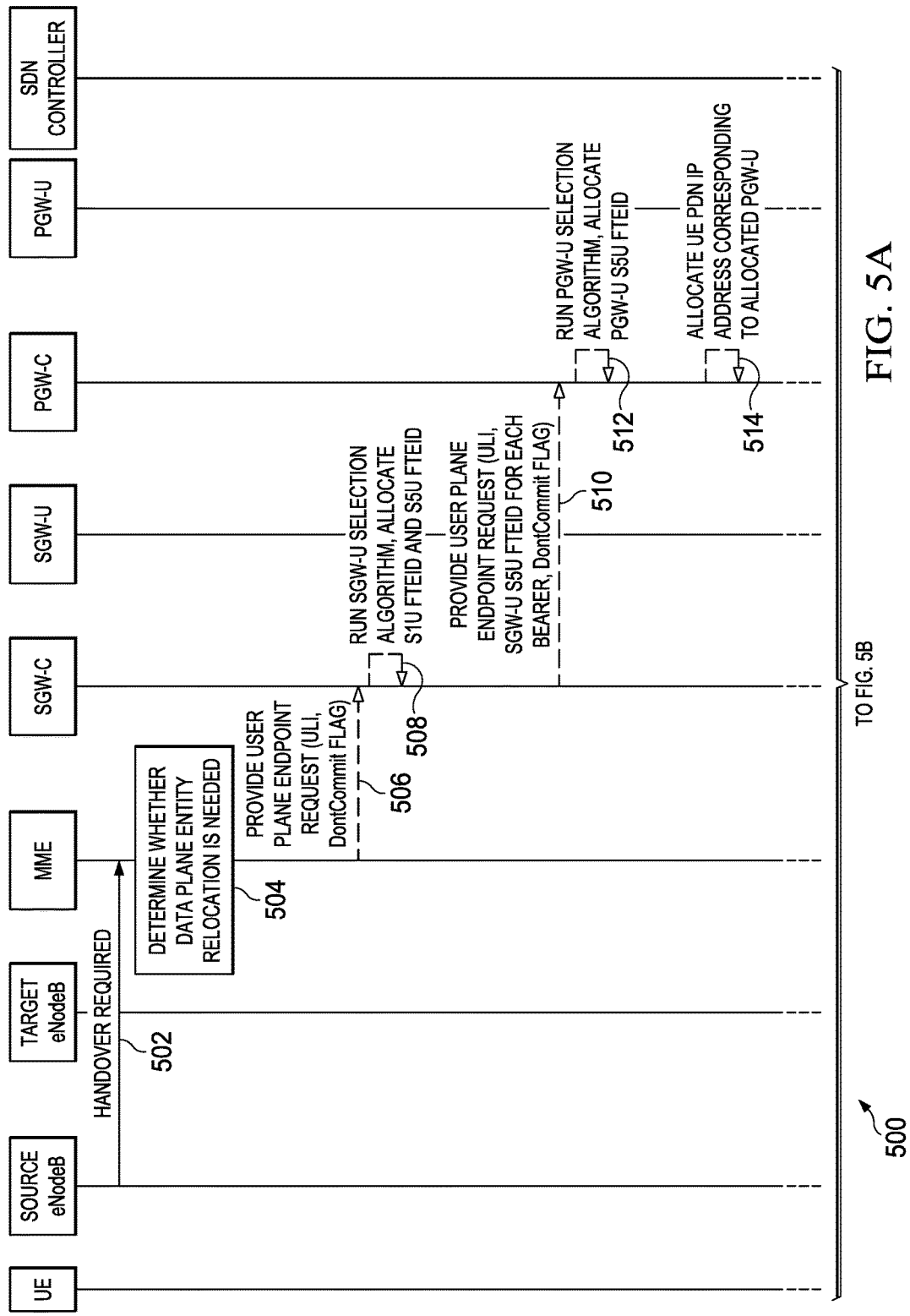
FIGS. 5A-5C is a simplified interaction diagram illustrating example details that can be associated with an example call flow for a modified S1 handover procedure in accordance with one potential embodiment.
Figure 5B:
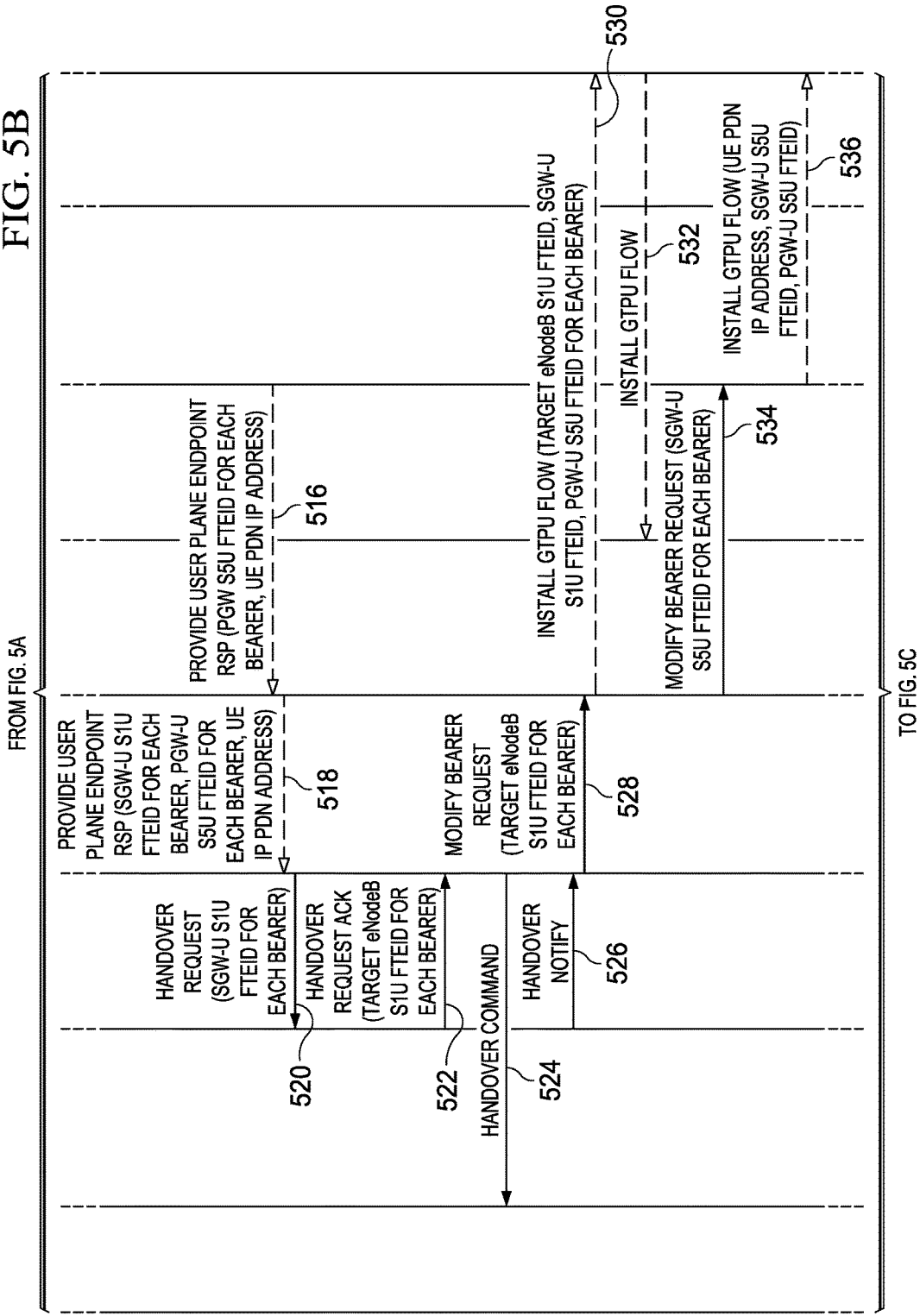
Figure 5C:
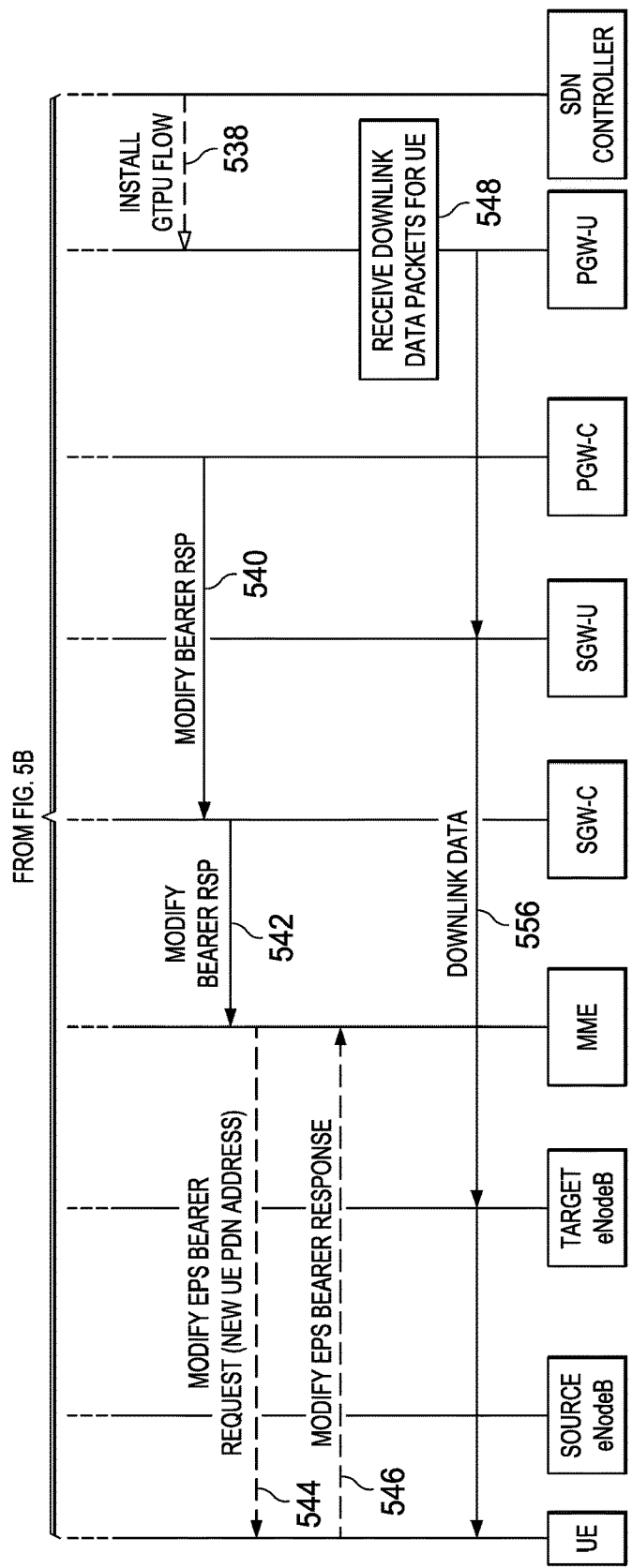

Referring to FIGS. 5A-5C, FIGS. 5A-5C is a simplified interaction diagram 500 illustrating example details that can be associated an example call flow for a modified S1 handover procedure for a split control and user plane architecture in which a change of a user plane entity is provided for an S1 handover procedure in accordance with one potential embodiment. The embodiment of the solution shown in FIGS. 5A-5C can be implemented for a use case involving changing a user plane entity closer to the RAN node for a given UE (e.g., UE 102) during active/connected mode mobility for the UE. FIGS. 5A-5C include UE 102, a source eNodeB (e.g., eNodeB 162*a*), a target eNodeB (e.g., eNodeB 162*b*) to which HO of UE 102 is sought, MME 112, SGW-C 118, PGW-C 124, SGW-U 120, PGW-U 126 and SDN controller 128. For purposes of the embodiment shown in FIGS. 5A-5C it is assumed that SGW-U 120 and PGW-U 126 are the data plane entities topologically located nearest to the target eNodeB.

For the embodiment of the solution shown in FIGS. 5A-5C, the dashed-lines having open arrows are new messages and/or procedures that can be provided for this embodiment; the dashed-lines having closed arrows (e.g., Modify EPS Bearer Request, Response, etc.) are existing messages and/or procedures that are to be modified to include new parameters for this embodiment; and the solid-lines having arrows are existing messages as prescribed by 3GPP standards. As illustrated, the embodiment shown in FIGS. 5A-5C can include provisioning new 'Provide User Plane Endpoint' messaging to facilitate relocation of user data plane entities. The 'Provide User Plane Endpoint' messaging can have a format as described above for the embodiment shown in FIGS. 2A-2B.

For the embodiment shown in FIGS. 5A-5C, only S1 handover without an SGW-C change procedure is considered. In one embodiment, if a given SGW-C changes, the changed user plane TEIDs can be conveyed to a given target eNodeB through existing procedures as defined in 3GPP TS 23.401. An example case involving a change of MME during S1 handover is not shown for purposes of brevity.

In the solution shown in the embodiment of FIGS. 5A-5C, the determination of whether SGW-U and/or PGW-U relocation is needed during an S1 Handover (HO) procedure can be based on user location and can be performed by the MME 112. At 502, the source eNodeB sends Handover Required messaging to MME 112. The Handover Required messaging can include, among other things, the target eNodeB identity and the target TAI (e.g., target ULI) for the UE 102 S1 HO procedure.

At 504, a determination of whether SGW-U and/or PGW-U relocation is needed during for the S1 HO procedure based on user/UE location can be performed by MME 112. In various embodiments, MME 112 can perform a look-up using a local configuration table or can perform a TAI FQDN and/or eNodeB FQDN based DNS query or a requested APN FQDN based DNS query to discover the ULI sets that the SGW-C can serve under each SGW-U it is controller using procedures described in IETF RFC 6763, as described for various embodiments discussed herein to determine if a SGW-U and/or a PGW-U relocation is needed. Note that the MME 112 is only interested in determining if a change of user plane entity is needed. The actual selection of a given user plane entity will still be performed by the SGW-C 118 and/or PGW-C 124. If the MME 112 detects a need to change the SGW-U and/or PGW-U, it can include an indication in Provide User Plane Endpoint messaging sent to SGW-C 118.

At 506, it is assumed that MME 112 determines that a relocation of data plane entities is needed for UE 102 and MME 112 sends a Provide User Plane Endpoint Request message to SGW-C 118 including the ULI for UE 102 and a DontCommit flag. At 508, SGW-C 118 performs an SGW-U selection algorithm based on the ULI for the target eNodeB/UE 102 to determine the SGW-U (e.g., SGW-U 120) nearest to the target eNodeB serving UE 102 and allocates a new S1U FTEID and a new S5U FTEID for SGW-U 120 for each UE 102 bearer(s). The selection of a SGW-U for relocation can be performed by SGW-C 118 using any technique as described for the various embodiments discussed herein.

Upon performing the selecting and allocating at 508, SGW-C 118 sends PGW-C 124 a Provide User Plane Endpoint Request message at 510 including the ULI, the S5U FTEID for each UE 102 bearer(s) and the DontCommit Flag. At 512, PGW-C 124 performs a PGW-U selection algorithm to determine the PGW-U (e.g., PGW-U 126) nearest to the target eNodeB and allocates a new S5U FTEID for PGW-U 126 for each UE 102 bearer(s). The selection of a PGW-U for relocation can be performed by PGW-C 124 using any technique as described for the various embodiments discussed herein.

In at least one embodiment, the DontCommit flag included in the messaging between MME 112 and SGW-C 118 and between SGW-C 118 and PGW-C 124 can be used to signal to the respective SGW-C 118 and the PGW-C 124 to not install the flow(s) into the relocated SGW-U and PGW-U, respectively, until a further Modify Bearer Request is received as an S1 handover can be cancelled before a Modify Bearer Request arrives. By providing the DontCommit flag in the Provide User Plane EndPoint messaging, the path for UE flow(s) can be triggered to be switched to a target eNodeB only upon receiving a Handover Notify from the target eNodeB, which signals that the S1 handover is complete. Receipt of the Handover Notify at the MME serving the target eNodeB can trigger a Modify Bearer Request from the MME serving the target eNodeB toward the SGW-C and the flow(s) for the UE can be committed at any corresponding relocated data plane entities.

At 514, PGW-C 124 allocates a new PDN IP address for UE 102 for the corresponding PGW-U 126 selected at 514 for the UE 102 PDN connection to a given APN (e.g., operator IP service(s) 140, internet 150, etc.). In one embodiment, PGW-C 124 can allocate a new PDN IP address for UE 102 from a pool of IP addresses served by the selected PGW-U 126 using DHCP, SLAAC or some similar allocation means.

At 516, PGW-C 124 sends SGW-C 118 a Provide User Plane Endpoint Response message including the PGW-U S5U FTEID for each UE 102 bearer(s) and the new UE 102 PDN IP address. At 518, SGW-C 118 sends MME 112 a Provide User Plane Endpoint Response message including the SGW-U S1U FTEID and PGW-U S5U FTEID for each UE 102 bearer(s) as well as the new PDN IP address for UE 102 and any other UE 102 PDN IP Addresses along with a corresponding PDN default bearer EBI for each APN to which UE 102 may be connected.

At 520, MME 112 sends Handover Request messaging to the target eNodeB including, at least in part, each SGW-U S1U FTEID for each UE 102 bearer(s). At 522, the target eNodeB responds with Handover Request Acknowledgment (Ack) messaging include a target eNodeB S1U FTEID for each UE 102 bearer(s) and at 524, based on receiving the Ack, MME 112 sends a Handover Command to the source eNodeB. Upon UE 102 successfully detaching from the source eNodeB and completing attachment to the target eNodeB, the target eNodeB sends MME 112 Handover Notify messaging at 526. As discussed above, receipt of a Handover Notify at the MME serving the target eNodeB can trigger a Modify Bearer Request from the MME serving the target eNodeB toward the SGW-C and the flow(s) for the UE can be committed at any corresponding relocated data plane entities. Thus, at 528, MME 112 sends SGW-C 118 Modify Bearer Request messaging including the target eNodeB S1U FTEID for each UE 102 bearer(s) serviced by the target eNodeB. At 530, SGW-C 118 signals SDN controller 128 to install a uplink and downlink GTP user plane (GTPU) flow(s) for each UE 102 bearer(s) using the target eNodeB S1U FTEID for each UE 102 bearer(s), the SGW-U S1U FTEID for each UE 102 bearer(s) and the PGW-U S5U FTEID for each UE 102 bearer(s). At 532, SDN controller 128 installs the uplink/downlink GTPU flow(s) for SGW-U 120.

At 534, SGW-C 118 sends PGW-C 124 Modify Bearer Request messaging including the SGW-U S5U FTEID for each UE 102 bearer(s). According to current 3GPP standards, sending a Modify Bearer Request to a PGW does not result in changes to user plane FTEIDs without changing control plane FTEIDs. However, in accordance with at least one embodiment for a split control and user plane architecture, such as architecture 100, a PGW-C (e.g., PGW-C 124) can be configured such that a Modify Bearer Request sent to the PGW-C can be used as a trigger to cause the PGW-C to commit (e.g., install) the user plane FTEIDs to a relocated PGW-U. In various embodiments, the user plane FTEIDs can be installed to a given PGW-U using either an SDN controller (e.g., SDN controller 128) or can be installed by a given PGW-C (e.g., PGW-C 124) itself.

Thus, in at least one embodiment, upon PGW-C 124 receiving the Modify Bearer Request from SGW-C 118, the PGW-C 124 signals SDN controller 128 at 536 to install an uplink and downlink GTP user plane (GTPU) flow(s) for each UE 102 bearer(s) using the SGW-U S5U FTEID and PGW-U S5U FTEID for each UE 102 bearer(s) and the new UE 102 PDN IP address. At 538, SDN controller 128 installs the uplink/downlink GTPU flow(s) for each UE 102 bearer(s) to be serviced by PGW-U 126. At 540, PGW-C 124 sends a Modify Bearer Response to SGW-C 118 indicating completion of the installation of its GTPU flow(s) for the UE 102 bearer(s). At 542, SGW-C 118 sends a Modify Bearer Response to MME 112 indicating completion of the installation of its GTPU flow(s) for the UE 102 bearer(s).

For the embodiment shown in FIGS. 5A-5C, the change of UE 102 PDN IP address is communicated to UE 102 via a Modify EPS Bearer Request (Req) procedure by carrying the new UE 102 PDN IP address as a new parameter in Modify EPS Bearer Req messaging as shown at 544. At 546, UE 102 sends MME 112 (via the target eNodeB) Modify EPS Bearer Response (Rsp) messaging indicting successful modification of the EPS bearer(s) for UE 102 for the PDN connection.

At 548, it is assumed that PGW-U receives downlink data (e.g., packets) for UE 102 for the PDN connection and at 550 the downlink data is sent to UE 102 via SGW-U 120, MME 112 and the target eNodeB. Accordingly, the embodiment of the solution shown in FIGS. 5A-5C illustrates that a UE PDN IP address can be changed during an S1 HO without tearing down a PDN connection for the UE using new Provide User Plane Endpoint messaging provisioned for a split control and user plane architecture.

Figure 6A:
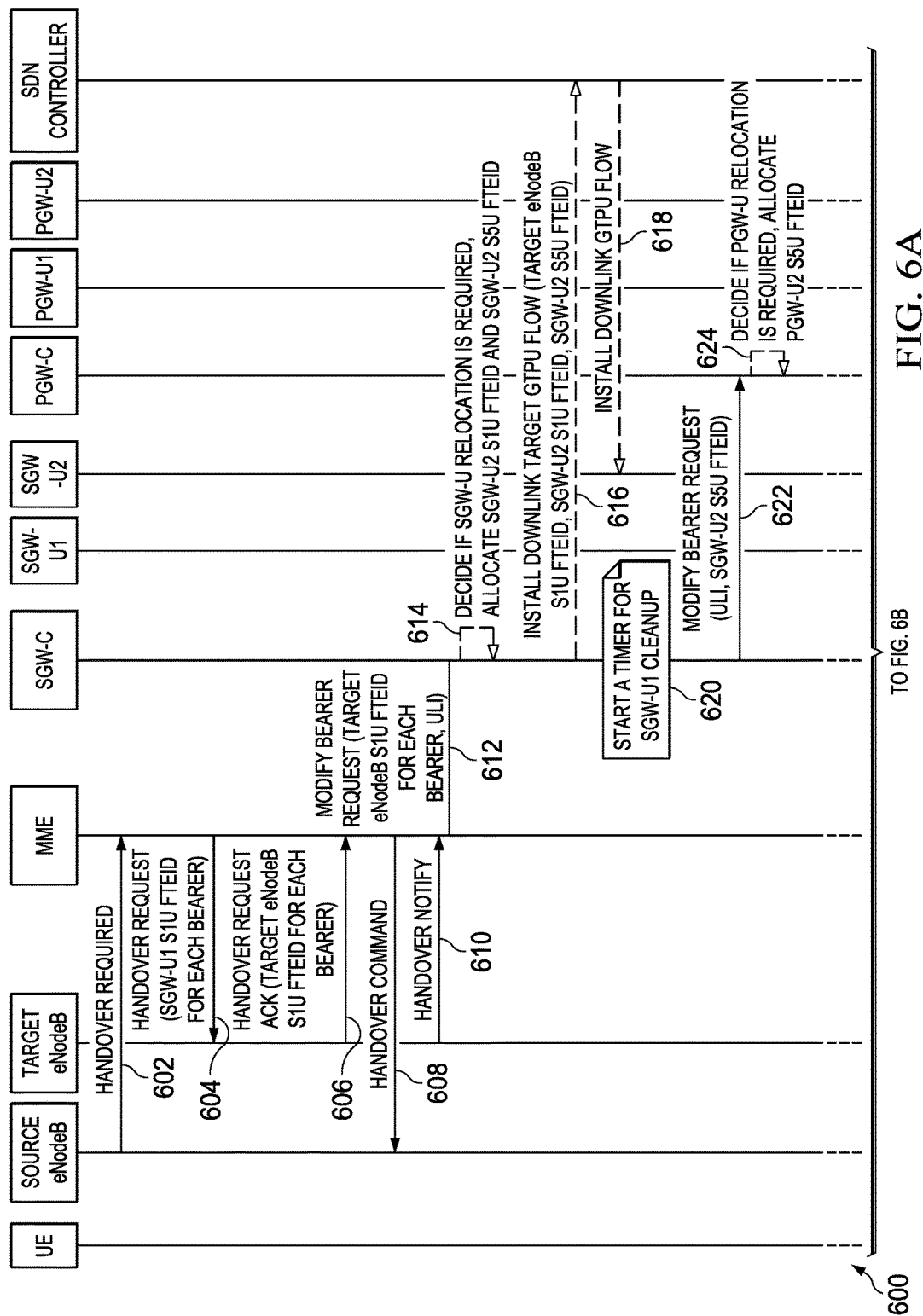
FIGS. 6A-6C is a simplified interaction diagram illustrating other example details that can be associated with an example call flow for another modified S1 handover procedure in accordance with one potential embodiment.
Figure 6B:
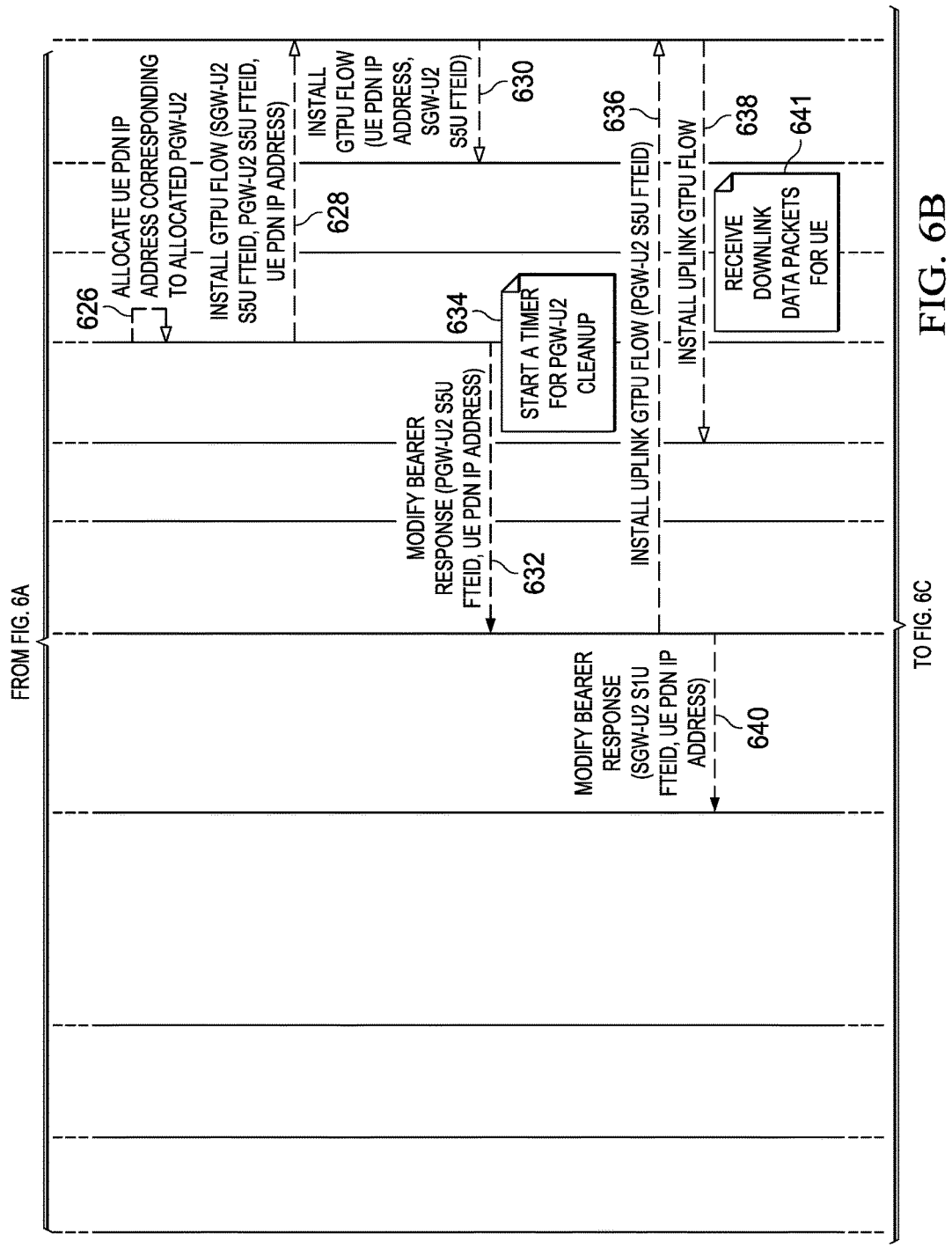
Figure 6C:
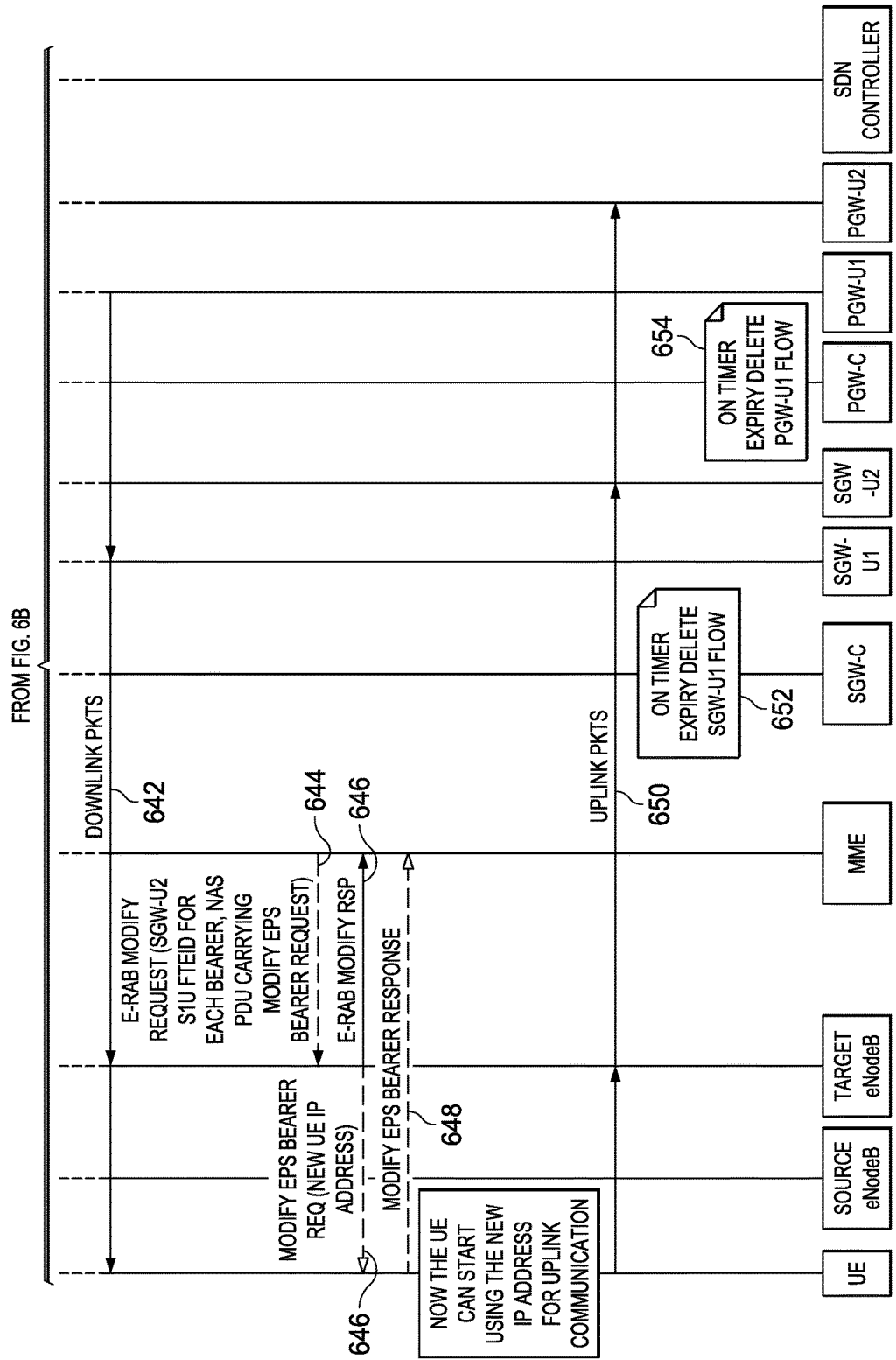

Referring to FIGS. 6A-6C, FIGS. 6A-6C is a simplified interaction diagram 600 illustrating other example details that can be associated an example call flow for another modified S1 handover procedure for a split control and user plane architecture in which a change of a user plane entity is provided for an S1 handover without provisioning the architecture to use 'Provide User Plane Endpoint' messaging. Thus, embodiment shown in FIGS. 6A-6C, illustrates an alternative embodiment to the solution shown in FIGS. 5A-5C such that the impact to core network is minimal.

The embodiment shown in FIGS. 6A-6C illustrates how the S1 Handover (HO) procedure can be enhanced to support a change of SGW-U and/or PGW-U user data plane entities using an E-RAB Modify Request towards a given target eNodeB at the end of the S1 handover procedure to inform the target eNodeB of the change of an SGW-U user plane entity (e.g., with impact to RAN nodes). The procedure that is performed at the end of the handover is same as that which is performed during the service request procedure as discussed for the embodiment shown in FIGS. 3A-3C (e.g., using the E-RAB update procedure to signal SGW-U FTEID changes to a RAN node). The embodiment shown in FIGS. 6A-6C can help to ensure that there is a minimal impact to core network call flow. FIGS. 6A-6C include UE 102, eNodeB 162a, MME 112, SGW-C 118, PGW-C 124 and SDN controller 128. FIGS. 6A-6C further include a first PGW-U (PGW-U1), a second PGW-U (PGW-U2), a first SGW-U1 and a second SGW-U (SGW-U2).

For the embodiment shown in FIGS. 6A-6C, the dashed-lines having open arrows are new messages and/or procedures that can be provided for this solution; the dashed-lines having closed arrows (e.g., E-RAB Modify Request, Modify EPS Bearer Request, Response, etc.) are existing messages and/or procedures that are to be modified to include new parameters for the embodiment shown in FIGS. 6A-6C; and the solid-lines having arrows are existing messages as prescribed by 3GPP standards. It is assumed for the embodiment shown in FIGS. 6A-6C that SGW-U1 and PGW-U1 are the current or old user data plane entities serving flows (e.g., uplink and downlink transmissions) for UE 102 and that SGW-U2 and PGW-U2 are the new user data plane entities to which the flows for UE 102 will be relocated for the UE 102 S1 HO. Note for the embodiment shown in FIGS. 6A-6C, until a new PDN IP address is communicated to UE 102, both uplink and downlink transfers can occur using the old UE PDN IP address through SGW-U1 and PGW-U1.

At 602, the source eNodeB sends Handover Required messaging to MME 112. The Handover Required messaging can include, among other things, the target eNodeB identity and the target TAI (e.g., target ULI) for the UE 102 S1 HO procedure. At 604, MME 112 sends Handover Request messaging to the target eNodeB including, at least in part, a SGW-U S1U FTEID for each UE 102 bearer(s) currently serviced by SGW-U1. At 606, the target eNodeB responds with Handover Request Acknowledgment (Ack) messaging include a target eNodeB S1U FTEID for each UE 102 bearer(s) and at 608, based on receiving the Ack, MME 112 sends a Handover Command to the source eNodeB. Upon UE 102 successfully detaching from the source eNodeB and completing attachment to the target eNodeB, the target eNodeB sends MME 112 Handover Notify messaging at 610. At 612, MME 112 sends SGW-C 118 Modify Bearer Request messaging including an eNodeB S1U FTEID for each UE 102 bearer(s) serviced by the target eNodeB and the target ULI for the target eNodeB.

For the embodiment of FIGS. 6A-6C, it is assumed that SGW-C 118 and PGW-C 124 can each respectively determine whether a relocation is needed by using either location information configured at each respective control plane entity (e.g., TAI, etc. configured and associated with data plane entities to determine locations of the data plane entities) or by using a TAI FQDN and/or eNodeB FQDN based DNS query for SGW-U selection or a requested APN FQDN based DNS query for PGW-U selection.

Accordingly, at 614 SGW-C 118 can decide if a SGW-U relocation is needed and, for purposes of the embodiment shown in FIGS. 6A-6C, SGW-C 118 decides that a SGW-U relocation is needed for servicing flows for UE 102. Upon determining that the SGW-U relocation is needed, SGW-C 118 determines (e.g., using the target ULI) that SGW-U2 is the data plane entity nearest to eNodeB 162a serving UE 102 using techniques as discussed herein and allocates an SGW-U2 S1U FTEID and an SGW-U2 S5U FTEID for each UE 102 bearer(s). At 616, SGW-C 118 signals SDN controller 128 to install a downlink GTP user plane (GTPU) flow(s) for each UE 102 bearer(s) using the target eNodeB S1U FTEID, the SGW-U2 S1U FTEID and the SGW-U2 S5U FTEID for each UE 102 bearer(s). At 618, SDN controller 128 installs the downlink GTPU flow(s) for SGW-U2. At 620, SGW-C 118 starts a timer that can be used to trigger cleanup of any flows, flow information, etc. for any UE 102 flows previously installed at SGW-U1 upon expiration of the timer.

At 622, SGW-C 118 sends a Modify Bearer Request to PGW-C 124 including the target ULI and the SGW-U2 S5U FTEID for each UE 102 bearer(s). Note inclusion of the ULI in a Modify Bearer Request sent to a given PGW-C, without the PGW-C requesting ULI reporting can generate unnecessary signaling from a SGW-C to the PGW-C. To avoid this, one embodiment can provide that whenever the MME includes the ULI in a Modify Bearer Request to aid SGW-C in performing a user plane entity selection, without the PGW-C actually registering for ULI reporting, the MME can set an indication bit in the messaging indicating that the ULI inclusion is to aid to the SGW-C in selecting a SGW-U.

At 624, PGW-C 124 can decide whether a PGW-U relocation is needed and, for purposes of the embodiment shown in FIGS. 6A-6C, PGW-C 124 decides that a PGW-U relocation is needed for servicing flows for UE 102. Upon determining that the PGW-U relocation is needed, PGW-C 124 determines that PGW-U2 is the data plane entity nearest to eNodeB 162a serving UE 102 using techniques as discussed herein and allocates a PGW-U2 S5U FTEID for each UE 102 bearer(s). In various embodiments, the PGW-C 124 can either use the target ULI or it can use an SGW-U2 S5U FTEID for a given bearer as an identifier to select the target PGW-U2 for relocation. At 626, PGW-C 124 allocates a new PDN IP address for UE 102 for the corresponding PGW-U2 allocated to service flows for UE 102 for the UE's PDN connection to a given APN. In one embodiment, PGW-C 124 can allocate a new PDN IP address for UE 102 from a pool of IP addresses served by the selected PGW-U2 using DHCP, SLAAC or some similar allocation means. At 628, PGW-C 124 signals SDN controller 128 to install a downlink and uplink GTPU flow(s) for each UE 102 bearer(s) using the SGW-U2 S5U FTEID and PGW-U2 S5U FTEID for each UE 102 bearer(s) and the new UE 102 PDN IP address. At 630, SDN controller 128 installs the downlink/uplink GTPU flow(s) for each UE 102 bearer(s) to be serviced by PGW-U2.

At 632, PGW-C 124 sends Modify Bearer Response messaging to SGW-C 118 including the PGW-U2 S5U FTEID for each UE 102 bearer(s) and the new UE 102 PDN IP address. At 634, PGW-C 124 starts a timer that can be used to trigger cleanup of any flows, flow information, etc. for any UE 102 flows previously installed at PGW-U1 upon expiration of the timer. At 636, SGW-C 118 signals SDN controller 128 to install an uplink GTPU flow(s) for each UE 102 bearer(s) using the PGW-U2 S5U FTEID for each UE 102 bearer(s). At 638, SDN controller 128 installs the uplink GTPU flow(s) for SGW-U2. At 640, SGW-C 118 sends MME 112 Modify Bearer Response messaging including the SGW-U2 S1U FTEID for each UE 102 bearer(s) and the new UE 102 PDN IP address.

At 641, it is assumed that PGW-U1 receives downlink packets for UE 102 for the PDN connection and at 642 the downlink packets are sent to UE 102 via SGW-U1, MME 112 and the target eNodeB. As discussed above, until the new UE 102 PDN IP address is communicated to UE 102 any packet flows for UE 102 can be serviced via PGW-U1 and SGW-U1.

Turning to 644, MME 112 can send an E-RAB Modify Request to the target eNodeB to change the SGW-U1 S1U FTEID for each UE 102 bearer(s) to the SGW-U2 S1U FTEID for each UE 102 bearer(s). Note per 3GPP TS 36.413, Section 8.2.2.2 when an existing E-RAB Modify Request is used to change the SGW-U S1U FTEID at a given eNodeB, a Non-access Stratum (NAS) Protocol Data Unit (PDU) included in the Request is ignored by the eNodeB. In at least one embodiment, this eNodeB behavior can be changed such that if a valid NAS message is included then the eNodeB can forward that request to a given UE for which an SGW-U was relocated. For the embodiment shown in FIGS. 6A-6C, the E-RAB Modify Request sent to the target eNodeB can include a NAS PDU carrying a Modify EPS Bearer Request with the new UE 102 PDN IP address. Upon receiving the NAS PDU, the target eNodeB can initiate a Modify EPS Bearer Request procedure by carrying the new UE 102 PDN IP address in Modify EPS Bearer Request messaging sent to UE 102 and responding to MME 112 with E-RAB Modify Rsp messaging as shown at 646. At 648, UE 102 sends MME 112 (via the target eNodeB) Modify EPS Bearer Response (Rsp) messaging indicting successful modification of the EPS bearer(s) for UE 102 for the PDN connection.

Once UE 102 receives the new PDN IP address, it can start using the new IP address for uplink communications. At 650, UE 102 sends uplink packets (pkts) for a particular bearer for the PDN connection to the target eNodeB. The target eNodeB sends the packets to SGW-U2 using the SGW-U2 S1U FTEID for the bearer and SGW-U2 sends the packets to PGW-U2 using the PGW-U2 S5U FTEID for the bearer and PGW-U2 can forward the packets (not shown) to one or more entities of the APN for the PDN connection based on control information included within and/or appended to one or more of the packet(s) via one or more headers or trailers for one or more of the packet(s). At 652, it is assumed that the timer started for SGW-C 118 expires and any SGW-U1 flow information cached at SGW-C 118 for UE 102 can be deleted by SGW-C 118. At 654, it is assumed that the timer started for PGW-C 124 expires and any PGW-U1 flow information cached at PGW-C 124 for UE 102 can be deleted by PGW-C 124.

Accordingly, the embodiment of the solution shown in FIGS. 6A-6C illustrates that a UE PDN IP address can be changed without tearing down a PDN connection for the UE without the use of any of the new Provide User Plane Endpoint messaging illustrated in FIGS. 5A-5C.

Figure 7A:
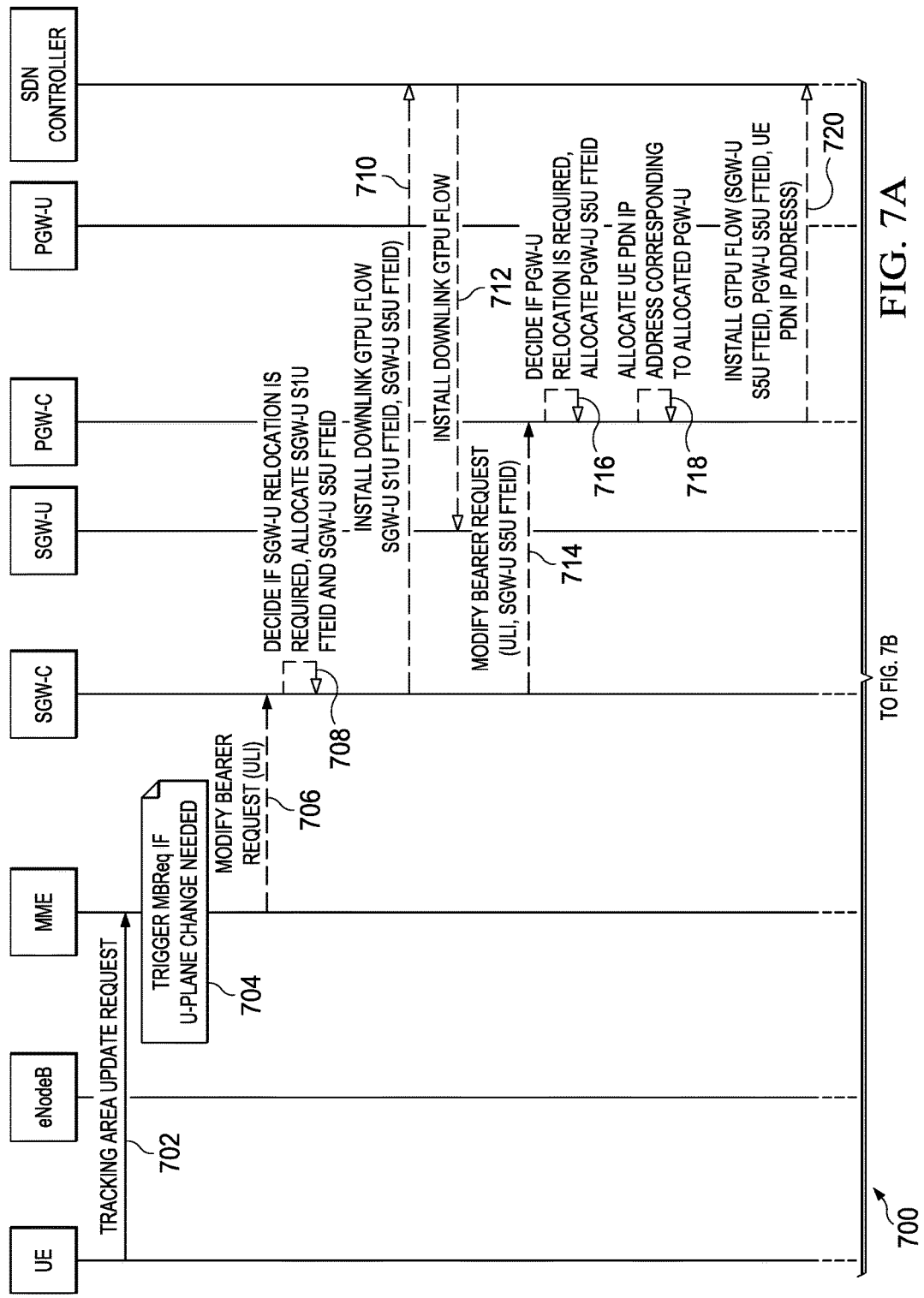
FIGS. 7A-7B is a simplified interaction diagram illustrating example details that can be associated with an example call flow for a Tracking Area Update (TAU) process in accordance with one potential embodiment.
Figure 7B:
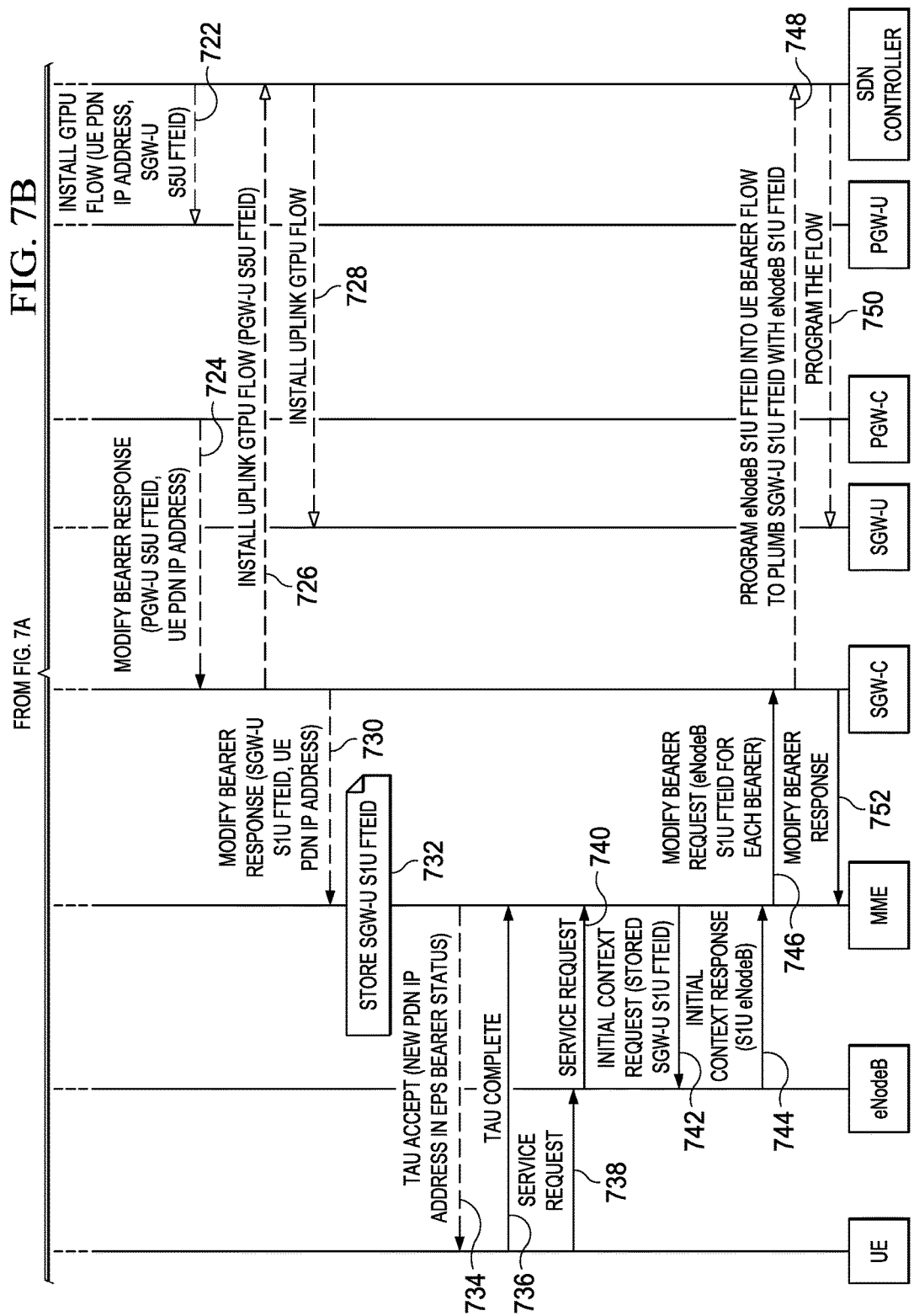

Referring to FIGS. 7A-7B, FIGS. 7A-7B is a simplified interaction diagram 700 illustrating example details that can be associated with an example call flow for a split control and user plane architecture in which a change of UE PDN IP address is provided during a tracking area update (TAU) without a PDN disconnect for a given APN. For APNs that are used for applications resilient to IP address change (e.g., TCP based applications), the IP address of the PDN connection can be changed during a TAU procedure in at least one embodiment if the new location from which the UE that sent the TAU warrants a change of PGW-U to ensure low latency without deactivating the PDN. Such an embodiment is shown in FIGS. 7A-7B in which the IP address of a PDN connection to a given APN for UE 102 is changed due to PGW-U relocation without deactivating the PDN.

For the embodiment shown in FIGS. 7A-7B, the dashed-lines having open arrows are new messages and/or procedures that can be provided for this solution; the dashed-lines having closed arrows (TAU Accept with EPS Bearer Context Status carrying new UE PDN IP address, etc.) are existing messages and/or procedures that are to be modified to include new parameters for the embodiment shown in FIGS. 7A-7B; and the solid-lines having arrows are existing messages as prescribed by 3GPP standards.

At 702, UE 102 sends eNodeB 162*a* a Tracking Area Update (TAU) Request including, at least in part, a ULI (e.g., TAI+ECGI) for the cell from where it received the TAU Request and forwards the Request to MME 112 including, at least in part, the ULI. At 704, a determination of whether SGW-U and/or PGW-U relocation is needed during for the TAU Request based on user/UE location can be performed by MME 112.

In various embodiments, MME 112 can perform a lookup using a local configuration table or can perform a TAI FQDN based and/or eNodeB FQDN based DNS query or a requested APN FQDN based DNS query as described for various embodiments discussed herein to determine if a SGW-U and/or a PGW-U relocation is needed. Note that the MME 112 is only interested in determining if a change of user plane entity is needed. The actual selection of a given user plane entity will still be performed by the SGW-C 118 and/or PGW-C 124. If the MME 112 detects a need to change the SGW-U and/or PGW-U, it can include an indication in Modify Bearer Request messaging sent to SGW-C 118 at 706.

Note inclusion of a ULI in Modify Bearer Request messaging, without a given PGW-C requesting ULI reporting can generate unnecessary signaling from SGW-C to PGW-C. To avoid this, one embodiment can provide that whenever the MME includes a ULI in Modify Bearer Request messaging to aid SGW-C to perform a user plane entity selection, without the PGW-C actually registering for ULI reporting, the MME can set an indication bit in the messaging indicating that the ULI inclusion is to aid SGW-C selecting a SGW-U.

For the embodiment of FIGS. 7A-7B, it is assumed that SGW-C 118 and PGW-C 124 can each respectively determine whether a relocation is needed by using either location information configured at each respective control plane entity (e.g., TAI, etc. configured and associated with data plane entities that can be used to determine locations of the data plane entities) or by using a TAI FQDN and/or eNodeB FQDN based DNS query for SGW-U selection or a requested APN FQDN based DNS query for PGW-U selection.

Based on the indication bit and the ULI, SGW-C 118 can determine at 708 whether a SGW-U relocation is needed and, for purposes of the embodiment shown in FIGS. 7A-7B, SGW-C 118 does determine that a SGW-U relocation is needed for servicing flows for UE 102. At 710, SGW-C 118 signals SDN controller 128 to install a downlink GTP user plane (GTPU) flow(s) for each UE 102 bearer(s) using the eNodeB S1U FTEID for each UE 102 bearer(s) serviced by eNodeB 162a, the SGW-U S1U FTEID and the SGW-U S5U FTEID for each UE 102 bearer(s) to be serviced by SGW-U 120. At 712, SDN controller 128 installs the downlink GTPU flow(s) for SGW-U2.

At 714, SGW-C 118 sends a Modify Bearer Request to PGW-C 124 including the target ULI and the SGW-U S5U FTEID for each UE 102 bearer(s) to be serviced by SGW-U 120. Note inclusion of the ULI in a Modify Bearer Request sent to a given PGW-C, without the PGW-C requesting ULI reporting can generate unnecessary signaling from a SGW-C to the PGW-C. To avoid this, one embodiment can provide that whenever the MME includes the ULI in a Modify Bearer Request to aid SGW-C in performing a user plane entity selection, without the PGW-C actually registering for ULI reporting, the MME can set an indication bit in the messaging indicating that the ULI inclusion is to aid to the SGW-C in selecting a SGW-U.

At 716, PGW-C 124 can decide whether a PGW-U relocation is needed and, for purposes of the embodiment shown in FIGS. 7A-7B, PGW-C 124 does decide that a PGW-U relocation is needed for servicing flows for UE 102. Upon determining that the PGW-U relocation is needed, PGW-C 124 determines that PGW-U 126 is the data plane entity nearest to eNodeB 162a serving UE 102 using techniques as discussed herein and allocates a PGW-U S5U FTEID for each UE 102 bearer(s) to be serviced by PGW-U 126. In various embodiments, the PGW-C 124 can either use the ULI or it can use an SGW-U S5U FTEID for a given bearer as an identifier to select the target PGW-U for relocation. At 718, PGW-C 124 allocates a new PDN IP address for UE 102 for the corresponding PGW-U 126 allocated to service flows for UE 102 for the UE's PDN connection to a given APN. In one embodiment, PGW-C 124 can allocate a new PDN IP address for UE 102 from a pool of IP addresses served by the selected PGW-U 126 using DHCP, SLAAC or some similar allocation means.

At 720, PGW-C 124 signals SDN controller 128 to install a downlink and uplink GTPU flow(s) for each UE 102 bearer(s) using the SGW-U S5U FTEID and PGW-U S5U FTEID for each UE 102 bearer(s) to be serviced by SGW-U 120 and PGW-U 126 and the new UE 102 PDN IP address.

At 722, SDN controller 128 installs the downlink/uplink GTPU flow(s) for each UE 102 bearer(s) to be serviced by PGW-U 126.

At 724, PGW-C 124 sends Modify Bearer Response messaging to SGW-C 118 including the PGW-U S5U FTEID for each UE 102 bearer(s) and the new UE 102 PDN IP address. At 726, SGW-C 118 signals SDN controller 128 to install an uplink GTPU flow(s) for each UE 102 bearer(s) using the PGW-U S5U FTEID for each UE 102 bearer(s). At 728, SDN controller 128 installs the uplink GTPU flow(s) for SGW-U2. At 730, SGW-C 118 sends MME 112 Modify Bearer Response messaging including the SGW-U S1U FTEID for each UE 102 bearer(s) and the new UE 102 PDN IP address. At 732, MME 112 stores the SGW-U S1U FTEID for each UE 102 bearer(s) to be serviced by SGW-U 120.

At 734, MME 112 sends TAU Accept messaging to UE 102 via eNodeB 162a. In at least one embodiment, TAU Accept messaging for a split control and user plane architecture, such as architecture 100, can be enhanced to provide for the ability to carry a PDN Address Allocation (PAA) to a given UE in an EPS Bearer Status indication. Thus, the TAU Accept messaging at 734 can include, at least in part, the new UE 102 PDN IP address in an EPS Bearer Status indication for a given bearer. In one embodiment, a new UE PDN IP address can be signaled in the EPS Bearer Status for the default bearer established for a PDN connection for a given UE to a given APN. At 736, UE 102 sends MME 112 a TAU Complete message via eNodeB 162a.

For the embodiment shown in FIGS. 7A-7B, it is assumed that UE 102 initiates Service Request messaging toward the core network at 738 via eNodeB 162a. At 740, eNodeB 162a sends the Service Request to MME 112. At 742, MME 112 responds with Initial Context Request messaging including the SGW-U S1U FTEID for each UE 102 bearer(s) to which eNodeB 162a responds with an Initial Context Response at 744 including the eNodeB S1U FTEID for each UE 102 bearer(s). At 746, MME 112 sends SGW-C 118 Modify Bearer Request messaging including the eNodeB S1U FTEID for each UE 102 bearer(s) serviced by the eNodeB 162a. At 748, SGW-C 118 signals SDN controller 128 to program the eNodeB S1U FTEID into each UE 102 bearer(s) flow to plumb the SGW-U S1U FTEID with the eNodeB S1U FTEID for each UE 102 bearer(s). At 750, SDN controller 128 programs the flow(s) for SGW-U 120 and at 752, SGW-C 118 sends a Modify Bearer Response to MME 112 indicating completion of the installation of the flow(s) for the UE 102 bearer(s).

Figure 8:
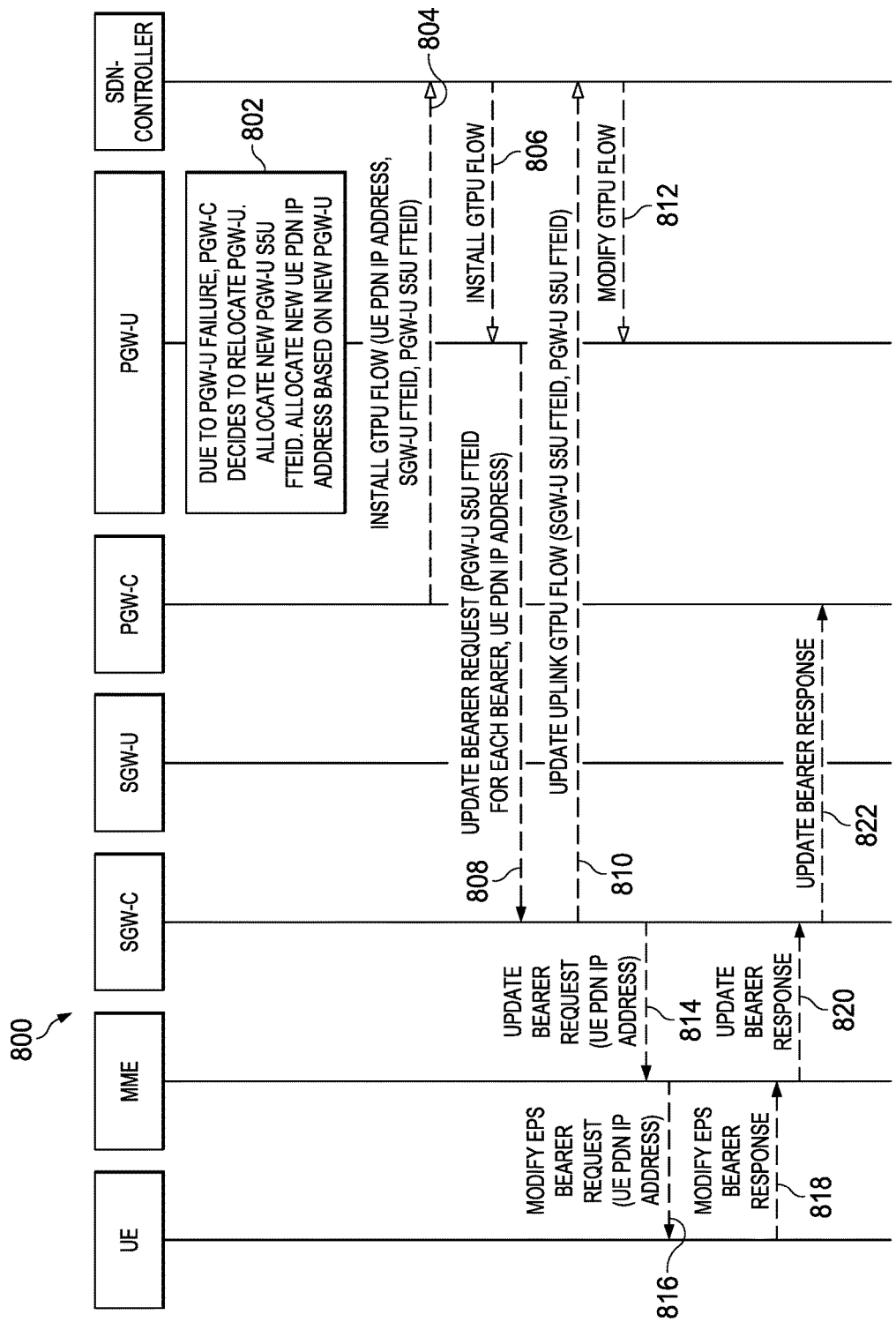
FIG. 8 is a simplified interaction diagram illustrating example details that can be associated with an example call flow in which change of a user data plane entity is initiated by a control plane entity in accordance with one potential embodiment.

Turning to FIG. 8, FIG. 8 is a simplified interaction diagram 800 illustrating example details that can be associated with an example call flow for a split control and user plane architecture in which a change of a user data plane entity is initiated by a control plane entity in accordance with one potential embodiment. In various embodiments, the change of the user plane entity can be due to load rebalancing, physical or virtual (e.g., VM, VNF) equipment failure or restart, combinations thereof or the like.

Consider, for example, the failure of a user plane forwarding element. Whenever a user plane forwarding element fails, the SGW-C or the PGW-C (e.g., depending on whether there has been an SGW-U or PGW-U failure, respectively) can detect the failure and can attempt to move the user plane entity for one or more subscriber(s) associated with the failed entity to another user plane entity. For such scenarios it would be beneficial for 3GPP standards to support the informing of a change of user plane entity FTEID across the PGW-C to the SGW-C to the MME and to the eNodeB servicing the subscriber(s) and also the change of UE PDN IP Address(es) (e.g., due to a change of PGW-U) from the PGW-C to the SGW-C and to the MME. The call flow shown in the embodiment of FIG. 8 illustrates example procedures and messaging that highlights how a change of a PGW-U user plane entity can be provided as a standalone solution in accordance with one potential embodiment. Note the failed PGW-U is not illustrated in FIG. 8. Although not shown, it should be understood that a change of a SGW-U user plane entity can also be provided in accordance with one potential embodiment using techniques similar to those as described herein for relocation of a PGW-U.

There are at least two possible cases in which changing a user plane entity can be triggered. In one case, for example, PGW-C 124 can initiate a PGW-U change. In such a case, due to the PGW-U change, a given UE's (e.g., UE 102) PDN IP address can change. Hence, a method for signaling the UE the changed IP address is needed. In another case, for example, SGW-C can initiate a SGW-U change; however, the UE IP address will not be changed in this case. While the present disclosure addresses cases in which a UE PDN IP address can be changed, handling cases in which the UE PDN IP address will not be changed is not outside its broad and expansive scope. It is anticipated that this disclosure would indeed be applicable to cases in which a given UE's PDN IP address will not be changed and a myriad of other alternatives, which may be associated with split control and user plane architectures.

FIG. 8 includes UE 102, MME 112, SGW-C 118, SGW-U 120, PGW-C 124, PGW-U 126 and SDN controller 128. The embodiment shown in FIG. 8 illustrates a base set of example messaging and procedures 802-822 related to an example use case in which PGW-C 124 initiates a PGW-U change to PGW-U 126. It should be noted that the base set of messaging and procedures can be applied to other cases involving changing a user plane entity during mobility procedures such as, for example, Service Request procedures, S1 Handover procedures and/or X2 Handover procedures.

At 802, PGW-C determines a failure of a PGW-U servicing flows for UE 102 and decided to perform a PGW-U relocation for UE 102. Upon determining that the PGW-U relocation is needed, PGW-C 124 determines that PGW-U 126 is the data plane entity nearest to eNodeB 162a serving UE 102 using techniques as discussed herein based on a ULI associated with UE 102 and allocates a PGW-U S5U FTEID for each UE 102 bearer(s) to be serviced by PGW-U 126. PGW-C 124 also allocates a new PDN IP address for UE 102 for the corresponding PGW-U 126 allocated to service flows for UE 102 for the UE's PDN connection to a given APN. In one embodiment, PGW-C 124 can allocate a new PDN IP address for UE 102 from a pool of IP addresses served by the selected PGW-U 126 using DHCP, SLAAC or some similar allocation means.

At 804, PGW-C 124 signals SDN controller 128 to install a downlink and uplink GTPU flow(s) for each UE 102 bearer(s) using the SGW-U S5U FTEID and PGW-U S5U FTEID for each UE 102 bearer(s) to be serviced by SGW-U 120 and PGW-U 126 and the new UE 102 PDN IP address. At 806, SDN controller 128 installs the downlink/uplink GTPU flow(s) for each UE 102 bearer(s) to be serviced by PGW-U 126.

At 808, PGW-C 124 sends SGW-C 118 an Update Bearer Request including, at least in part, the PGW-U S5U FTEID for each UE 102 bearer(s) and the new UE 102 PDN IP Address. At 810, SGW-C 118 signals SDN controller 128 to update uplink GTPU flow(s) for each UE 102 bearer(s) using the SGW-U S5U FTEID and PGW-U S5U FTEID for each UE 102 bearer(s) currently serviced by SGW-U 120 and to be serviced by PGW-U 126. At 812, SDN controller 128 modifies the uplink GTPU flow(s) for PGW-U 126.

At 814, SGW-C 118 sends an Update Bearer Request to MME 112 including, at least in part, the new UE 102 PDN IP address. For the embodiment shown in FIG. 8, the change of UE 102 PDN IP address is communicated to UE 102 via a Modify EPS Bearer Request (Req) procedure by carrying the new UE 102 PDN IP address as a new parameter in Modify EPS Bearer Req messaging as shown at 816. At 818, UE 102 sends MME 112 (e.g., via eNodeB 162a) Modify EPS Bearer Response (Rsp) messaging indicting successful modification of the EPS bearer(s) for UE 102 for the PDN connection. At 820, MME 112 sends a Modify Bearer Response to SGW-C 118. At 822, SGW-C 118 sends a Modify Bearer Response to PGW-C 124.

In some embodiments, a user plane entity relocation can be supported without a need for using the modified call flows illustrated in FIGS. 2A-2B, 3A-3B, 4A-4B, 5A-5B, 6A-6B and 7A-7B by using the base set of messaging and procedures as follows:

1) Current mobility procedures can be performed as are performed in current deployments except that a given MME can indicate to a given SGW-C and subsequently the SGW-C can indicate to a given PGW-C whether a change of a user plane entity is desired for a given UE based on UE's target TAI, Routing Area Identity (RAI), etc.;

2) Subsequent mobility procedures can complete without any further modification in call flows as is currently provided per 3GPP TS 23.401; and 3) At the end of the mobility procedures, the PGW-C and/or the SGW-C can trigger standalone modification of a corresponding user plane entity (e.g., standalone modification of a PGW-U as shown in the embodiment of FIG. 8).

Thus, in various embodiments, a PGW-C and/or a SGW-C initiated user plane entity relocation can provide simplified network procedures that can be included in 3GPP standardization.

In various embodiments, various protocol changes may be needed for 3GPP standards in order to accommodate the messaging and/or procedures illustrated in the embodiments of FIGS. 2A-2B, 3A-3B, 4A-4B, 5A-5B, 6A-6B, 7A-7B and 8.

In certain embodiments, to support UE PDN IP address change during Service Request, X2 and S1 Handover (HO) procedures, modifications to 3GPP standards can include, but not be limited to:

1) Configuring Modify EPS Bearer Request messaging to carry an updated UE PDN IP address. (e.g., change to TS 24.301); and 2) Configuring MME 112 to send a Modify Bearer Request to SGW-C 118 and then to PGW-C 124 for Service Request, X2 HO and/or S1 HO if there is a need to change a PGW-U for a new location of a given UE (e.g., UE 102);

In certain embodiments, to support a UE PDN IP address change during TAU procedures, modifications to 3GPP standards can include, but not be limited to:

1) Providing for the addition of PGW-U S5U FTEID for each UE bearer(s) in Modify Bearer Response messaging (e.g., change to 3GPP TS 29.274);

2) Providing for the addition of PDN Address Allocation (PAA) in a Modify Bearer Response (e.g., change to 3GPP TS 29.274);

3) Providing a Modify Bearer Request sent from MME 112 to SGW-C 118 after an Initial Context Setup with eNodeB 162*a*, which can be carried up to PGW-C 124 if a direct user plane path between a given PGW-U (e.g., PGW-U 126) and eNodeB 162*a* (e.g., bypassing SGW-U) is setup [Note architectural implications of taking an SGW-U out of the data path for a given UE and how to handle such a change is discussed in further detail below];

4) Providing for the ability to carry a PDN Address Allocation (PAA) to a given UE in a TAU Accept along with EPS Bearer Status;

5) Providing for changes to the Gx interface to update an IP Connectivity Access Network (IP-CAN) session with a new IP-CAN address (e.g., changes to 3GPP TS 23.203 and TS 29.212);

6) Providing an indicator from a given UE to the network indicating that the UE supports receiving a modified PDN IP address and based on such an indication, a network control plane entity (e.g., MME 112, PGW-C 124, etc.) determines whether to change the PGW-U address for the UE; and 7) For embodiments in which the MME 112 and SGW-C 118 are collapsed into a same virtualized network function (VNF), VM or a common physical node, the changes can include:

a) Providing for the ability for a combined MME and SGW-C functionality in a mobility controller, to directly program user plane flows by plumbing (e.g., installing or modifying) flow(s) for a given UE to include a SGW-U S1U FTEID and eNodeB S1U FTEID for each UE bearer(s) following a UE Initial Context Request and thus avoiding a Modify Bearer Request from the MME to the SGW-C. In some embodiments, the mobility controller can also be configured to include PGW-C functionality.

In one embodiment, the system and method provided by the split control and user plane architecture 100 can provide at least one advantage by reducing the number of messages needed for user plane entity relocation during UE mobility in comparison to the existing SIPTO based solution provided by 3GPP standards. Note, the standard SIPTO based solution provides for a PGW user plane entity relocation as opposed to the control and user plane split provided by the embodiments discussed herein, which provides for a PGW-U user plane entity. Thus, a PGW, as discussed below, is discussed in relation to the SIPTO based solution.

For the standard SIPTO based solution for changing of a user plane entity during mobility, the number of messages communicated in the network can include:

1) A Deactivate EPS Bearer Context Request from a given MME to a given UE and a Deactivate EPS Bearer Context Accept from the UE to the MME (2 messages); or Detach Request/Detach Accept (e.g., if it's the last PDN connection for the UE);

2) A Delete Session Request from the MME to a given SGW and from the SGW to a given PGW (2 messages) and a Delete Session Response for the return path (2 messages). In total, 4 messages are sent for a Delete Session Transaction [Note, the term 'transaction' can be used herein to refer to a set of one or more requests and one or more responses that can be exchanged for a given procedure (e.g., a Delete Session procedure)];

3) A Credit Control Request Termination (CCR-T) to terminate the IP-CAN session from the PGW to a given PCRF and a Credit Control Answer (CCA) from the PCRF to the PGW (2 messages);

4) A UE requested PDN Connectivity Activation Request (1 message);

5) Assuming that a PGW address for the APN-FQDN is available in a local DNS cache for the PGW, then no messaging would be needed to determine the APN-FQDN;

6) A Create Session Request from the MME to the SGW and from the SGW to the PGW (2 messages) and a Create Session Response for the return path (2 messages). In total 4 messages are sent for a Create Session Transaction;

7) A Credit Control Request Initial (CCR-I) message and CCA between the PGW and the PCRF for IP-CAN session creation (2 messages);

8) A PDN Connectivity Accept sent to the UE (1 message);

9) A Bearer Setup message between the MME and a given eNodeB (2 messages); and/or 10) A Modify Bearer Request/Response between the MME and the SGW for setting up an S1-U tunnel. (2 messages)

Thus, the total number of messages for the standard SIPTO based solution can include at least 20 messages communicated in the network. In cases in which a given UE is detached (e.g., if the PDN deactivated is the last PDN of the UE), then reattach from the UE also triggers an Authentication procedure, an Update Location Request (ULR) procedure, etc. with a given HSS, which can include at least 4 more messages (e.g., if authorization vectors for the UE are already available at the MME) and at maximum 6 more messages (e.g., if authorization vectors for the UE are not already available at the MME) in which case the total number of messages can increase to 26 messages.

Consider, in contrast, the number of messages that can be used in at least one embodiment of the system and method provided by architecture 100 for a change of a user plane entity (e.g., PGW-U) during mobility. For the message count discussed herein, it is assumed that the DNS query for a PGW-U S5U address for a requested APN FQDN+TAI/eNodeB FQDN is responded to via a DNS local cache configured for PGW-C 124; thereby the number of DNS messages (e.g., a DNS message count) is excluded from the message count. Note the DNS message count was also excluded for the count for the SIPTO based solution discussed above.

For the solution provided by architecture 100 for changing of user plane entity during mobility, the number of messages communicated in the network can include:

1) Modify Bearer Request carried from SGW-C 118 to PGW-C 124 to inform the ULI of UE 102 and request for a new PGW-U address and the Response back (2 messages); or using the new Provide User Plane Endpoint Req/Rsp messaging from MME 112 to SGW-C 118 and to PGW-C 124 (4 messages) depending on whether, respectively, the alternatives discussed for the embodiments shown in FIGS. 3A-3C and 6A-6C are used (e.g., no new Provide User Plane Endpoint Req/Rsp) or the alternatives shown in FIGS. 2A-2B and 5A-5B are used (e.g., in which the new Provide User Plane Endpoint Req/Rsp is provided);

2) E-RAB Modify Req/Rsp between MME 112 and a given eNodeB (2 messages) if alternatives discussed for the embodiments shown in FIGS. 3A-3C and 6A-6C are used;

3) Interactions between SGW-C 118, PGW-C 124 and SDN controller 128 (if implemented) and user plane routers (e.g., SGW-U 120, PGW-U 126) (5 messages, as shown in the call flows above);

4) In case of a Service Request, S1 Handover or X2 Handover procedure, 2 more messages can be provided towards UE 102 to inform the UE of its new PDN IP address (e.g., Modify EPS Bearer Context/Rsp); and/or 5) Two (2) messages between PGW-C 124 and PCRF 116 to update the IP address of the IP-CAN session (not shown in any of the FIGURES) for UE 102.

Thus, in various embodiments, the total number of messages that can be used for architecture 100 can be 11 or 13 messages for a Service Request/S1/X2 Handover procedure, depending on the chosen alternative, and 9 messages for the TAU procedure. Accordingly, embodiments provided via architecture 100 can provide for changing a user plane entity (e.g., PGW-U, SGW-U) during mobility more efficiently than the existing SIPTO based solution. For example, the number of messages saved can be found as (26−13)=13, which exemplifies up to a 50% reduction in signaling (e.g., 13/26*100=50%).

In various embodiments, the solutions and alternatives provided by architecture 100 can provide for one or more of the following:

1) Providing new 'Provide User Plane Endpoint' and 'Provide User Plane Endpoint Response' messaging in GTP, which can be used to obtain any changed user plane FTEID from a given SGW-C and/or a given PGW-C during mobility procedures. In various embodiments, these new messages can provide for in-place selection of a new user plane entity as illustrated for FIGS. 2A-2B and FIGS. 5A-5C;

2) Providing for the ability to select a new user plane entity at the core network as part of existing mobility procedures while updating the new user plane entity information to the RAN (e.g., to a given UE) at the end of the procedure using existing E-RAB modify procedures as illustrated for FIGS. 3A-3C and 6A-6C;

3) Providing for the ability to select a user plane entity by a given MME during mobility procedures [Note providing for selection by the MME was discussed earlier in relation to FIGS. 1A and 1B but is not illustrated in the remaining FIGURES];

4) Providing for the ability for a given MME to indicate to a given SGW-C in a Modify Bearer Request that a change of user plane entity is needed;

5) Providing for the ability to select a user plane entity by a given SGW-C and/or a given PGW-C during mobility procedures (e.g., based on ULI or FTEID, as discussed herein);

6) Providing for the ability for a given MME to indicate to a given SGW-C that a ULI being sent is only to aid the SGW-C in SGW-U selection and not to be forwarded to a given PGW-C (e.g., in case there was no ULI reporting subscription by the PGW-C);

7) Providing for the ability to facilitate a standalone change of a PGW-U and/or a SGW-U user plane entity address/TEID as a base procedure;

8) Providing for the ability to change a user plane entity at the end of mobility procedures by invoking the standalone change of user plane entity (e.g., as illustrated for the embodiment shown in FIG. 8); thereby providing a minimal set of base messaging and procedures for the core network, which can be reused for Service Request, S1 HO and/or X2 HO procedures;

9) Providing for the ability to allocate of a new FTEID for a selected user plane entity by a given SGW-C and/or a given PGW-C during mobility procedures;

10) Providing for modified Service Request, X2 Handover and S1 handover procedures;

11) Providing for the ability to install or update the GTPU flow(s) in a selected user plane entity either directly from a given SGW-C and/or a given PGW-C or through an SDN controller;

12) Providing for the ability to inform a given UE about a change of its PDN IP address through one of: (a) a Modify EPS Bearer Request if the PDN IP address gets changed during connected mode procedures such as a Service Request, an X2 and/or an S1 Handover; or (b) an EPS Bearer Status in a TAU Accept if the PDN address gets changed through TAU procedure;

13) Providing for the ability to signal the Gx session regarding a PDN IP address change for an IP-CAN session for a given UE;

14) When the MME and the SGW-C are collapsed into a same virtual VNF, VM or a physical node, providing for: (a) the ability for the combined MME/SGW-C (e.g., mobility controller) to directly program user plane flows by plumbing the SGW-U S1U FTEID and eNodeB S1U FTEID for each UE bearer(s) after an UE Initial Context Request and thereby avoiding a Modify Bearer Request from the MME to the SGW-C for this; and/or (b) an SDN Controller to directly trigger the mobility controller to page a given UE instead of going to the SGW-C and then sending a Downlink Data Notification (DDN) to the UE.

As discussed above, in some embodiments, an SGW-U can be removed from the data plane path for a user/UE. Per existing 3GPP EPC standards for a non-split architecture an SGW can serve as the local mobility anchor for a UE, aggregating all the PDN connections from the UE and then fanning out each PDN connection's control and user plane tunnels towards the respective PGWs. In a split control and user plane architecture, such as, for example architecture 100, the SGW control plane function remains intact (SGW-C) and it continues to play the role of a control plane mobility anchor. However on the user plane side, for specific APNs, the SGW-U can be taken out of the data plane path and the PGW-U can directly connect to the eNodeB user data plane.

An inquiry regarding roaming support might be raised in a scenario involving a PGW-U located in a Home Public Land Mobile Network (HPLMN) and an eNodeB located in a Visited PLMN (VPLMN). However, for a HPLMN routed roaming case, the PGW-U will typically be located in the HPLMN, which could be far away from the VPLMN. Thus, changing the PGW-U on mobility of a given UE, which would be an event occurring in the VPLMN, likely wouldn't provide much benefit. Hence for HPLMN routed roaming cases, a given MME can be configured to not try to inform a given PGW-C to trigger a change of PGW-U. In other words, for HPLMN routed roaming cases, there may be no change to the existing EPC architecture. Thus, cases in which an SGW-U might be removed from a data path might include non-roaming cases and VPLMN local breakout cases.

Another inquiry might be raised regarding SGW-U removal for idle and active state transitions. Typically, a PGW-C can be signaled to determine a PGW-U for a corresponding UE location (e.g., as determined via a Service Request, etc.), which could lead to the PGW-C experiencing increased signaling. However, the signaling might be mitigated under two scenarios, which are discussed below in reference to FIGS. 9 and 10.

Figure 9:
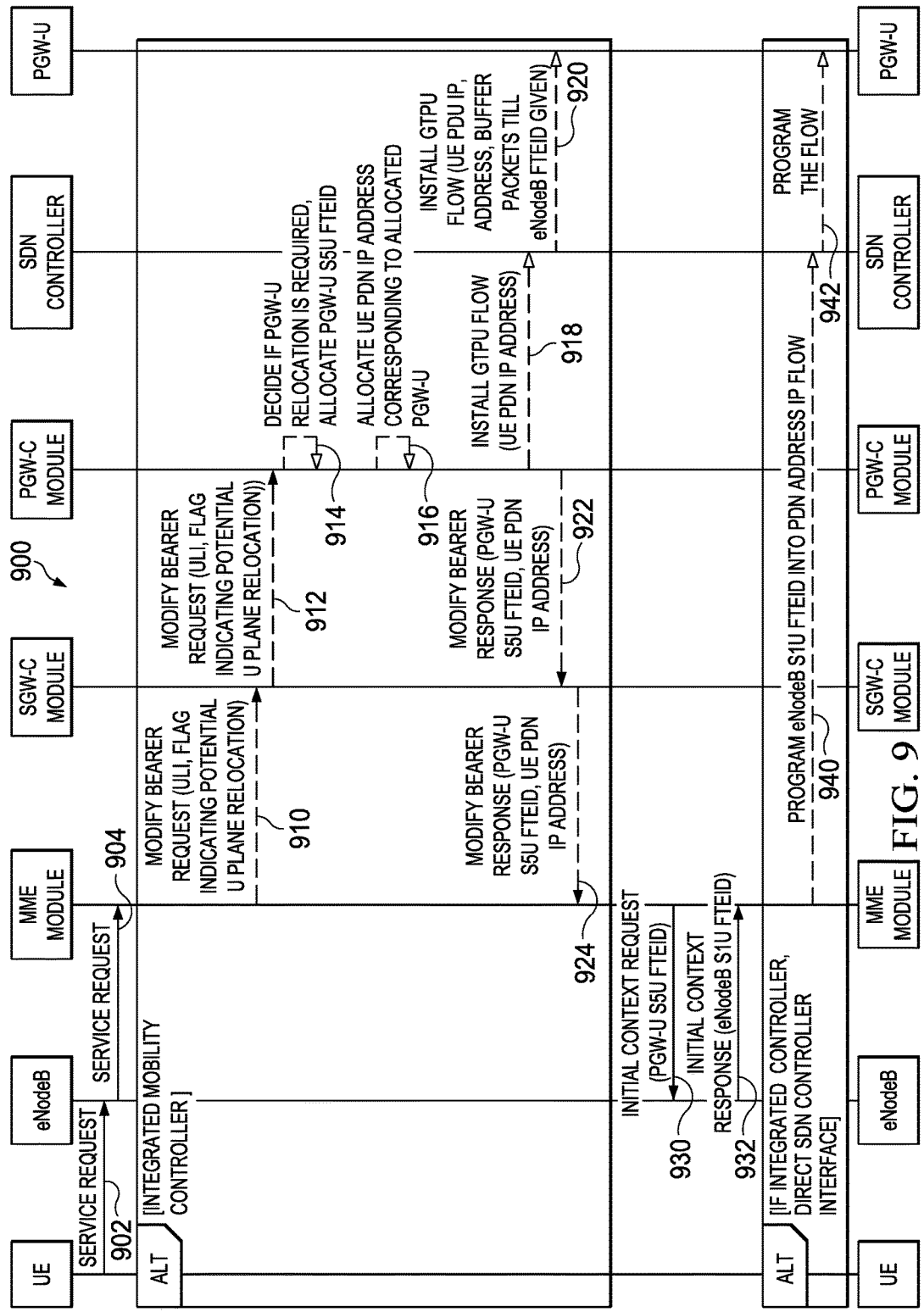
FIG. 9 is a simplified interaction diagram illustrating example details that can be associated with an example call flow for a user equipment triggered service request in accordance with one potential embodiment.

Referring to FIG. 9, FIG. 9 is a simplified interaction diagram 900 illustrating example details that can be associated with an example call flow for a first scenario associated with a UE triggered service request in accordance with one potential embodiment. For the embodiment shown in FIG. 9, the PGW-C 124 is consulted to change a PGW-U and PDN address only if the MME determines (e.g., based on DNS response/local configuration) that the PGW-U needs to be changed. Most of the time, however, IDLE/ACTIVE state transitions happen when the UE is immobile. In such cases PGW-U will not likely be changed for the given UE, hence signaling to PGW-C can be discounted.

For the embodiment shown in FIG. 9, the dashed-lines having open arrows are new messages and/or procedures that can be provided for this solution; the dashed-lines having closed arrows (e.g., Modify EPS Bearer Request, Response, etc.) are existing messages and/or procedures that are to be modified to include new parameters for the embodiment shown in FIG. 9; and the solid-lines having arrows are existing messages as prescribed by 3GPP standards.

Messages and/or procedures at 910-924 are associated with a first alternative embodiment in which it is assumed that MME functionality, SGW-C functionality and PGW-C functionality are integrated into a combined mobility controller. The mobility controller can include a MME module to provide MME functionality as described herein, an SGW-C module to provide SGW-C functionality as described herein and a PGW-C module to provide PGW-C functionality as described herein. Each module for the mobility controller can interface with each other and/or with external elements or nodes using procedures and messaging as described for the embodiment of FIG. 9. Messaging at 940-942 are associated with a second alternative embodiment in which the MME module of the mobility controller and a given SDN controller (e.g., SDN controller 128) are configured with an interface to facilitate direct messaging between the mobility controller and the SDN controller.

At 902, a given UE (e.g., UE 102) 102 sends a NAS service request to a given eNodeB (e.g., eNodeB 162a), which forwards the NAS Service Request to the MME module of the mobility controller at 904. In one embodiment, the eNodeB can include a ULI (e.g., TAI+ECGI) for the eNodeB in the NAS Service Request. At 910, the MME module sends the SGW-C module Modify Bearer Request messaging including the ULI for UE 102/eNodeB 162a and a flag indicating that the ULI inclusion is to aid to the PGW-C module in selecting a PGW-U to service one or more flows for UE 102. At 912, the SGW-C module sends the Modify Bearer Request messaging to the PGW-C module.

At 914, the PGW-C module can decide whether a PGW-U relocation is needed and, for purposes of the embodiment shown in FIG. 9, PGW-C 124 decides that a PGW-U relocation is needed for servicing flows for UE 102. Upon determining that the PGW-U relocation is needed, the PGW-C module determines that a given PGW-U (e.g., PGW-U 126) is the data plane entity nearest to eNodeB 162a serving UE 102 using techniques as discussed herein and allocates a PGW-U S5U FTEID for each UE 102 bearer(s). The PGW-C module can use the ULI as an identifier to select the target PGW-U for relocation. At 916, the PGW-C module allocates a new PDN IP address for UE 102 for the corresponding PGW-U allocated to service flows for UE 102 for the UE's PDN connection to a given APN. In one embodiment, the PGW-C module can allocate a new PDN IP address for UE 102 from a pool of IP addresses served by the selected PGW-U using DHCP, SLAAC or some similar allocation means. The signaling at 910-916 can be performed internal to the mobility controller.

At 918, the PGW-C module signals the SDN controller to install an uplink GTPU flow(s) for each UE 102 bearer(s) using the new UE 102 PDN IP address. At 920, the SDN controller installs the uplink GTPU flow(s) for each UE 102 bearer(s) to be serviced by the allocated PGW-U. The SDN controller programs the PGW-U to buffer any downlink packets for the UE until the eNodeB FTEID is installed for downlink UE flow(s).

At 922, the PGW-C module sends Modify Bearer Response messaging to the SGW-C module including the PGW-U S5U FTEID for each UE 102 bearer(s) and the new UE 102 PDN IP address. At 924, the SGW-C module sends the MME module Modify Bearer Response messaging including the PGW-U S5U FTEID for each UE 102 bearer(s) and the new UE 102 PDN IP address.

At 930, the MME module sends an S1AP Initial Context Setup Request message including the PGW-U S1U FTEID for each UE 102 bearer(s) currently serviced by the PGW-U to the eNodeB. After radio bearer establishment and an exchange of uplink packets (e.g., similar to that shown at 306, 308 in FIG. 3A), the eNodeB sends the MME module S1AP Initial Context Setup Complete messaging including an eNodeB S1U FTEID for each UE 102 bearer(s) serviced by the eNodeB. Once the S1 UE Initial Context Setup is completed with the eNodeB and the new eNodeB S1U FTEID is obtained, it can be programmed in the PGW-U (e.g., since SGW-U is bypassed) such that when a downlink packet arrives for the UE 102 from the Gi side, the PGW-U knows where to route the packet.

In one embodiment, the programming for downlink GTP-U flow(s) for the PGW-U can be provided in a manner similar to that as shown in 918 and 922 in which the PGW-C module interfaces with the SDN controller to program the downlink GTP-U flow(s) for the PGW-U. In another embodiment, the programming for the downlink GTP-U flow(s) can be provided as shown in 940 in which the MME module of the mobility controller directly interfaces with the SDN controller and instructs the SDN controller to program the eNodeB S1U FTEID into PDN IP address flow(s) for UE 102. At 942, the SDN controller can program the flows into the PGW-U.

Figure 10:
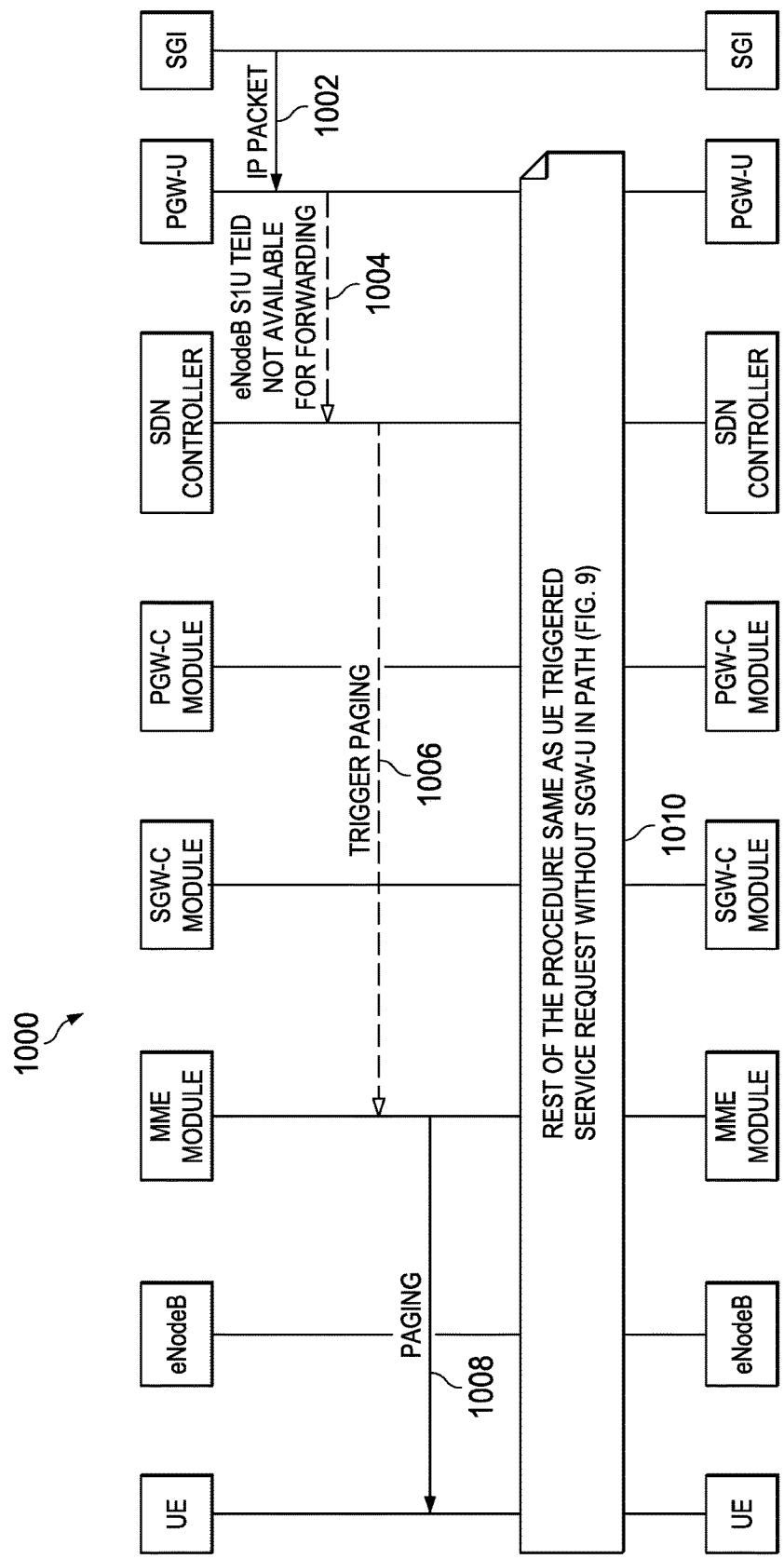
FIG. 10 is a simplified interaction diagram illustrating example details that can be associated with an example call flow for a network triggered service restoration procedure in accordance with one potential embodiment.

Referring to FIG. 10, FIG. 10 is a simplified interaction diagram 1000 illustrating example details that can be associated with an example call flow for a second scenario associated with a network triggered service restoration procedure in accordance with one potential embodiment. The embodiment shown in FIG. 10 provides additional example details that can be provided for a mobility controller deployment, for example, as discussed for FIG. 9, in which MME functionality, SGW-C functionality and PGW-C functionality can be combined into a mobility controller.

For the embodiment shown in FIG. 10, if a downlink packet from the SGi interface (e.g., from internet 150 and/or operator IP service(s) 140) reaches the PGW-U as shown at 1002 and if a given UE is IDLE, the router (e.g., the PGW-U) will not have the corresponding eNodeB S1U FTEID for a given eNodeB needed to forward the packet. In this scenario, the PGW-U can inform the mobility controller (via an SDN Controller, if deployed) as shown at 1004, 1006 that the PGW-U does not have S1U eNodeB FTEID to trigger paging for the UE. In turn, the mobility controller can page the UE as shown at 1008. Once the UE responds to paging through a Service Request, then the procedure can proceed in a manner similar to that as shown in the first UE triggered Service Request scenario of FIG. 9.

Note, per the Open Networking Foundation (ON F) Wireless and Mobile Networks Working Group (MNWG) architecture, when a downlink packet is received by an Openflow™ (OF) capable switch while a given UE is IDLE, the OF switch can inform SDN controller (if deployed), the SDN controller can inform the SGW-C which can then trigger a DDN. However, this path of signaling can be avoided if a combined mobility controller is used. When the SGW-U is not involved in user plane communication, the SGW-C does not need knowledge regarding the eNB S1U FTEID; thus, SGW-C signaling can be removed.

Another inquiry might arise regarding whether the PGW-C might see increased signaling for X2 or S1 handover procedures with the SGW-U being removed from the user plane path. However, in at least one embodiment, it is assumed that one benefit of the split control and user plane architecture 100 having a distributed user plane is to address heavy data usages and low latency data usages during low mobility and/or immobile scenarios.

Even if there is a large number of UEs moving around, UEs/subscribers typically move around within the parts of a common area, province or city. In such cases, the PGW-U will likely remain the same and hence PGW-C will likely not be signaled. In cases where UE mobility requires a PGW-U change, PGW-C of course will be signaled and UE PDN address will be changed. It is these scenarios of low mobility or immobility or mobility within a common area, province or city where an optimized solution, compared to existing methods, is provided by architecture 100 for informing a PDN address change to the UE without deactivating and reactivating PDN.

Another inquiry might arise regarding the role (e.g., functions, processing, etc.) of an SGW-C for a UE that has had every PDN for the UE removed from a SGW-U data path as to whether the role of the SGW-C can be collapsed (e.g., combined) into the MME. In such cases, the SGW-C's role can get collapsed into the MME. However, in cases in which UEs have some PDNs without SGW-U in the path and some PDNs with SGW-U in the path, then the SGW-C in such cases can act as a control plane mobility anchor node which closely interacts with the SGW-Us for PDNs that have the SGW-Us in the path.

A feature called Dedicated Core Network Elements (DE-COR) is currently being worked among 3GPP standards working groups for Release 13. For DECOR, a core network can be dedicated to a given UE based on characteristics of the UE and/or the type of services used by the subscriber associated with the UE. In at least one embodiment, this feature can be extended to a virtualized architecture, such as architecture 100, in which a virtualized packet core for low mobility and/or low latency UEs can be selected. Logic can be provided in at least one embodiment to support a control and user plane separation and/or SGW-U removal from a UE data path using the techniques discussed herein.

This will allow for eased deployment of control and user plane separation for a special set of applications initially while maintaining the existing 3GPP packet core for other normal UEs. Migration towards a full control and user plane separation architecture to accommodate all UEs can then proceed based on the latency requirements and network manageability concerns.

Figure 11:
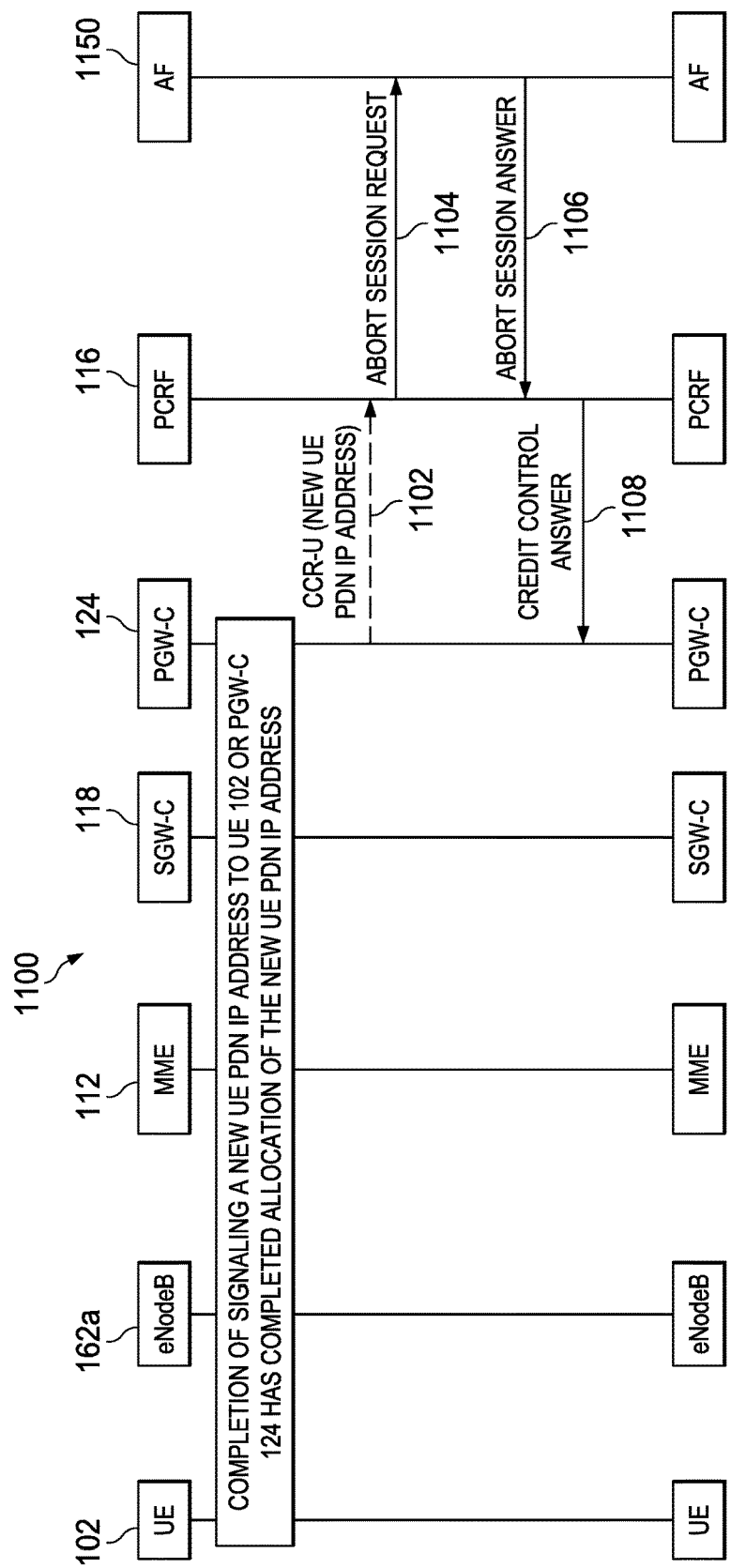
FIG. 11 is a simplified interaction diagram illustrating example details that can be associated with an example call flow for updating session information for a policy server following relocation of a user data plane entity in accordance with one potential embodiment.

Turning to FIG. 11, FIG. 11 is a simplified interaction diagram 1100 illustrating example details that can be associated with an example call flow for updating session information for a policy server following relocation of a user data plane entity in accordance with one potential embodiment. FIG. 11 includes UE 102, MME 112, SGW-C 118, PGW-C 124, PCRF 116 and an Application Function (AF) 1150. The example details shown in the embodiment shown in FIG. 11 can be performed assuming either PGW-U relocation signaling and operations have been completed to signal a new UE PDN IP address to UE 102 or PGW-C has completed allocation of the new UE PDN IP address to UE 102.

At 1102, PGW-C 124 sends a Credit Control Request Updated (CCR-U) including the new UE PDN IP address allocated for UE 102 to PCRF 116 via the Gx interface (e.g., as shown in FIG. 1B). At 1104, PCRF 116 signals an Abort Session Request command to AF 1150 via an Rx interface as described in 3GPP TS 29.214, Section 5.6.7. At 1106, AF 1150 responds with an Abort Session Answer. At 1108, PCRF signals a Credit Control Answer (CCA) to PGW-C 124. The CCA can include an appropriate Result-Code Attribute Value Pair (AVP) indicating success in tear down of the session for UE 102.

After tearing down the AF session, the AF 1150 can setup the session again for UE 102. Typically, the UE 102 will re-initiate communication with an Application Server (e.g., a Proxy Call Session Control Function (P-CSCF) of an IMS) and, at that instant, the AF 1150 will re-establish the Rx Session for UE 102.

Figure 12A:
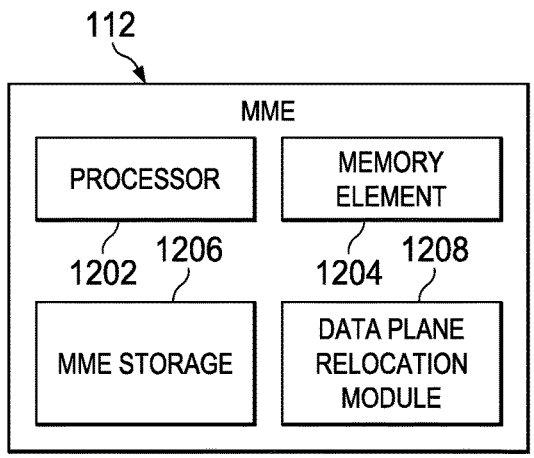
FIGS. 12A-12H are simplified block diagrams illustrating other example details that can be associated with various potential embodiments of various architectures discussed herein.
Figure 12B:
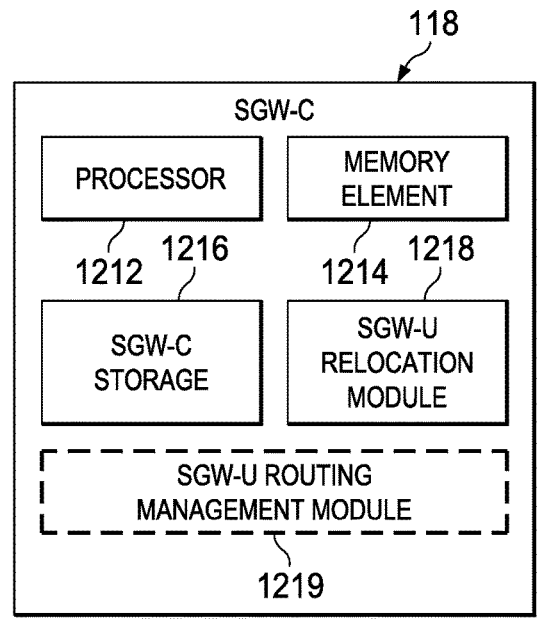
Figure 12C:
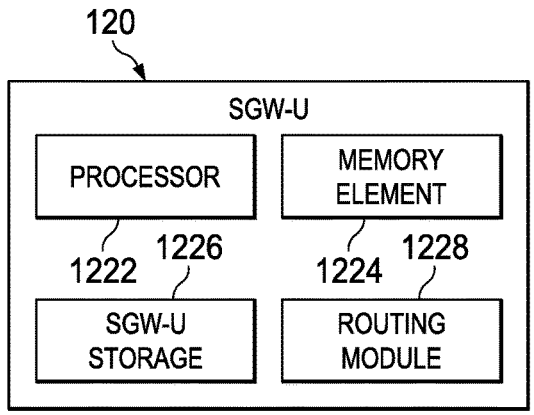
Figure 12D:
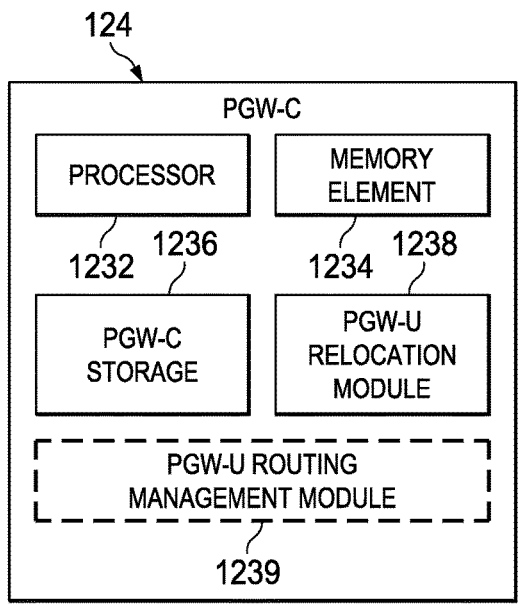
Figure 12E:
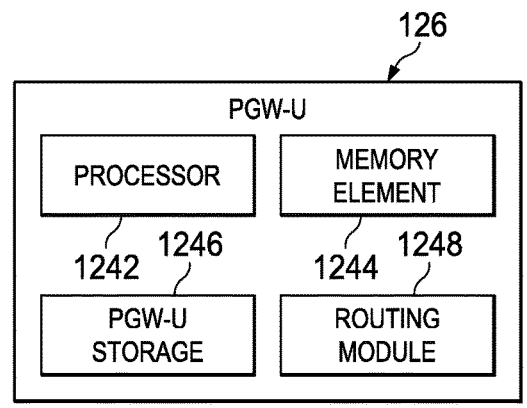
Figure 12F:
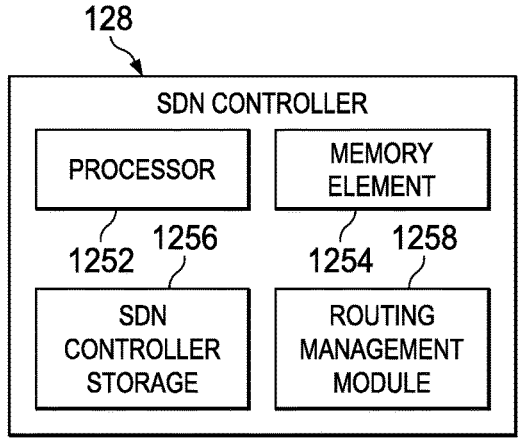
Figure 12G:
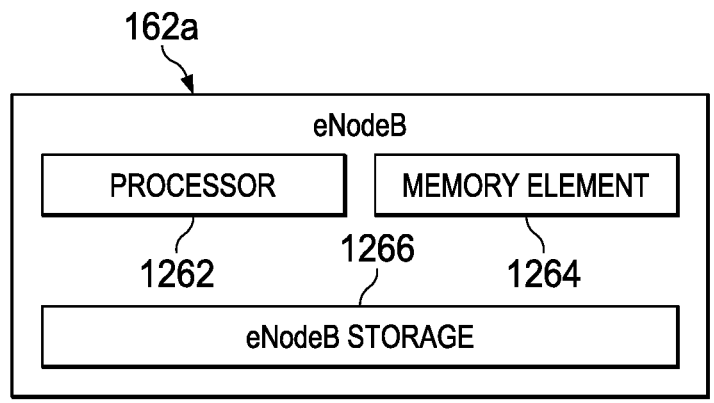
Figure 12H:
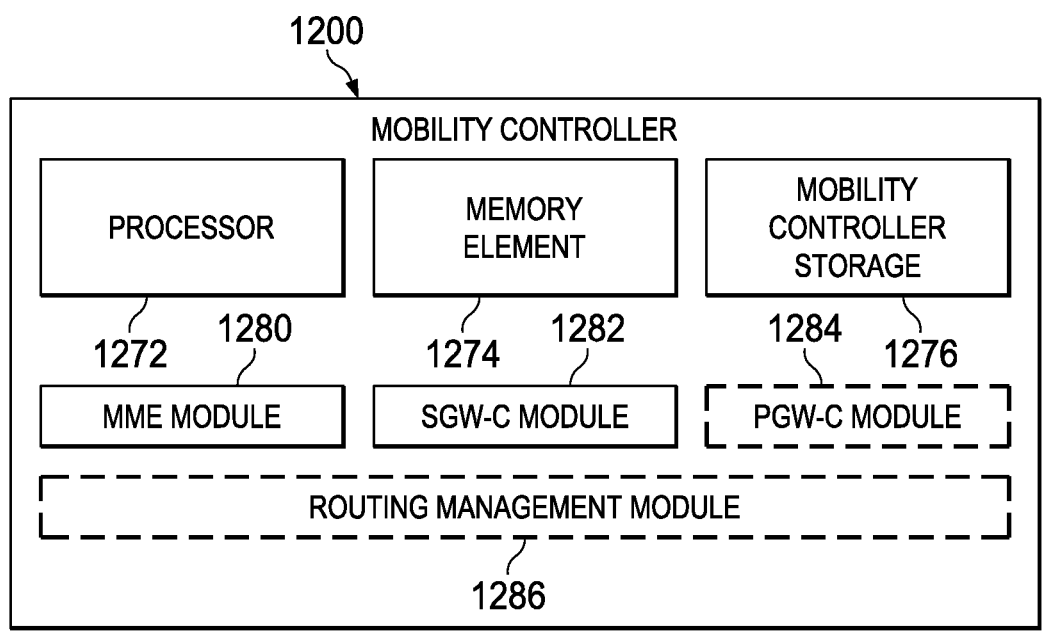

Turning to FIGS. 12A-12H, FIGS. 12A-12H are simplified block diagrams illustrating example details of various elements that can be associated with architecture 100 in accordance with one or more embodiments. FIG. 12A is a simplified block diagram illustrating example details that can be associated with MME 112 or any other MME that can be deployed in accordance with at least one embodiment of architecture 100. FIG. 12B is a simplified block diagram illustrating example details that can be associated with SGW-C 118 or any other SGW-C that can be deployed in accordance with at least one embodiment of architecture 100. FIG. 12C is a simplified block diagram illustrating example details that can be associated with SGW-U 120 or any other SGW-U that can be deployed in accordance with at least one embodiment of architecture 100. FIG. 12D is a simplified block diagram illustrating example details that can be associated with PGW-C 124 or any other PGW-C that can be deployed in accordance with at least one embodiment of architecture 100. FIG. 12E is a simplified block diagram illustrating example details that can be associated with PGW-U 126 or any other PDU that can be deployed in accordance with at least one embodiment of architecture 100. FIG. 12F is a simplified block diagram of SDN controller 128 or any other SDN controller that can be deployed in accordance with at least one embodiment of architecture 100. FIG. 12G is a simplified block diagram of eNodeB 162a or any other eNodeB (e.g., eNodeB 162b, etc.) that can be deployed in accordance with at least one embodiment of architecture 100. FIG. 12H is a simplified block diagram of a mobility controller 1200 or any other mobility controller that can be deployed in accordance with at least one embodiment. Although not shown in FIGS. 12A-12H, it should be understood that any, UE, RAN entities, control and user plane entities, etc. as described herein can be configured with various interfaces to facilitate various messaging and operations as described herein.

Referring to FIG. 12A, MME 112 or any other MME that can be deployed in accordance with at least one embodiment of architecture 100 can include at least one processor 1202, at least one memory element 1204, a MME storage 1206 and a data plane relocation module 1208. In at least one embodiment, at least one processor 1202 is at least one hardware processor configured to execute various tasks, operations and/or functions of MME 112 as described herein and at least one memory element 1204 is configured to store data associated with MME 112.

In various embodiments, data plane relocation module 1208 is configured to implement various operations as described herein, including, but not limited to: performing a look-up on a local configuration table or performing a TAI FQDN based DNS query to determine if a SGW-U and/or PGW-U relocation is needed for one or more UE) as configured for certain embodiments; exchanging new Provide User Plane Endpoint messaging with one or more SGW-Cs (e.g., SGW-C 118), if configured for certain embodiments; exchanging enhanced E-RAB Modify Request messaging including a NAS PDU carrying a new UE PDN IP address; exchanging enhanced Modify EPS Bearer messaging; exchanging enhanced TAU Accept messaging; combinations thereof or any other operations as discussed herein.

In various embodiments, MME storage 1206 can be configured to store information associated with various operations as described herein including, but not limited to, storing ULI based configuration information for one or more data plane entities, if configured for certain embodiments; storing communication protocol and/or interfacing information; combinations thereof or any other information as discussed herein.

Referring to FIG. 12B, SGW-C 118 or any other SGW-C that can be deployed in accordance with at least one embodiment of architecture 100 can include at least one processor 1212, at least one memory element 1214, a SGW-C storage 1216 and a SGW-U relocation module 1218. In at least one embodiment, at least one processor 1212 is at least one hardware processor configured to execute various tasks, operations and/or functions of SGW-C 118 as described herein and at least one memory element 1214 is configured to store data associated with SGW-C 118.

In various embodiments, SGW-U relocation module 1218 is configured to implement various operations as described herein, including, but not limited to: executing an SGW-U selection algorithm based on a ULI for a given eNodeB/UE to determine whether relocation of a given SGW-U is needed and, if so, determining the SGW-U nearest to the eNodeB/UE; allocating a new S1U FTEID and a new S5U FTEID for a relocated SGW-U for one or more UE bearer(s); exchanging new Provide User Plane Endpoint messaging with one or more MMEs (e.g., MME 112) and one or more PGW-Cs (e.g., PGW-C 124); interfacing with an SDN controller (e.g., SDN controller 128) for installing, modifying and/or deleting one or more flow(s)/flow entries for one or more SGW-Us; exchanging enhanced Modify EPS Bearer messaging; cleaning up one or more associations for relocated flows; combinations thereof or any other operations as discussed herein.

In various embodiments, SGW-C storage 1216 can be configured to store information associated with various operations as described herein including, but not limited to: storing location information configured at the SGW-C 118 and associated with SGW-Us to determine locations of the SGW-Us; storing DNS local cache information which can be used for a TAI FQDN and/or eNodeB FQDN based DNS query for SGW-U relocations; storing communication protocol and/or interfacing information; combinations thereof or any other information as discussed herein.

In at least one embodiment, SGW-C 118 can be configured with a SGW-U Routing Management Module 1219, which can be configured to install one or more flow(s) for a relocated SGW-U. In an embodiment, in which SGW-C 118 is configured with the SGW-U Routing Management Module 1219, SGW-C 118 can directly interface with SGW-Us to install flows for the SGW-Us without needing to signal an SDN controller to install flows for the SGW-Us.

Referring to FIG. 12C, SGW-U 120 or any other SGW-U that can be deployed in accordance with at least one embodiment of architecture 100 can include at least one processor 1222, at least one memory element 1224, a SGW-U storage 1226 and a routing module 1228. In at least one embodiment, at least one processor 1222 is at least one hardware processor configured to execute various tasks, operations and/or functions of SGW-U 120 as described herein and at least one memory element 1224 is configured to store data associated with SGW-U 120.

In various embodiments, routing module 1228 is configured to implement various operations including, but not limited to: routing packets for one or more UE flow(s) according to FTEIDs, UE PDN IP address information, combinations thereof or the like for one or more flow(s) installed at SGW-U 120 for exchanging one or more uplink or downlink packets with one or more APNs and/or one or more data plane entities for a given deployment architecture. In various embodiments, SGW-U storage 1226 can be configured to store information associated with various operations as described herein including, but not limited to: storing FTEIDs for one or more UE flow(s) for one or more routing tables; storing communication protocol and/or interfacing information; combinations thereof or any other information as discussed herein.

Referring to FIG. 12D, PGW-C 124 or any other PGW-C that can be deployed in accordance with at least one embodiment of architecture 100 can include at least one processor 1232, at least one memory element 1234, a PGW-C storage 1236 and a PGW-U relocation module 1238. In at least one embodiment, at least one processor 1232 is at least one hardware processor configured to execute various tasks, operations and/or functions of PGW-C 124 as described herein and at least one memory element 1234 is configured to store data associated with PGW-C 124.

In various embodiments, PGW-U relocation module 1238 is configured to implement various operations as described herein, including, but not limited to: executing an PGW-U selection algorithm based on a ULI for a given eNodeB/UE to determine whether relocation of a given PGW-U is needed and, if so, determining the PGW-U nearest to the eNodeB/UE; allocating a new S5U FTEID and a new UE PDN IP address for a relocated PGW-U for one or more UE bearer(s); exchanging new Provide User Plane Endpoint messaging with one and one or more SGW-Cs (e.g., SGW-C 118); interfacing with an SDN controller (e.g., SDN controller 128) for installing, modifying and/or deleting one or more flow(s)/flow entries for one or more PGW-Us; exchanging enhanced Modify EPS Bearer messaging with one or more SGW-Us; exchanging Update Bearer messaging with one or more SGW-Us; cleaning up one or more associations for relocated flows; combinations thereof or any other operations as discussed herein.

In various embodiments, PGW-C storage 1236 can be configured to store information associated with various operations as described herein including, but not limited to: storing location information configured at the PGW-C 124 and associated with PGW-Us to determine locations of the PGW-Us; storing DNS local cache information which can be used for a requested APN FQDN based DNS query for use in PGW-U relocations; storing SGW-U S5U FTEID(s) for use in PGW-U relocations; storing communication protocol and/or interfacing information; combinations thereof or any other information as discussed herein.

In at least one embodiment, PGW-C 124 can be configured with a PGW-U Routing Management Module 1239, which can be configured to install one or more flow(s) for a relocated PGW-U. In an embodiment, in which PGW-C 124 is configured with the PGW-U Routing Management Module 1239, PGW-C 138 can directly interface with PGW-Us to install flows for the SGW-Us without needing to signal an SDN controller to install flows for the PGW-Us.

Referring to FIG. 12E, PGW-U 126 or any other PGW-U that can be deployed in accordance with at least one embodiment of architecture 100 can include at least one processor 1242, at least one memory element 1244, a PGW-U storage 1246 and a routing module 1248. In at least one embodiment, at least one processor 1242 is at least one hardware processor configured to execute various tasks, operations and/or functions of PGW-U 126 as described herein and at least one memory element 1244 is configured to store data associated with PGW-U 126.

In various embodiments, routing module 1248 is configured to implement various operations including, but not limited to: routing packets for one or more UE flow(s) according to FTEIDs, UE PDN IP address information, combinations thereof or the like for one or more flow(s) installed at PGW-U 126 for exchanging one or more uplink or downlink packets with one or more data plane entities and/or RAN nodes for a given deployment architecture. In various embodiments, PGW-U storage 1246 can be configured to store information associated with various operations as described herein including, but not limited to: storing FTEIDs for one or more UE flow(s) for one or more routing tables; storing communication protocol and/or interfacing information; combinations thereof or any other information as discussed herein.

Referring to FIG. 12F, SDN controller 128 or any other SDN controller that can be deployed in accordance with at least one embodiment of architecture 100 can include at least one processor 1252, at least one memory element 1254, a SDN controller storage 1256 and a routing management module 1258. In at least one embodiment, at least one processor 1252 is at least one hardware processor configured to execute various tasks, operations and/or functions of SDN controller 128 as described herein and at least one memory element 1254 is configured to store data associated with SDN controller 128.

In various embodiments, routing management module 1258 is configured to implement various operations as described herein, including, but not limited to: installing, modifying and/or deleting flow(s)/flow entries for one or more SGW-Us and one or more PGW-Us for one or more UEs served by a given deployment architecture; managing one or more virtual infrastructures including virtual resources including virtual computing nodes, virtual storage and/or virtual network resources; managing one or more virtualization layers used to abstract hardware resources including computing hardware, storage hardware and/or network resources into virtual resources; instantiating virtual resources; managing connectivity between virtual resources; combinations thereof or the like to facilitate data plane and control plane interfacing. In various embodiments, SDN controller storage 1256 can be configured to store information associated with installing, modifying and/or deleting flow(s)/flow entries and connectivity between one or more SGW-Us, one or more PGW-Us, one or more eNodeBs, or other entities or nodes provided in a given deployment architecture.

Referring to FIG. 12G, eNodeB 126*a* or any other eNodeB that can be deployed in accordance with at least one embodiment of architecture 100 can include at least one processor 1262, at least one memory element 1264 and a eNodeB storage 1266. In at least one embodiment, at least one processor 1262 is at least one hardware processor configured to execute various tasks, operations and/or functions of eNodeB 162*a* as described herein and at least one memory element 1264 is configured to store data associated with eNodeB 162*a*. In various embodiments, eNodeB storage 1266 can be configured to store information associated with various eNodeB operations as described herein.

Referring to FIG. 12H, mobility controller 1200 or any other mobility controller that can be deployed in accordance with at least one embodiment of architecture 100 can include at least one processor 1272, at least one memory element 1274, a mobility controller storage 1276, an MME module 1280 and an SGW-C module 1282. In at least one embodiment, mobility controller 1200 can further be configured with a PGW-C module 1284. In at least one embodiment, mobility controller 1200 can further be configured with a Routing Management Module 1286. In at least one embodiment, at least one processor 1272 is at least one hardware processor configured to execute various tasks, operations and/or functions of mobility controller 1200 as described herein and at least one memory element 1274 is configured to store data associated with mobility controller.

In various embodiments, MME module 1280 is configured to implement various operations associated with MME functionality (e.g., as described for MME 112 and the MME modules of FIGS. 9 and 10) as described herein. In various embodiments, SGW-C module 1282 is configured to implement various operations associated with SGW-C functionality (e.g., as described for SGW-C 118 or the SGW-C modules of FIGS. 9 and 10) as described herein. In various embodiments, PGW-C module 1284 is configured to implement various operation associated with PGW-C functionality (e.g., as described for PGW-C 124 and the PGW-C modules of FIGS. 9 and 10) as described herein.

In at least one embodiment, SGW-C module 1282 and/or PGW-C module 1284 can be configured to implement operations involving communicating with one or more SDN controllers (e.g., SDN controller 128) to program one or more UE flow(s) for one or more SGW-U and/or one or more PGW-U, respectively. In another embodiment, mobility controller 1200 can be configured to include Routing Management Module 1286, which can be configured to implement various operations associated with directly installing, modifying and/or deleting one or more UE flow(s)/flow entries at one or more SGW-U and/or one or more PGW-U for embodiments in which no SDN controller is deployed for a given architecture.

In regards to the internal structure associated with architecture 100, additionally each of HSS 114, PCRF 116, wireless AP 164, Home eNB 166, AF 1150, SGW-U1, SGW-U2, PGW-U1 and PGW-U2 may each also include a respective processor, a respective memory element and/or respective storage. Hence, appropriate software, hardware and/or algorithms are being provisioned in UE 102, MME 112, HSS 114, PCRF 116, SGW-C 118, SGW-U 120, PGW-C 124, PGW-U 126, SDN controller 128, eNodeB 162*a*, eNodeB 162*b*, wireless AP 164, Home eNodeB 166, AF 1150, mobility controller 1200, SGW-U1, SGW-U2, PGW-U1 and PGW-U2 in order to facilitate various user data plane entity relocation operations as described for various embodiments discussed herein to provide a change in a UE PDN IP address in a split control and user plane architecture. Note that in certain examples, certain databases or storage (e.g., for storing information associated with user data plane entity relocation operations for architecture 100) can be consolidated with memory elements (or vice versa), or the storage can overlap/exist in any other suitable manner.

In one example implementation, UE 102, MME 112, HSS 114, PCRF 116, SGW-C 118, SGW-U 120, PGW-C 124, PGW-U 126, SDN controller 128, eNodeB 162*a*, eNodeB 162*b*, wireless AP 164, Home eNodeB 166, AF 1150, mobility controller 1200, SGW-U1, SGW-U2, PGW-U1 and PGW-U2 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate various user data plane entity relocation operations as described for various embodiments discussed herein to provide a change in a UE PDN IP address in a split control and user plane architecture (e.g., for architectures such as those illustrated in FIGS. 1A-1B). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols and interfaces that allow for the effective exchange of data or information.

In various embodiments, UE 102, MME 112, HSS 114, PCRF 116, SGW-C 118, SGW-U 120, PGW-C 124, PGW-U 126, SDN controller 128, eNodeB 162*a*, eNodeB 162*b*, wireless AP 164, Home eNodeB 166, AF 1150, mobility controller 1200, SGW-U1, SGW-U2, PGW-U1 and PGW-U2 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 102, MME 112, HSS 114, PCRF 116, SGW-C 118, SGW-U 120, PGW-C 124, PGW-U 126, SDN controller 128, eNodeB 162*a*, eNodeB 162*b*, wireless AP 164, Home eNodeB 166, AF 1150, mobility controller 1200, SGW-U1, SGW-U2, PGW-U1 and PGW-U2 could be provided in any database, register, control list, cache, or storage structure: all of which can be referenced at any suitable timeframe. Any such storage options may be included within the broad term 'memory element' as used herein. Similarly, any of the potential processing elements, modules, controllers, and machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the user data plane entity relocation operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 12A-12H] can store data used for the operations described herein. This includes the memory elements being able to store software, logic, code, or processor instructions that are executed to carry out the activities described herein. A processor (e.g., a hardware processor) can execute any type of instructions associated with data to achieve the operations detailed herein. In one example, the processors [as shown in FIGS. 12A-12H] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, function or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that architecture 100 (and its teachings) are readily scalable and can accommodate a large number of components, as well as more complicated/sophisticated arrangements and configurations. Accordingly, the examples provided should not limit the scope or inhibit the broad teachings of architecture 100 as potentially applied to a myriad of other architectures.

As used herein, unless expressly stated to the contrary, use of the phrase 'at least one of' or 'one or more of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, architecture 100 may be applicable to other exchanges or routing protocols. Moreover, although architecture 100 has been illustrated with reference to particular elements and operations that facilitate the communication process, these elements, and operations may be replaced by any suitable architecture or process that achieves the intended functionality of architecture 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining a location of a user equipment (UE);
   determining whether at least one packet data network (PDN) Gateway user data plane entity (PGW-U) servicing at least one PDN flow for the UE is to be changed based, at least in part, on the location of the UE;
   in response to determining that the at least one PGW-U is to be changed, selecting at least one new PGW-U to service the at least one PDN flow for the UE based, at least in part, on the location of the UE;
   allocating a fully qualified tunnel endpoint identifier (FTEID) for the at least one new PGW-U for an interface between the at least one new PGW-U and at least one of:
      a Serving Gateway user data plane entity (SGW-U) that is to service the at least one PDN flow for the UE; and
      an eNodeB to which the UE is connected;
   allocating a new PDN Internet Protocol (IP) address for the at least one PDN flow for which the at least one PGW-U is changed; and
   communicating the new PDN IP address to the UE.

2. The method of claim 1, wherein the PDN IP address is communicated to the UE using a Modify EPS Bearer Request message.

3. The method of claim 1, wherein the PDN IP address is communicated to the UE using an E-UTRAN Radio Access Bearer (E-RAB) Modify Request Message including a Modify EPS Bearer Request Message as a NAS PDU within the E-RAB Modify Request Message.

4. The method of claim 1, wherein the location of the UE is determined based on a user location information (ULI) indicator associated with the UE.

5. The method of claim 1, further comprising:
   installing a General Packet Radio Service (GPRS) Tunneling Protocol user plane (GTPU) flow configuration associated with the at least one PDN flow using one or more a fully qualified tunnel endpoint identifiers (FTEIDs) for the at least one new user data plane entity that is to service the at least one PDN flow.

6. The method of claim 5, wherein the installing is performed by at least one of:
   a Software Defined Network (SDN) controller;
   a Serving Gateway control plane entity (SGW-C);
   a Packet Data Network Gateway control plane entity (PGW-C); and
   a mobility controller including at least two of:
      Mobility Management Entity (MME) functionality,
      Serving Gateway control plane functionality, and
      Packet Data Network Gateway control plane functionality.

7. The method of claim 1, further comprising:
   notifying a policy server with the new PDN IP address for any Gx sessions for the UE.

8. The method of claim 1, wherein the determining whether at least one existing user data plane entity servicing at least one PDN flow for the UE is to be changed is performed by a mobility controller, wherein the mobility controller comprises functionality for at least two of:
   a Mobility Management Entity (MME),
   a Serving Gateway control plane entity, and
   a Packet Data Network Gateway control plane entity.

9. The method of claim 1, wherein the determining whether at least one existing user data plane entity servicing at least one PDN flow for the UE is to be changed is performed by a Mobility Management Entity (MME).

10. The method of claim 1, wherein the determining whether at least one existing user data plane entity servicing at least one PDN flow for the UE is to be changed is performed by a PDN Gateway control plane entity (PGW-C) due to one of:
   a failure of a PDN Gateway user data plane entity (PGW-U); and
   load re-balancing.

11. The method of claim 1, further comprising determining by a Serving Gateway control plane entity (SGW-C) that all PDN flows for the UE are to be change to a second Serving Gateway user data plane entity (SGW-U) due to one of:
   a failure of a first SGW-U currently servicing all PDN flows for the UE; and
   load re-balancing.

12. The method of claim 1, further comprising communicating, by a Mobility Management Entity (MME) to a Serving Gateway control plane entity (SGW-C) that a ULI sent to the SGW-C is sent only to aid the SGW-C in Serving Gateway user data plane entity (SGW-U) selection.

13. The method of claim 1, wherein the method is performed for at least one of:
   a 3rd Generation Partnership Project (3GPP) service request procedure;
   a 3GPP SI handover procedure; and
   a 3GPP X2 handover procedure.

14. The method of claim 1, wherein the PDN IP address is communicated to the UE using a Tracking Area Update (TAU) Accept Message that includes the PD IP address in an Evolved Packet System (EPS) Bearer Context Status portion of the TAU Accept message.

15. A method comprising:
   determining a location of a user equipment (UE);
   determining whether at least one Serving Gateway user data plane entity (SGW-U) servicing at least one packet data network (PDN) flow for the UE is to be changed based, at least in part, on the location of the UE;
   upon determining that the SGW-U servicing the at least one PDN flow for the UE is to be changed, selecting a new SGW-U to service the at least one PDN flow for the UE based, at least in part, on the location of the UE;
   allocating a first FTEID for the new SGW-U for an interface between the new SGW-U and an eNodeB to which the UE is connected;
   allocating a second FTEID for the SGW-U for an interface between the new SGW-U and a PDN Gateway user data plane entity (PGW-U) that is to service the at least one PDN flow for the UE;
   allocating a new PDN Internet Protocol (IP) address for the at least one PDN flow for which the at least one SGW-U is changed; and
   communicating the new PDN IP address to the UE.

16. One or more non-transitory tangible media encoding logic that includes instructions for execution that when executed by a processor, is operable to perform operations comprising:
   determining a location of a user equipment (UE);
   determining whether at least one packet data network (PDN) Gateway user data plane entity (PGW-U) servicing at least one PDN flow for the UE is to be changed based, at least in part, on the location of the UE;
   in response to determining that the at least one PGW-U is to be changed, selecting at least one new PGW-U to service the at least one PDN flow for the UE;
   allocating a fully qualified tunnel endpoint identifier (FTEID) for the at least one new PGW-U for an interface between the at least one new PGW-U and at least one of:
      a Serving Gateway user data plane entity (SGW-U) that is to service the at least one PDN flow for the UE; and
      an eNodeB to which the UE is connected;
   allocating a new PDN Internet Protocol (IP) address for the at least one PDN flow for which the at least one PGW-U entity is changed; and
   communicating the new PDN IP address to the UE.

17. The media of claim 16, the operations further comprising:
   upon determining that the SGW-U servicing the at least on PDN flow for the UE is to be changed, selecting a new SGW-U to service the at least one PDN flow for the UE based, at least in part, on the location of the UE;
   allocating a first FTEID for the new SGW-U for an interface between the new SGW-U and the eNodeB to which the UE is connected; and
   allocating a second FTEID for the SGW-U for an interface between the new SGW-U and the new PGW-U that is to service the at least one PDN flow for the UE.

18. A system comprising:
   a memory element for storing data; and
   a processor that executes instructions associated with the data, wherein the processor and the memory element cooperate such that the system is configured for:
      determining a location of a user equipment (UE);
      determining whether at least one packet data network (PDN) Gateway user data plane entity (PGW-U) servicing at least one PDN flow for the UE is to be changed based, at least in part, on the location of the UE;
      in response to determining that the at least one PGW-U is to be changed, selecting at least one new PGW-U to service the at least one PDN flow for the UE;
   allocating a fully qualified tunnel endpoint identifier (FTEID) for each new PGW-U of the the at least one new PGW-U for an interface between a respective new PGW-U of the at least one new PGW-U and at least one of:
      a Serving Gateway user data plane entity (SGW-U) that is to service the at least one PDN flow for the UE; and
      an eNodeB to which the UE is connected;
   allocating a new PDN Internet Protocol (IP) address for the at least one PDN flow for which the at least one PGW-U is changed; and
   communicating the new PDN IP address to the UE.

* * * * *

UNITED STATES PATENT AND TRADEMARK OFFICE
CERTIFICATE OF CORRECTION

PATENT NO. : 10,069,791 B2
APPLICATION NO. : 15/014997
DATED : September 4, 2018
INVENTOR(S) : Sridhar Bhaskaran et al.

It is certified that error appears in the above-identified patent and that said Letters Patent is hereby corrected as shown below:

In the Drawings

On sheet 16 of 24, in FIG. 7A, reference numeral 720, Line 3, delete "ADDRESSS)" and insert -- ADDRESS) --, therefor.

In the Specification

In Column 47, Line 3, delete "loadbalancers," and insert -- load balancers, --, therefor.

In the Claims

In Column 51, Line 5, in Claim 13, delete "SI" and insert -- S1 --, therefor.

In Column 51, Line 9, in Claim 14, delete "PD" and insert -- PDN --, therefor.

In Column 52, Line 7, in Claim 16, after "PGW-U" delete "entity".

In Column 52, Line 12, in Claim 17, delete "on" and insert -- one --, therefor.

In Column 52, Line 36, in Claim 18, delete "the the" and insert -- the --, therefor.

Signed and Sealed this
Twenty-seventh Day of November, 2018

Andrei Iancu
*Director of the United States Patent and Trademark Office*